INVENTOR
John H. Gruver
BY Wallace and Cannon
ATTORNEYS

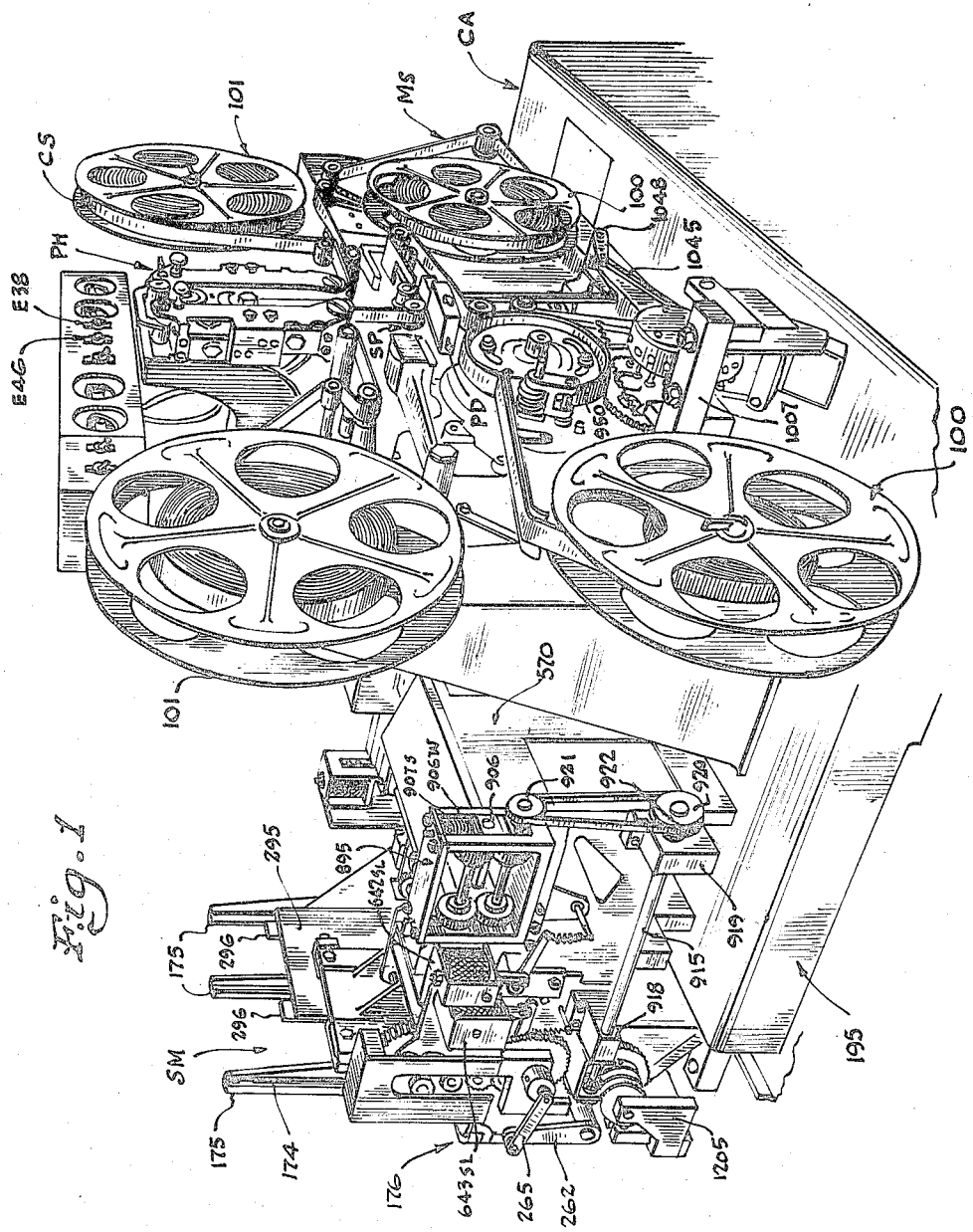

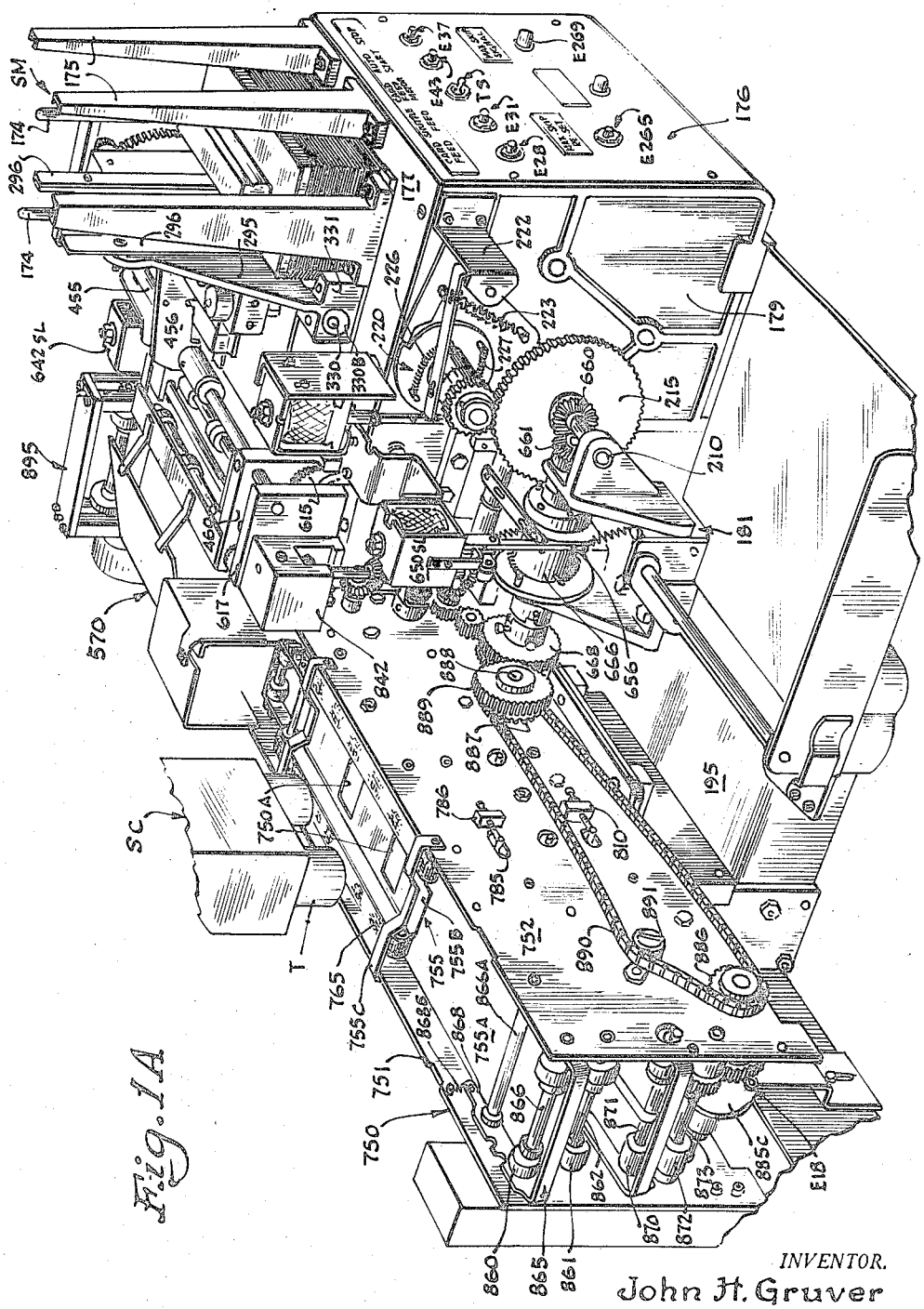

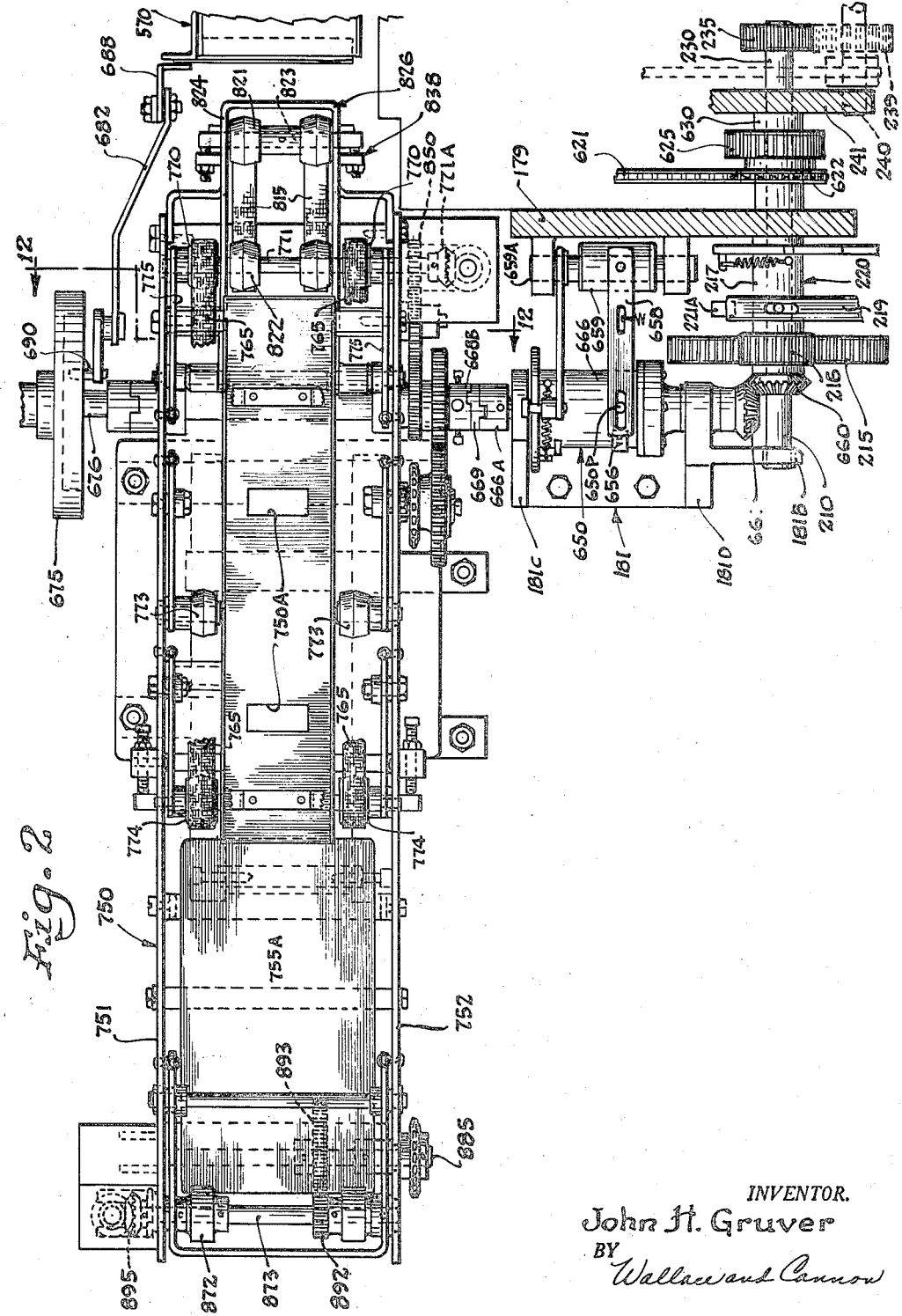

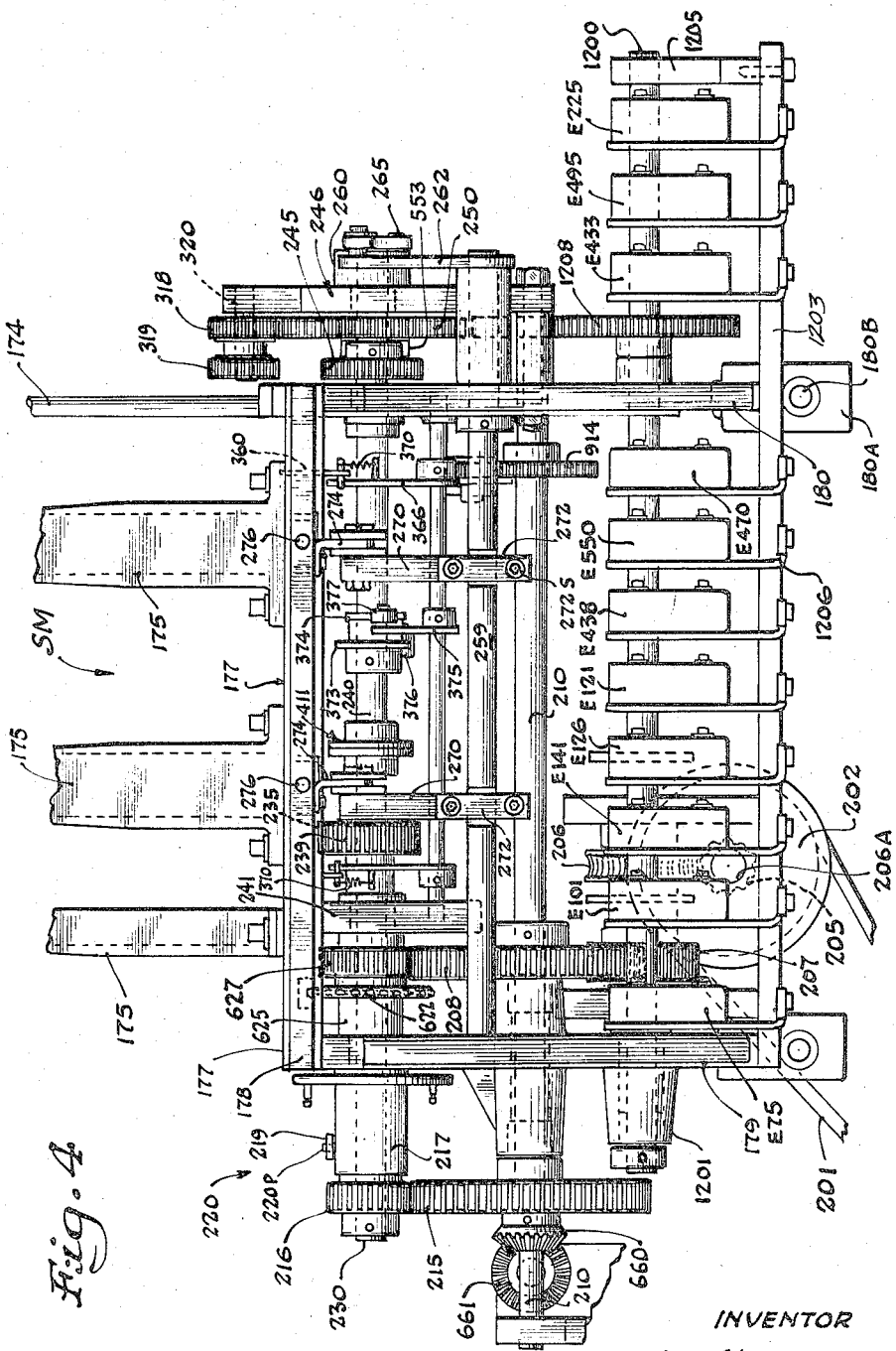

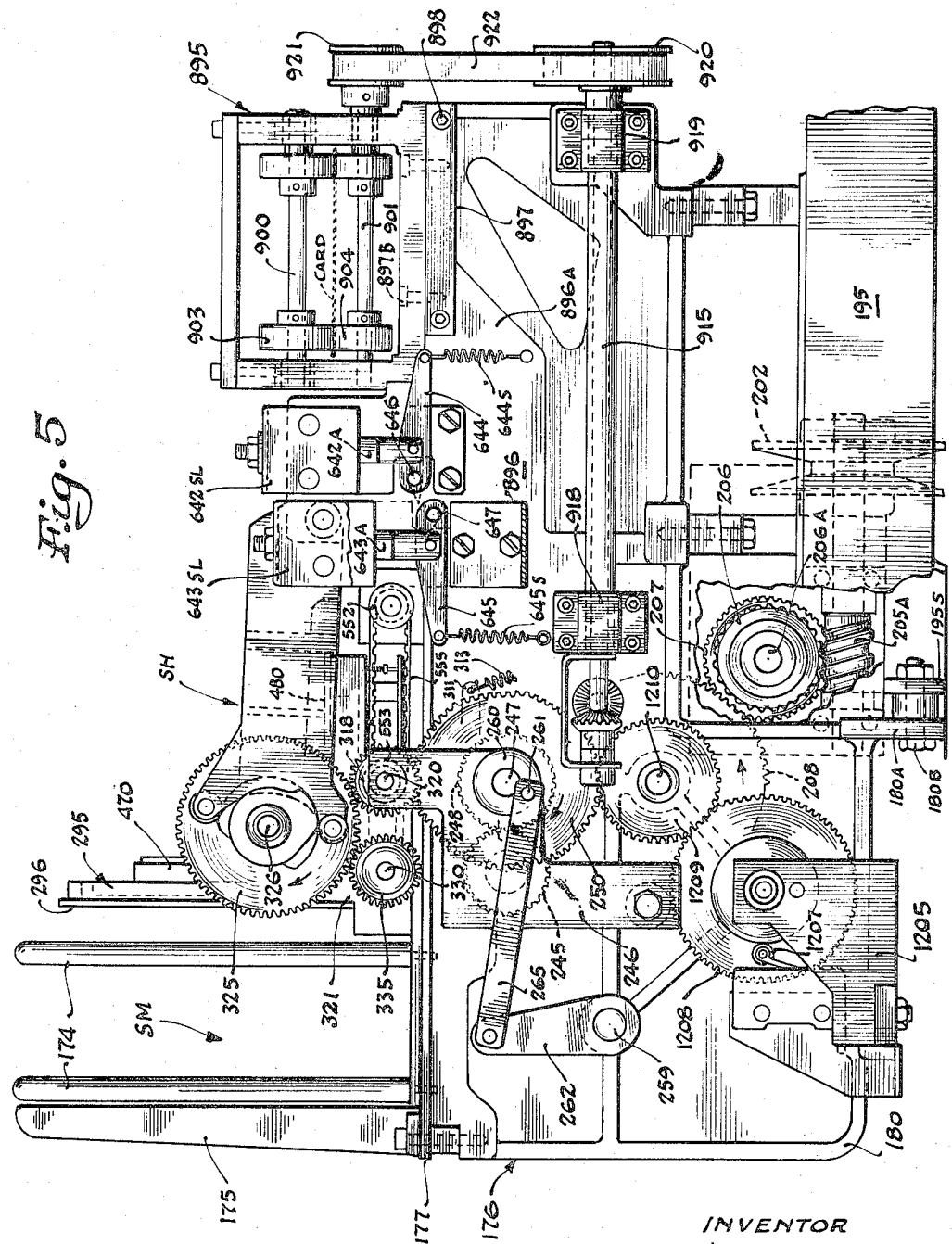

Sept. 23, 1958
J. H. GRUVER
2,853,356
PRINTING MACHINES
Filed Oct. 29, 1954
21 Sheets-Sheet 7
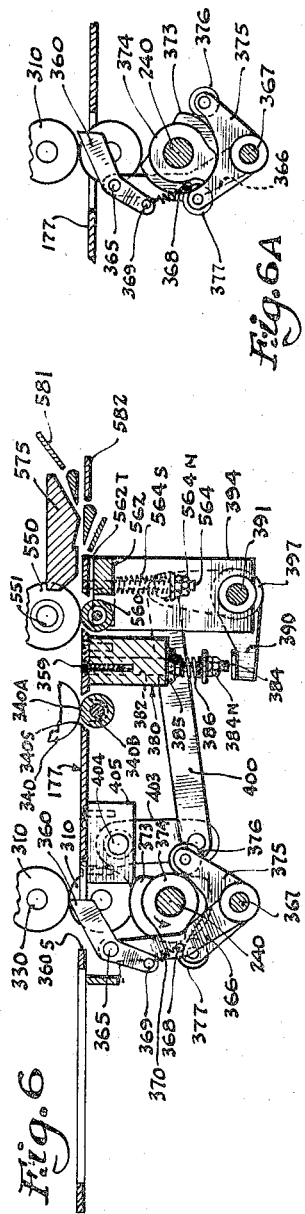
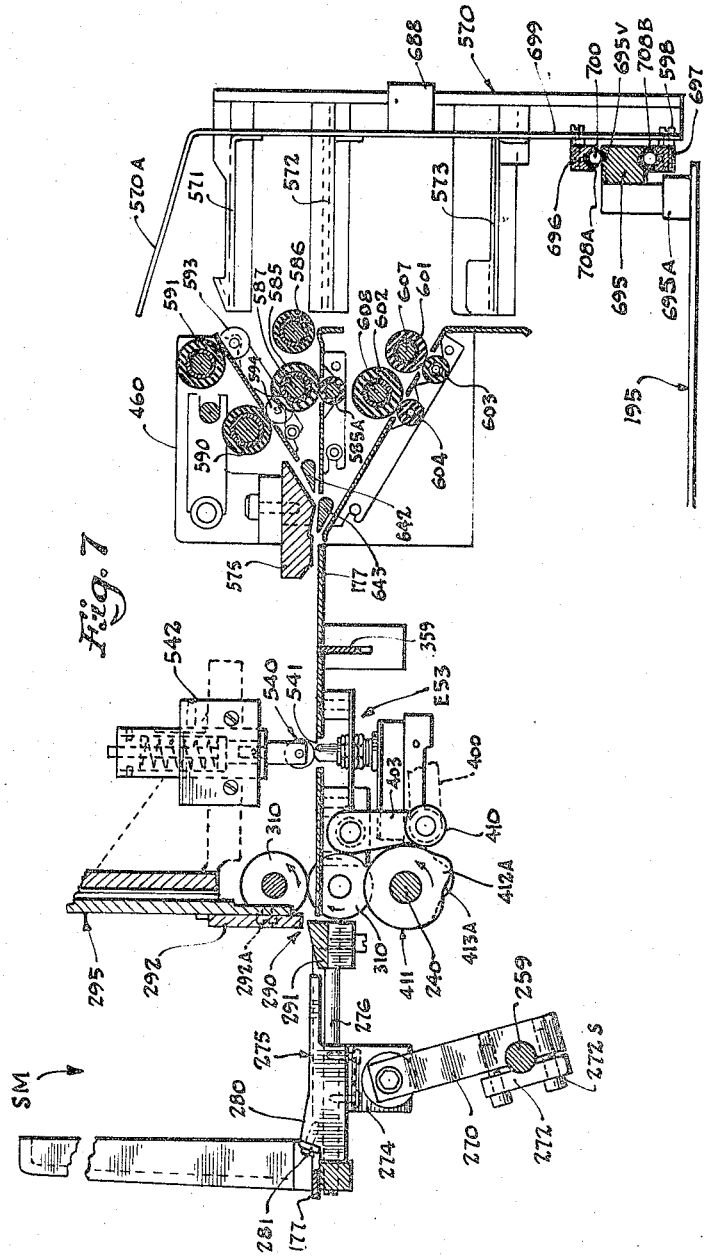
INVENTOR
John H. Gruver
BY Wallace and Connor
ATTORNEYS Sept. 23, 1958    J. H. GRUVER    2,853,356
PRINTING MACHINES
Filed Oct. 29, 1954    21 Sheets-Sheet 8
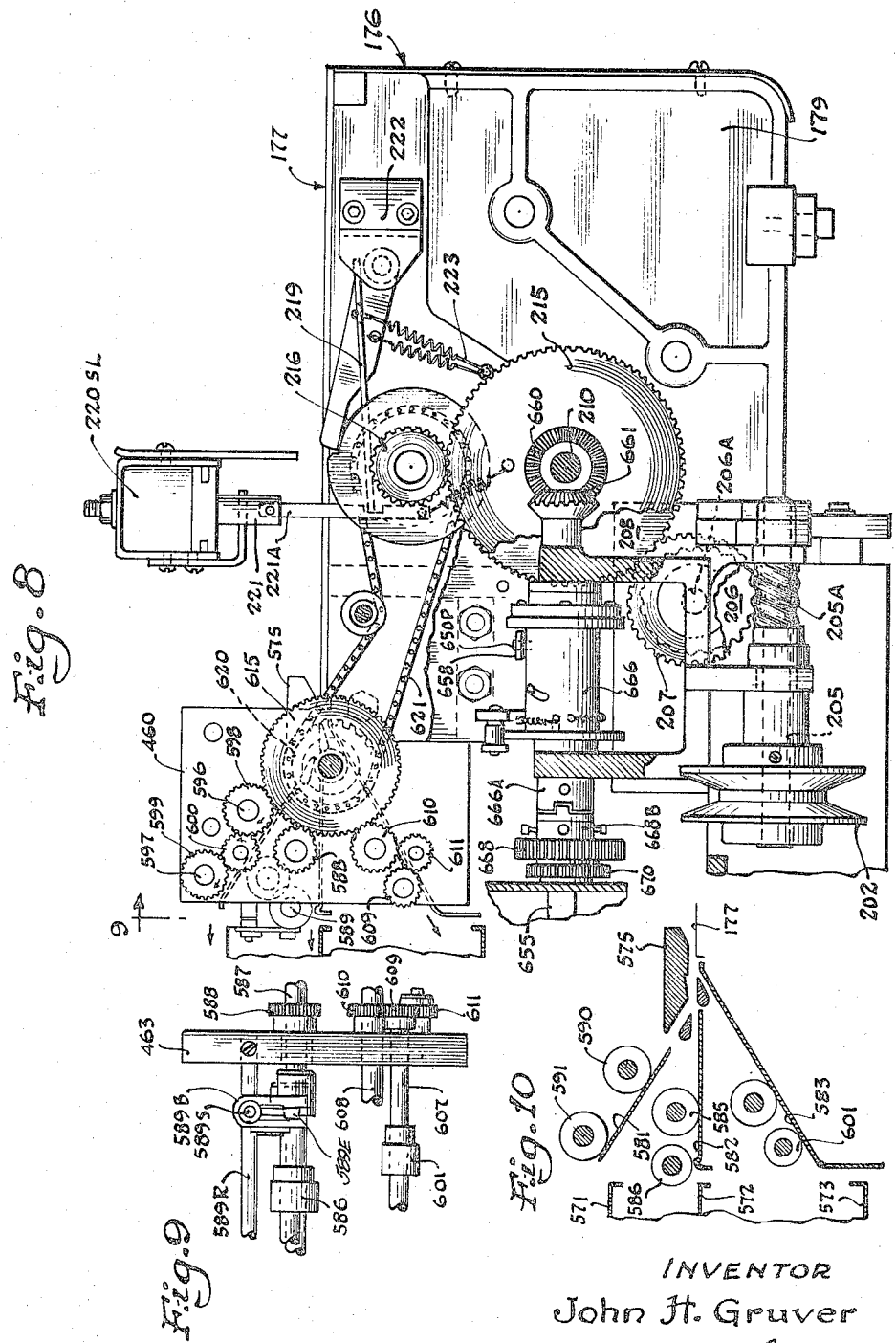
INVENTOR
John H. Gruver
BY Wallace and Cannon
ATTORNEYS

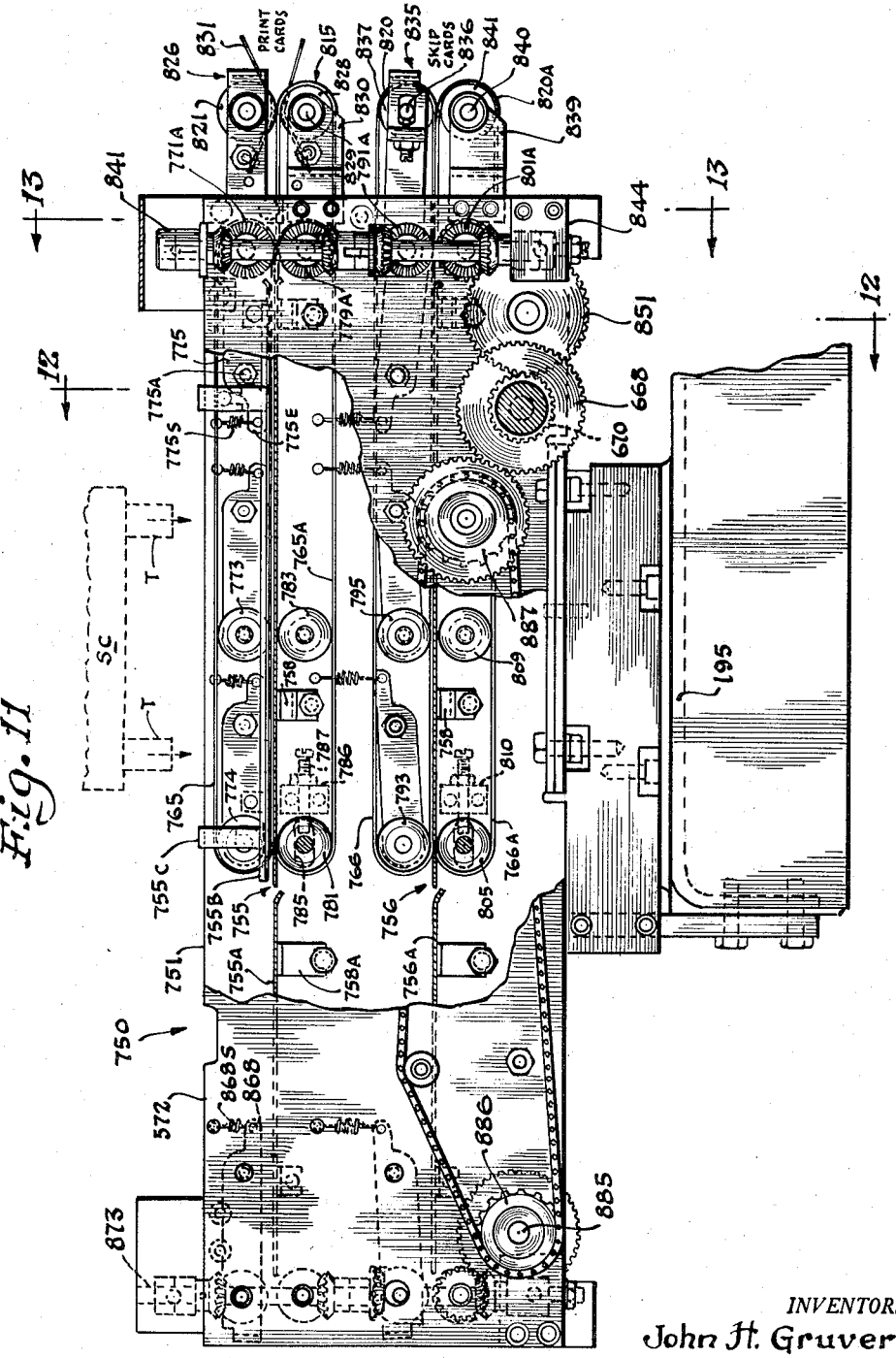

Sept. 23, 1958 J. H. GRUVER 2,853,356
PRINTING MACHINES
Filed Oct. 29, 1954 21 Sheets-Sheet 10

INVENTOR.
John H. Gruver
BY
Wallace and Cannon
ATTORNEYS

Sept. 23, 1958  J. H. GRUVER  2,853,356
PRINTING MACHINES
Filed Oct. 29, 1954  21 Sheets-Sheet 11
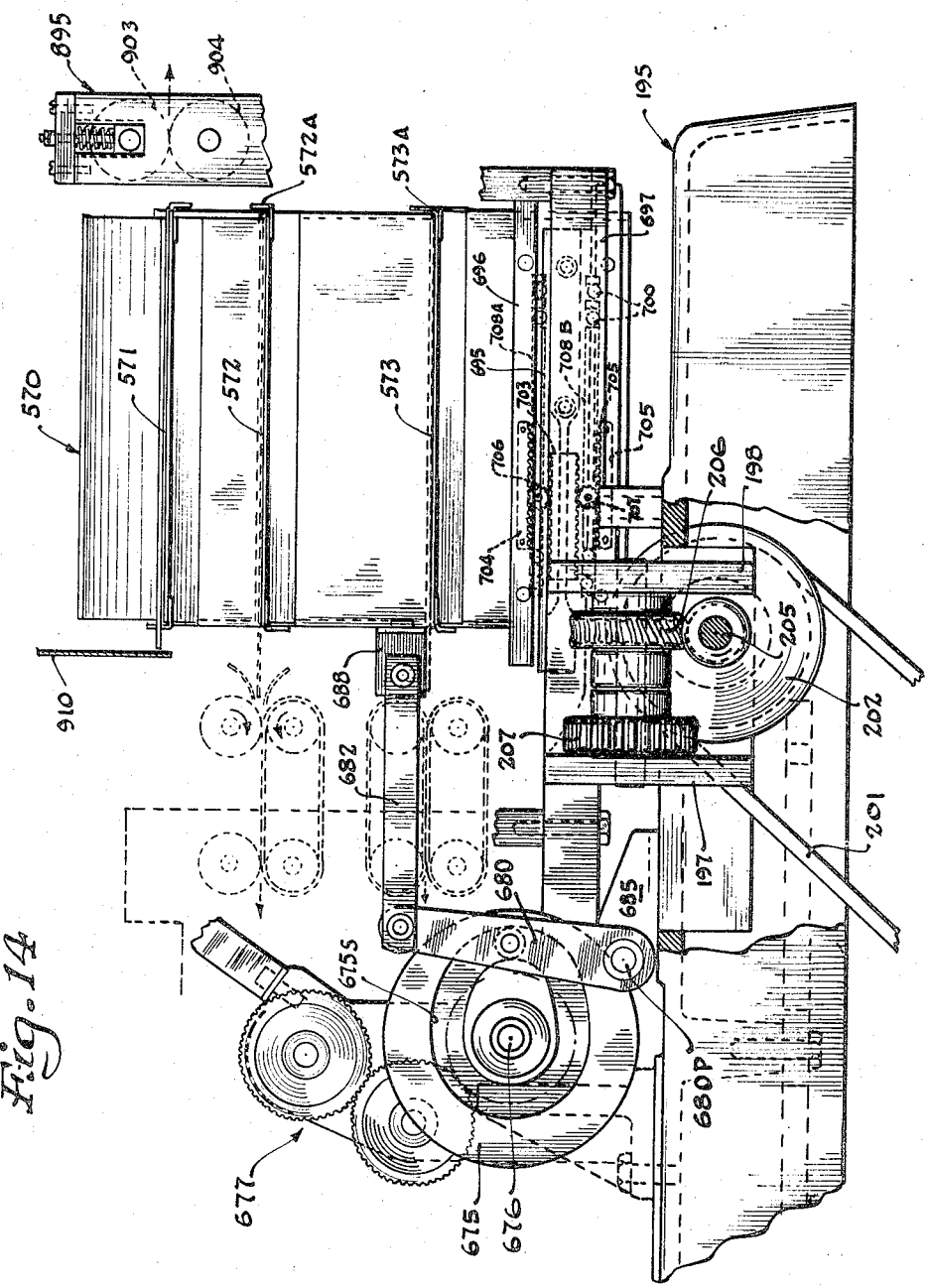
INVENTOR.
John H. Gruver
BY
Wallace and Cannon
ATTORNEYS Sept. 23, 1958 J. H. GRUVER 2,853,356
PRINTING MACHINES
Filed Oct. 29, 1954 21 Sheets-Sheet 12
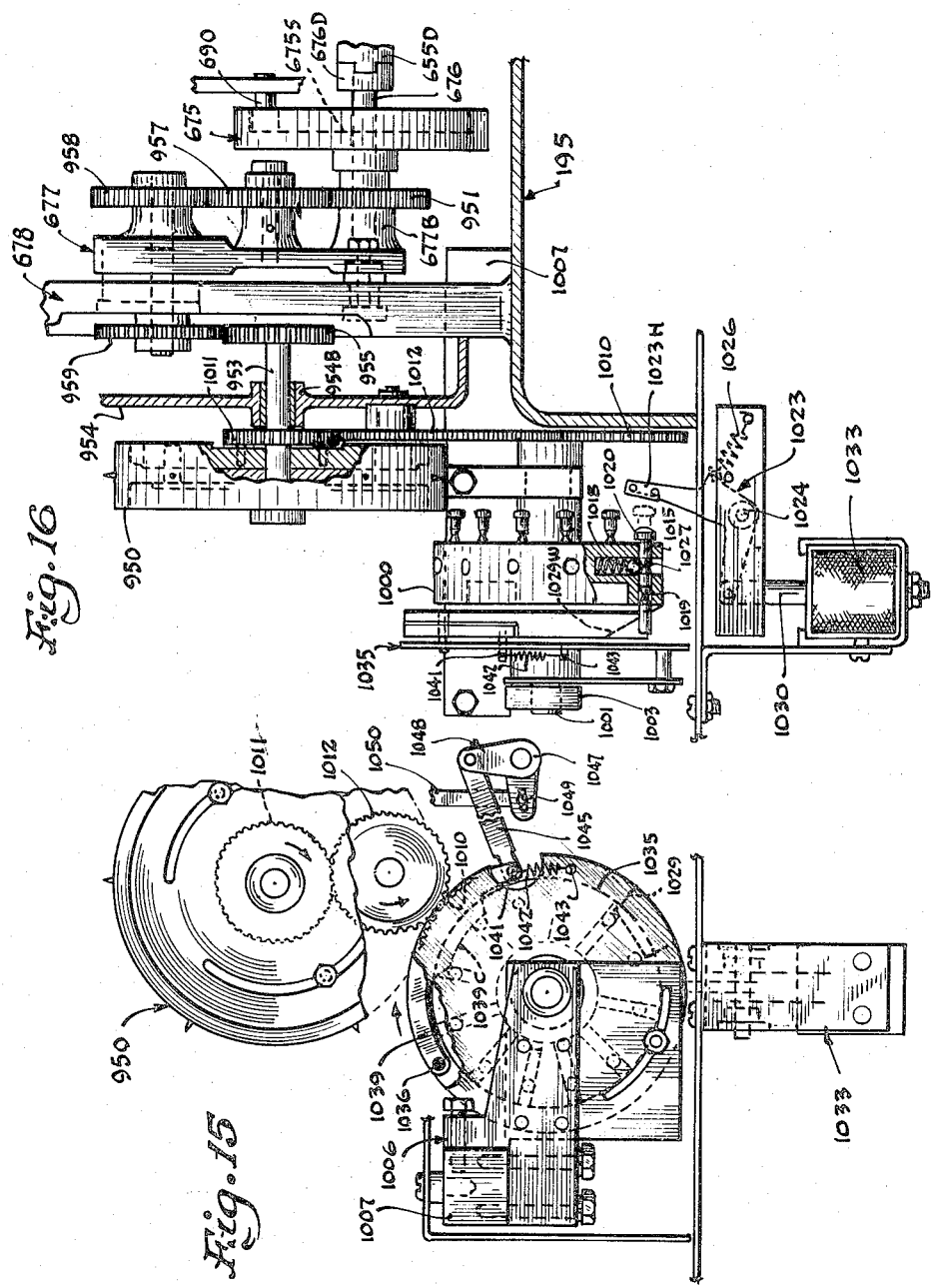
INVENTOR
John H. Gruver
BY Wallace and Cannon
ATTORNEYS Sept. 23, 1958 J. H. GRUVER 2,853,356
PRINTING MACHINES
Filed Oct. 29, 1954 21 Sheets-Sheet 13
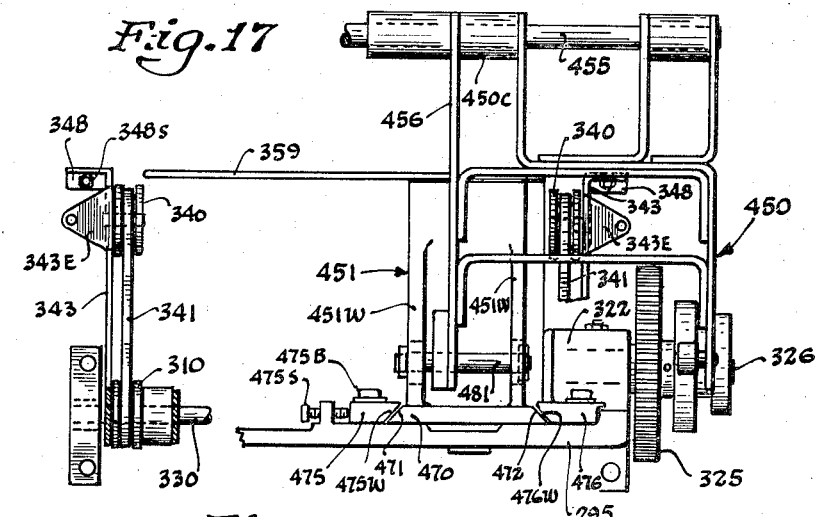
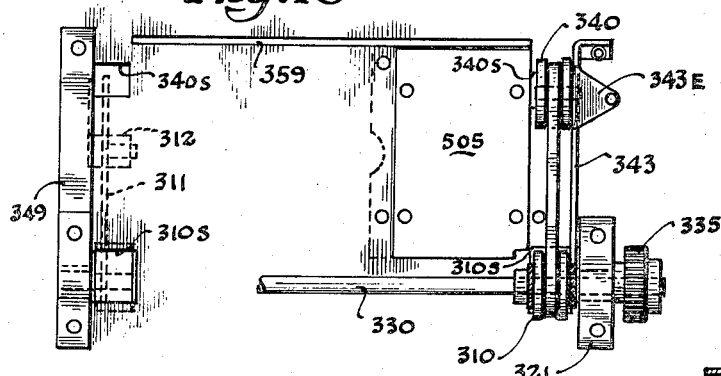
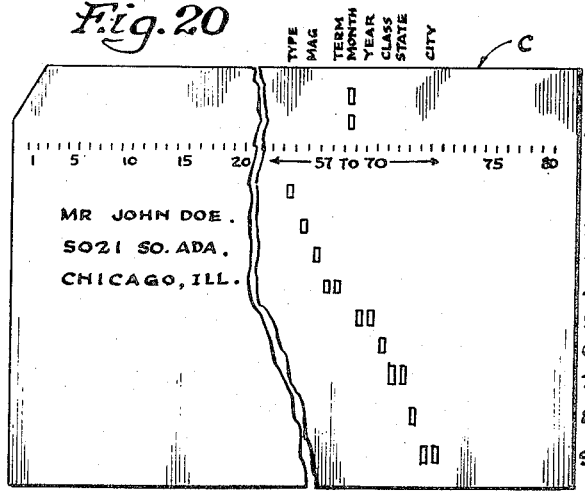
INVENTOR
John H. Gruver
BY Wallace and Cannon
ATTORNEYS Sept. 23, 1958

J. H. GRUVER 2,853,356

PRINTING MACHINES

Filed Oct. 29, 1954

INVENTOR
John H. Gruver
BY Wallace and Cannon
ATTORNEYS

Sept. 23, 1958

J. H. GRUVER 2,853,356

PRINTING MACHINES

Filed Oct. 29, 1954

INVENTOR
John H. Gruver
BY Wallace and Cannon
ATTORNEYS

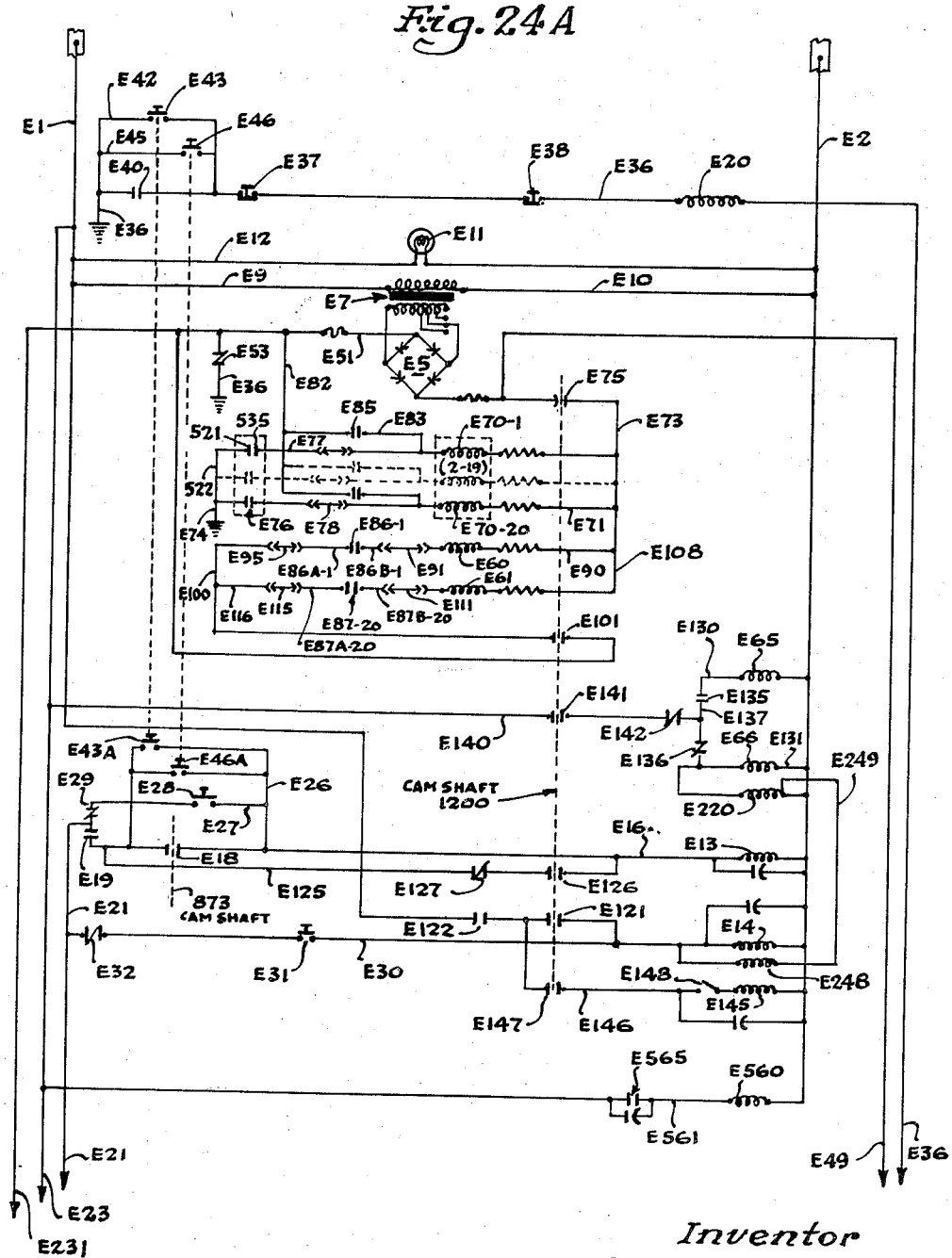

Sept. 23, 1958  J. H. GRUVER  2,853,356
PRINTING MACHINES

Filed Oct. 29, 1954  21 Sheets-Sheet 17

Inventor
John H. Gruver
By Wallace and Cannon
Attorneys

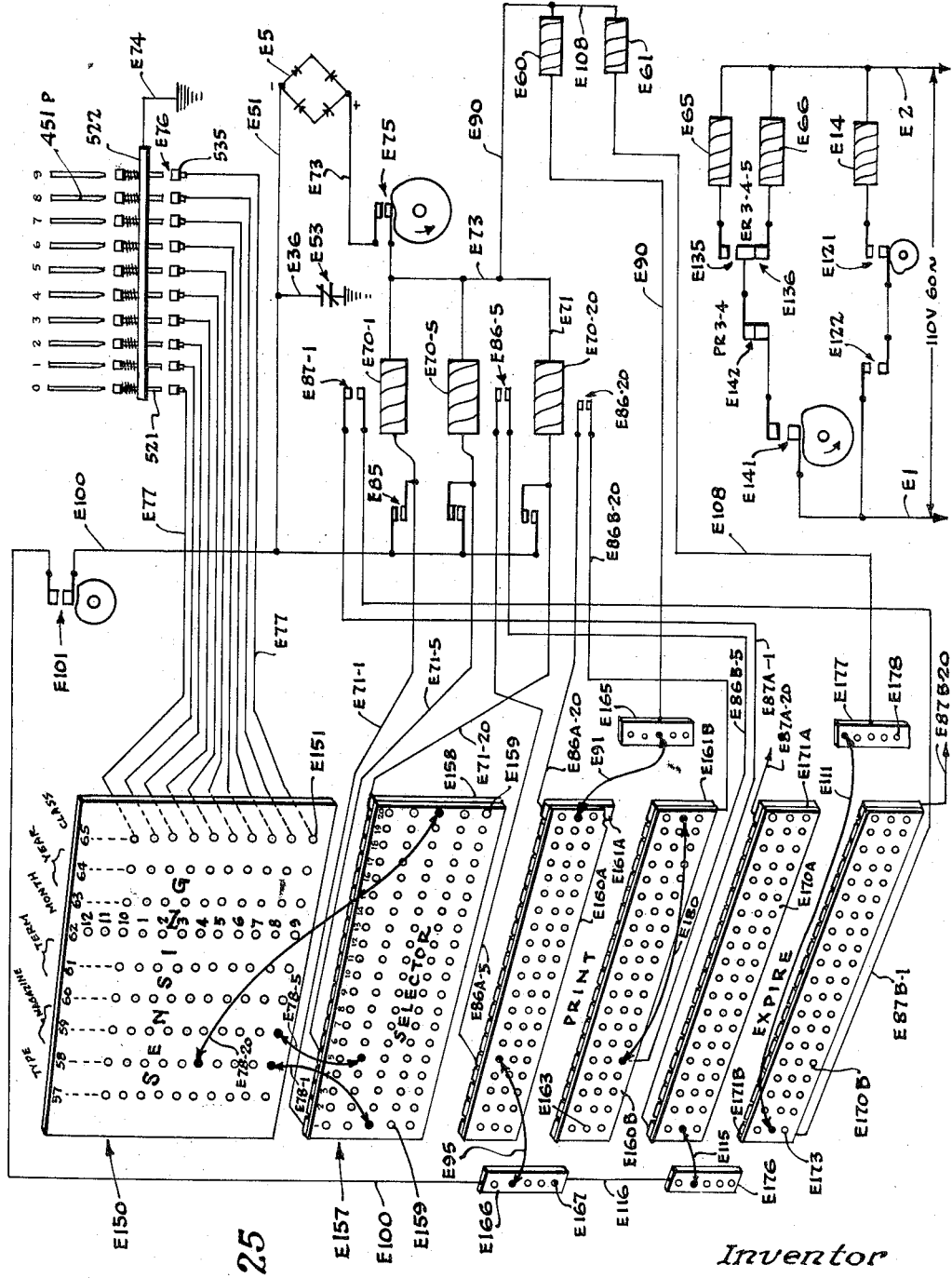

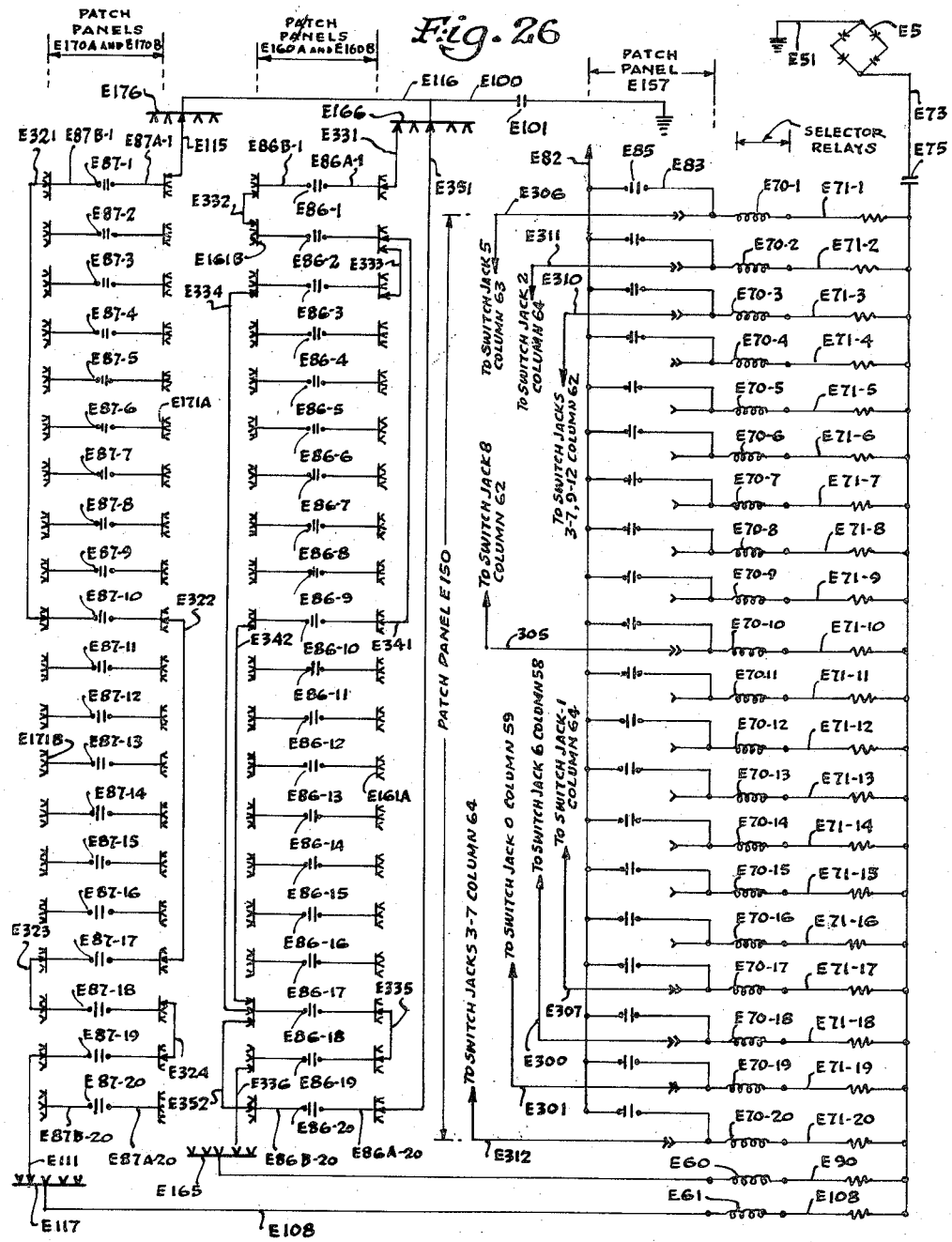

Sept. 23, 1958        J. H. GRUVER        2,853,356
                      PRINTING MACHINES
Filed Oct. 29, 1954                    21 Sheets-Sheet 21

Fig. 28

Inventor
John H. Gruver
By Wallace and Cannon
Attorneys

United States Patent Office 2,853,356
Patented Sept. 23, 1958

2,853,356

PRINTING MACHINES

John H. Gruver, Cleveland Heights, Ohio, assignor to Addressograph-Multigraph Corporation, Cleveland, Ohio, a corporation of Delaware Application October 29, 1954, Serial No. 465,612

32 Claims. (Cl. 346—33)

This invention relates to a printing machine.

In my application Serial No. 347,600, filed April 8, 1953, there is disclosed a printing machine of the kind which utilizes a facsimile method of reproduction, and the present invention pertains to a printing machine of this kind.

In a printing machine of the kind disclosed in my aforesaid application, individual cards or like instrumentalities containing data which may be printed from are advanced one by one in a prearranged sequence past a photoelectric scanner so that the data thereon which is to be reproduced may be transmitted by way of electrical impulses to an electromagnetically operated printing head vibrating against a copy sheet in the form of a tape or the like. The facsimile system whereby this operation may be carried out is disclosed in the following United States Letters Patent: 2,510,200, 2,571,720, 2,571,785 and 2,578,307 issued to Russel G. Tompson.

Printing machines of the foregoing kind are adapted to be used primarily in connection with individual address cards or like instrumentalities bearing addresses representative of relatively large mailing lists, as for instance in connection with the mailing of magazines or like periodicals, premium notices and the like. In preparing mailing lists of this kind, it is also customary to delineate on the instrumentalities identifying data pertaining to various classifications for each addressee in the mailing list so as to be able to segregate or sort the instrumentalities passed through the machine into separate categories.

For example, it may be desirable that only instrumentalities of a particular order are to be printed from, the instrumentalities of another order in the mailing list are to be retained but not printed from and reinserted back into the mailing list in the original sequence, while instrumentalities of still a third order are to be relieved from the mailing list and discarded. The primary object of the present invention is to enable a printing machine of the foregoing kind to handle instrumentalities such as address cards or the like which may be of different order in a mailing list so that the data on the instrumentalities identifying these different orders may be sensed one by one and the cards thereafter directed along different paths in the machine accordingly as each is to be printed from, skipped through the machine without printing, or culled from the mailing list.

In connection with the foregoing, a further object of the present invention is to pass instrumentalities which may be of different order one by one to a collector where the instrumentalities are separated by order, and to control this collector in such a way that instrumentalities of a first order and a second order are passed to a conveyor where the first order instrumentalities are printed from while the second order are skipped through the conveyor without being printed from and thereafter re-associated with the first order instrumentalities in the original prearranged sequence in which they were passed through the machine; and a further object of the present invention is to enable this to be accomplished only where a first order instrumentality is passed to the collector so that instrumentalities of the second order, and a third order where such are present, will stack up in the collector.

In printing addresses with a machine as described in my aforesaid application, it is desirable that a means be afforded to mark the printed copy strip when there has been a change from one town or community to the next so that the person handling the copy strip will be appraised of this fact. Therefore, a further object of the present invention is to enable this to be accomplished in such a way that instrumentalities of the first order passing through the machine bearing addresses to be printed from will be compared one to another as to towns or communities whereby, when a change is detected, means are conditioned to indicate this change on the copy strip containing the reproduced addresses.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the inventions embodying the same or equivalent principles may be used and structural changes may be made as desired by those skilled in the art without departing from the present invention and the purview of the appended claims.

In the drawings:

Fig. 1 is a perspective view of the machine of the present invention as viewed from the front;

Fig. 1A is a perspective view of the machine from the back diametrically opposite that of Fig. 1;

Fig. 2 is a top plan view of a portion of the machine;

Fig. 4 is a rear elevation taken on the line 4—4 of Fig. 3 with certain parts at the back of the machine removed;

Fig. 5 is a side elevation of a portion of the machine shown in Fig. 1;

Fig. 6 is a sectional view taken substantially on the line 6—6 of Fig. 3;

Fig. 6A is a detail view of parts shown in Fig. 6 in a different position;

Fig. 7 is a sectional view taken substantially on the line 7—7 of Fig. 3;

Fig. 8 is a side elevation of the machine at the side opposite that shown in Fig. 5, certain parts being broken away;

Fig. 9 is a detail view, broken away of certain of the feed means;

Fig. 10 is a sectional view, broken away, of certain of the feed means;

Fig. 11 is a side elevation of the conveyor with part of the housing broken away;

Figure 22:
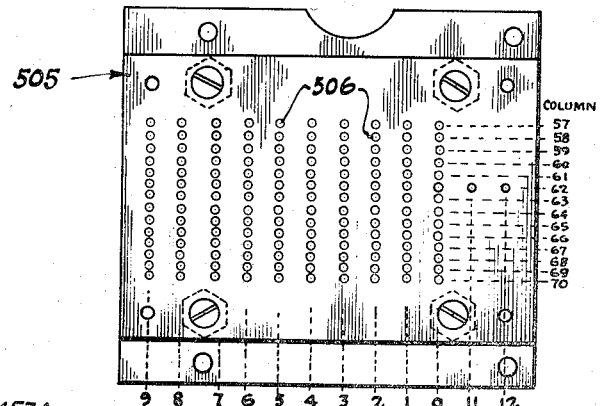
Figure 21:
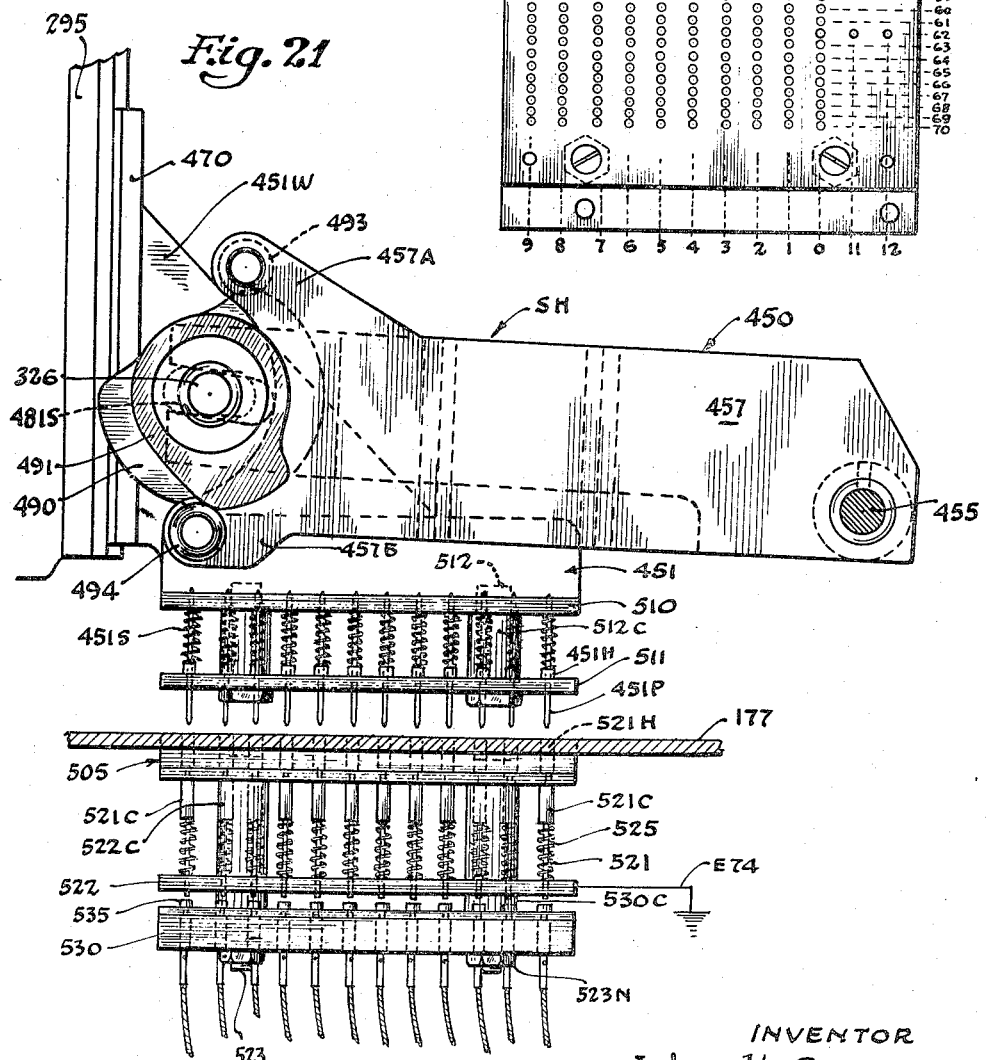
Figure 23:
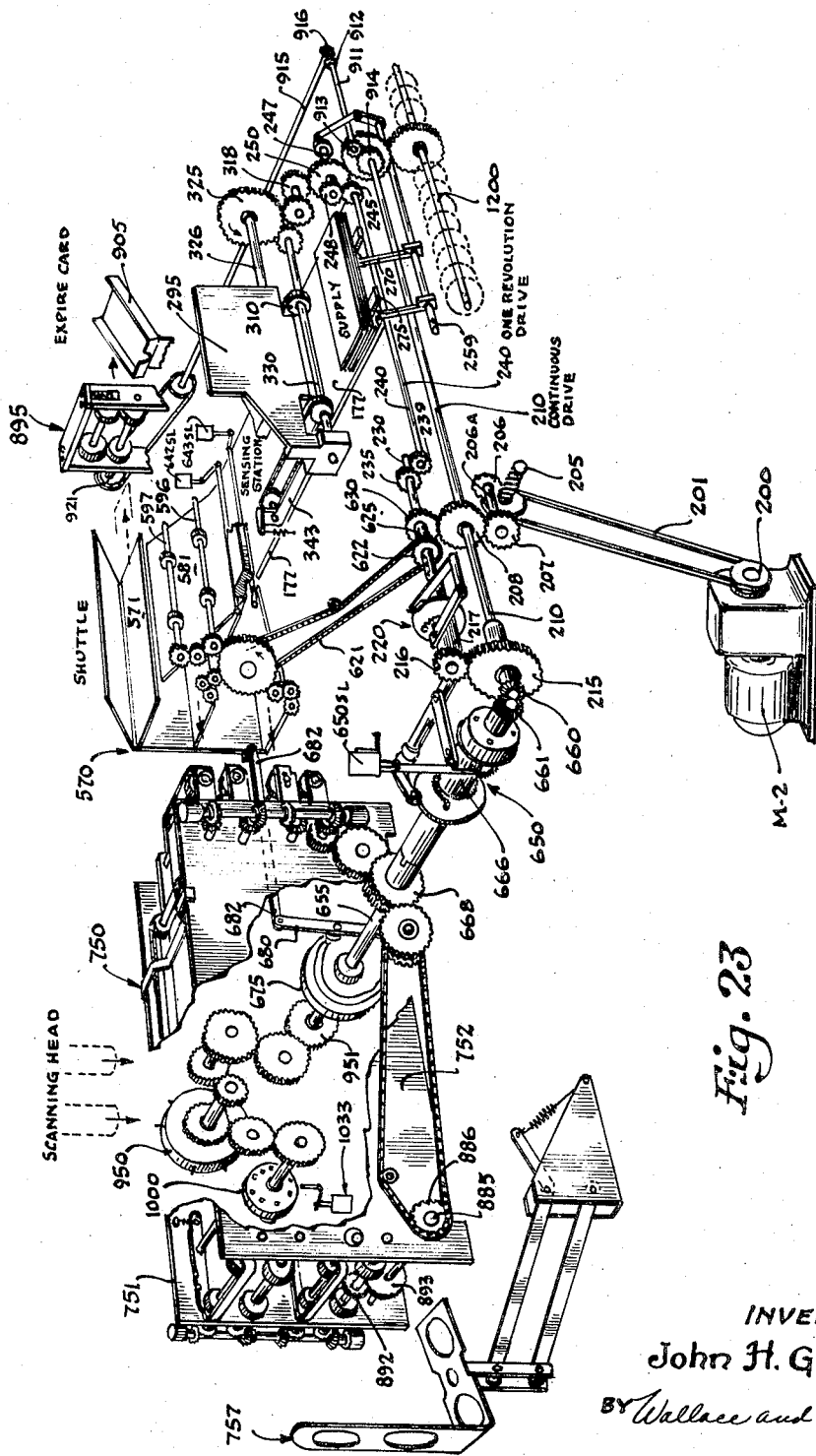
Figure 24B:
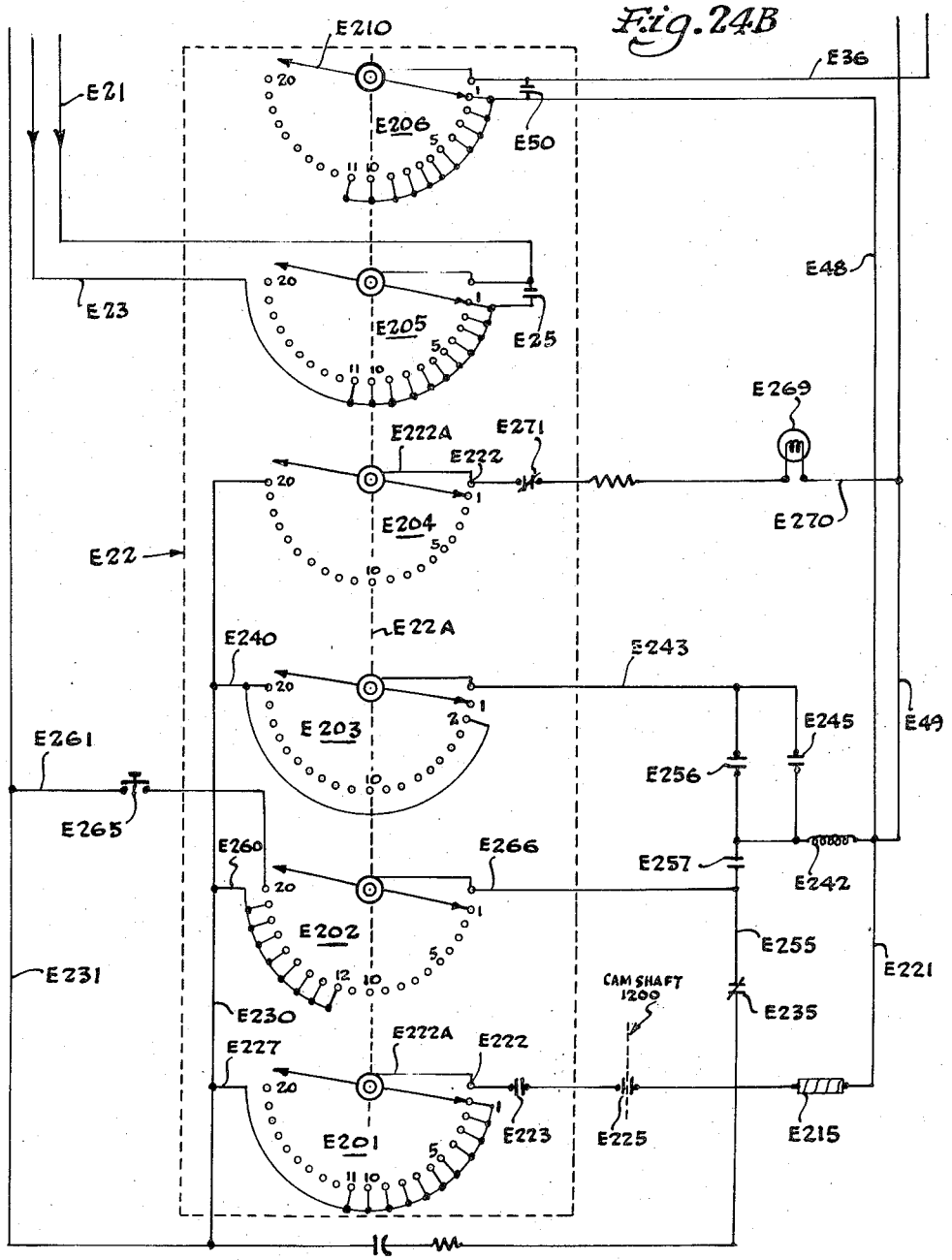
Figure 27:
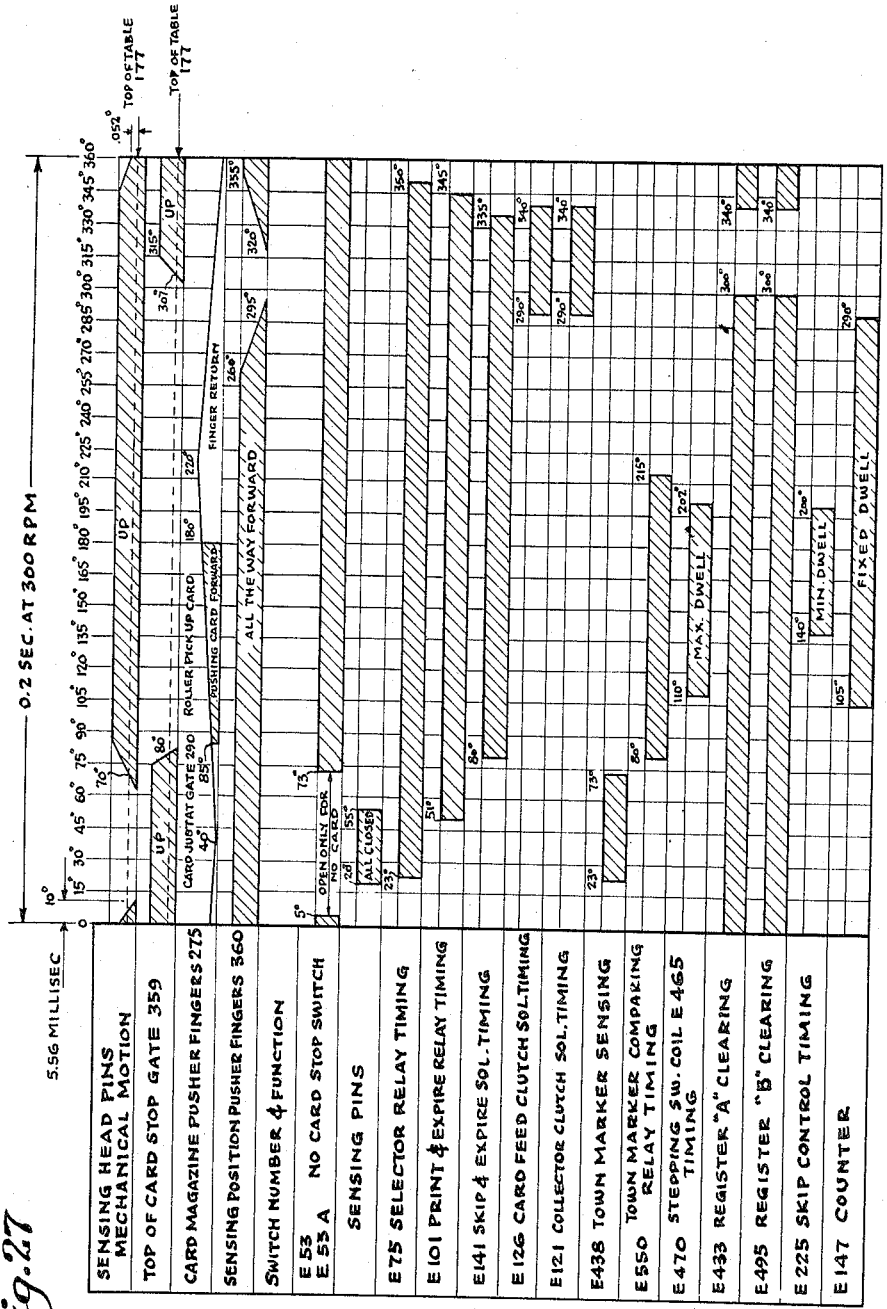

Figs. 12 and 13 are sectional views taken substantially on the lines 12—12 and 13—13 respectively of Figs. 2 and 11;

Fig. 14 is a rear elevation of the part of the machine where the collector and the means for driving the same are located;

Fig. 15 is a front elevation, broken away in part, of the storage means for the town marker;

Fig. 16 is a side elevation, part in section, of the storage means shown in Fig. 15;

Fig. 17 is a detail top elevation of certain means at the sensing station;

Fig. 18 is a top elevation of additional means adjacent to sensing station;

Fig. 19 is detail section of certain feed means at the sensing station;

Fig. 20 is a plan view of one type of address card which may be used with the printing machine of the present invention;

Fig. 21 is a sectional view through a portion of the machine showing the sensing head and related parts;

Fig. 22 is a detail view of part of the sensing means;

Fig. 23 is a diagrammatic representation of the principal parts of the machine;

Figs. 24A and 24B are schematic wiring diagrams;

Fig. 25 is a diagrammatic wiring diagram showing a simplified programming for the machine;

Fig. 26 is a schematic wiring diagram showing a more detailed programming for the machine;

Fig. 27 is a timing chart; and

Fig. 28 is a schematic wiring diagram, partly diagrammatic, showing the town marker control unit.

As noted hereinabove, the printing machine of the present invention is in the nature of that described in my aforesaid application for Letters Patent in the United States Patent Office, and which pertains to a facsimile printing system described in the patents therein listed and incorporated herein by reference. Thus, one application of the printing machine of the present invention is to print addresses representing a mailing list on a strip or web of paper that is to be subsequently subdivided into individual address labels or mailing notices of the kind used in conjunction with the mailing of magazines and like periodicals, premium notices, and the like.

As can be seen in Fig. 1, the machine includes two sets of horizontally spaced reels. The lower set of reels, 100, is adapted to feed the copy strip MS to be printed past the printing head PH of the machine, and the upper set of reels, 101, is adapted to feed a strip of carbon paper CS past the printing head in registry with the advancing address strip, as described in the aforesaid application.

The printing machine in the present instance utilizes the facsimile method of reproduction, that is, the characters constituting the address to be reproduced on the mailing copy strip are exposed as for photoelectric scanning at one station in the machine and the image thus picked up is transmitted to a reproducing station as PH, Fig. 1, at the front of the machine where there are located one or more rotating helices and associated printer bars as described in the aforesaid Gruver application. The mailing strip to be printed and the carbon strip advance together over the rotating helix and the printer bar associated therewith at the printing head, and as this takes place, the printer bar is caused to vibrate rapidly in accordance with the character signals received by it from the photoelectric cell scanning head.

The addresses that are to be scanned photoelectrically are reproduced on the mailing strip as aforesaid are carried in printed form on individual cards C, Fig. 20 each bearing, as shown, a different printed address at an area of the card allocated thereto. A group of such cards constitutes a record of the particular mailing list so that by feeding these address cards individually past the photoelectric cell at the scanning station, each address may be read and scanned and corresponding signals transmitted to the aforementioned printing bar at the printing station.

Mailing lists of the kind for which the present machine is adapted need to be continuously revised, as for instance in connection with expired subscriptions to periodicals and lapsed policies. Therefore, in preparing individual address cards as C for use in the machine of the present invention, identifying data pertaining to the status of each addressee in the list are carried on the card allocated to that person. This information may be of the Hollerith or Powers type, that is, discrete marks in the form of openings are punched in the card in an area allocated thereto apart from the printed address thereon so that the card, in addition to the printed address, will carry identifying data that pertains to the addressee's status in the mailing list, and this information ordinarily is punched into the card when it has first been determined to add the address to the mailing list.

The printing machine of the present invention is adapted particularly for high speed operation in connection with subscriber mailing lists, and as it is undesirable that, before passing address cards as those described above through the machine, there should have to be any manual revision of the mailing list to remove those cards representing expired dates, certain of the data punched into the address cards are to pertain to the expiration date of the subscription represented by that particular address card. These punched hole data are read or sensed by the machine before the cards bearing addresses that are no longer to be retained in the list are ejected from the machine rather than being passed on to the scanning head.

Even so, it is customary in some instances to retain expirations of a particular kind or order in the list temporarily for other purposes such as the subsequent mailing of promotional literature or re-notifications of the fact of expiration to assure that the addressee is well aware that his subscription has expired. In such instances, the addresses on these particular cards are not to be withdrawn or ejected entirely from the mailing list, and when the presence of a card bearing data that places the card in such a category is sensed during the course of travel through the machine, controls are set up whereby this card is caused to by-pass the exposure station in such a way as to be re-inserted in proper sequence back into the mailing list together with those address cards that were printed from.

The stack of address cards constituting a current mailing list is adapted to be inserted in a supply magazine SM at the back of the machine, Fig. 1. In the present instance, this magazine is afforded by a plurality of vertical posts 174 and 175 that are adapted to confine the cards in a vertical stack, and these posts are located at the top of a box-like housing 176, Fig. 1A, in which are located many of the driving means for effecting proper passage of the cards through the machine as will be described below.

A removable plate representing the top wall of the housing 176 serves as a table 177, Fig. 5, for supporting the stack of address cards in the magazine SM, and as shown in Fig. 4, the table 177 itself is attached to a rigid frame 178 which in turn is supported by a pair of laterally spaced, vertically disposed housing plates 179 and 180 which constitute the opposite side walls of the housing 176.

When the machine is in operation, the bottom-most card in the stack is advanced from the supply station forwardly in the machine during one cycle to a sensing station where its travel is interrupted temporarily to enable the aforementioned Hollerith openings therein to be read or sensed. Such sensing is accomplished in part by a sensing head SH, Figs. 5 and 21, which carries sensing pins arranged in a regular pattern, and which, when the head SH is lowered, are adapted to enter such openings as have been punched and are contained in the cards as C to identify the order of this card respectively as of one of the three orders, "print," "skip" or "expire." This action of the sensing pins in accordance with the identity of the card, conditions a selector in the machine, and once the sensing head is raised to free the card located thereunderneath for further travel, the subsequent course of the card through the machine is in accordance with its order as a "print," "skip" or "expire" card. Thus, if the card contains a first order address that is to be printed, the card is directed to the scanning head; if the card contains a third order address which is to be removed altogether from the mailing list, this card is passed into a reject or discard file; and if the card is neither a "print" nor an "expire," it becomes of the second order and is caused to "skip" or by-pass the scanning head for reinsertion in the original sequence back in to the mailing list.

In achieving this sequential feeding of the cards, a pair of reciprocating feed fingers or dogs are arranged to travel back and forth beneath the stack of cards in the supply magazine SM at the rear of the machine to engage the trailing edge of the bottom-most card in the supply stack and feed the same out through a gate in the supply magazine by a drive means that will now be described.

The machine illustrated includes two motors. One of the motors (not shown) is associated with the printing means embodied in the machine including the rotating helical slot at the scanning or exposure station and the rotating helical ridge at the printing head, since it is essential that these two rotating members be driven in perfect synchronism. The other motor, M-2, Fig. 23, is adapted to produce the remainder of the mechanical movements in the machine, and this motor is located in a cabinet CA, Fig. 1, which serves to support the housing 176 and which also houses most of the electrical components that are associated with the control of the machine. Motor M-2 is adapted to be energized separately by a toggle switch as TS at the back of the machine.

In effecting movement of the address cards one by one through the machine, three drive shafts are adapted to be driven by the motor M-2 through suitable gearing, clutches and transmitting means. One of these shafts, 210, Figs. 4 and 23, is constantly driven by the motor M-2 whereas the other two shafts include clutches that impart single revolutions thereto representative of a cycle of the machine. Attached to the aforementioned cabinet CA which houses the motor M-2 is a horizontal supporting bed 195, Figs. 1A, 12 and 14 to which is attached a vertical mounting plate 196, Fig. 12. The bed 195 also serves to support the housing 176 in a cantilever fashion by means as bolts 180B, Figs. 4 and 5, which connect mounting flanges as 180A, integral with the side plates 179 and 180 of the housing 176, to a skirt 195S on the mounting base 195.

The mounting plate 196 rotatably supports a shaft 205, Fig. 12, carrying a worm gear 205A, and this shaft is adapted to be constantly driven by a belt 201 and a pulley 202 fast on one end of the shaft 205, the belt in turn being driven by a pulley 200, Fig. 23, connected to the motor M-2. Meshed with the worm gear 205A is a worm wheel 206 carried on a worm wheel shaft 206A that is supported for rotation between a pair of mounting plates 197 and 198 secured in spaced relation on the main mounting plate 196 as shown in Fig. 14. At the other end of the driven shaft 206A is a pinion gear 207.

Arranged above the worm wheel shaft 206A as shown in Fig. 8 is the constantly driven drive shaft 210 referred to above, and this shaft is driven by a gear 208 thereon that is meshed with the gear 207 driven by the worm wheel shaft 206A. Shaft 210 extends transversely through the housing 176 that supports the supply magazine SM, as can be seen in Fig. 23, and is supported for rotation at one end in a bearing arm 181B, Figs. 1A, and 2, that is part of a main mounting block 181 supported by the bed 195. At the other end, the shaft 210 is rotatably mounted in a bearing bushing in the side of the housing 176. At the end corresponding to the bearing arm 181B, the drive shaft 210 carries a relatively large power transmitting gear 215 which, as will be appreciated from the foregoing, rotates constantly when the motor M-2 is energized. It is this gear 215 that transmits power to the clutches that are associated with the aforementioned clutch-controlled drive shafts, and in turn it is one of these latter two shafts that controls the means for advancing the address cards to and out of the sensing station.

Thus, as shown in Figs. 4 and 23, a drive shaft 240 adapted to have imparted to it one revolution in each cycle of the machine is arranged parallel to and somewhat above the constantly driven drive shaft 210 in the housing 176. In the present instance, the arrangement is such that shaft 240 is driven at a speed of 300 R. P. M. through a one revolution clutch located at the side of the housing 176 and generally indicated at 220, Fig. 1A. The clutch 220 includes a pinion gear 216, Fig. 2, meshed with the constantly driven transmitting gear 215 described above, and is in the nature of that shown and described in the application of Crink and Colyer, Serial No. 342,896, filed in the United States Patent Office March 17, 1953. Thus, the gear 216 meshed with the transmitting gear 215 includes a relatively short boss at the inner side thereof machined with clutch teeth representing a clutch element similar to the clutch element "159" described in the aforesaid Crink and Colyer application. The gear 216 and the clutch element carried thereby rotate constantly. Also included in the clutch 220 is a sleeve 217, Fig. 4, in which there is a canted slot formed in the periphery thereof like the slot "157" in the said Crink and Colyer application, and carried within this sleeve 217 for rotation therewith is the other clutch element similar to the clutch element "148" of the Crink and Colyer application.

Figure 3:
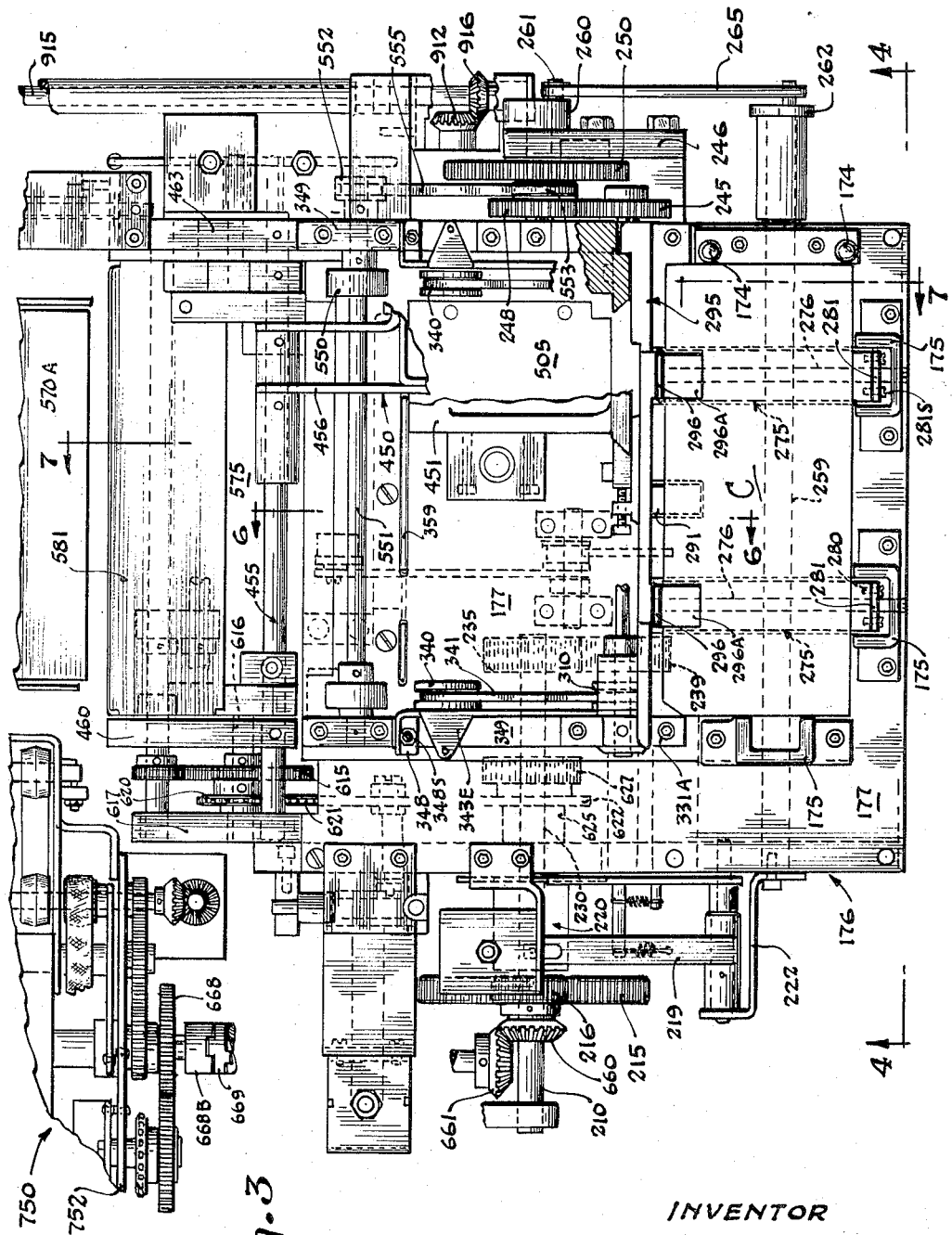
Fig. 3 is a top plan view of a further portion of the machine.

The arrangement is such that these two clutch elements are normally held disengaged by a pivotally mounted holding arm 219, Fig. 3, that has an opening in its forward end as shown in Fig. 1A, normally engaging a pin 220P, Fig. 4, on the said other clutch element projecting through the aforesaid canted slot in the sleeve 217. This holding arm 219 is under the control of a normally de-energized solenoid or relay 220SL, Fig. 8 herein, which is in series connection with an electrical circuit that controls the feeding of the cards from the supply magazine SM as will be described in greater detail further on this specification. For present purposes of disclosure, however, it need merely be realized that a control lever 221A, Fig. 8, attached to the armature 221 of this solenoid engages the forward end of the arm 219 which normally is held down over the aforementioned pin 220P by a spring 223, Fig. 1A, to maintain the clutch normally disengaged.

At its other end, arm 219 is supported for pivotal movement in a bracket 222, Figs. 1A and 3, that is fastened to the side of the housing 176. When relay 220SL is energized, the armature 221 is effective to lift arm 219 against the return action of spring 223, and the two clutch elements in the clutch 220 are then enabled to engage by a pair of springs 226 and 227, Fig. 1A, which serve to rotate the sleeve 217 in a clutch engaging direction as described in the aforesaid Crink and Colyer application. In this manner the clutch 220 picks up the rotation of the gear 216 and this rotation is imparted to a shaft 230 as will now be described.

Shaft 230 which is driven through the clutch 220 is supported in the side plate 179 of the housing 176 as can be seen in Fig. 3, and on the end of shaft 230 away from the clutch 220 there is a gear 235 which will be driven through one revolution each time the clutch 220 engages in a cycle of the machine. It will be realized that the clutch 220 thus described is but an example of a clutch for imparting one revolution to the shaft 230 in each cycle of the machine, and other known clutches of this kind may be resorted to if desired or found expedient. Gear 235 is meshed with a gear 239 that is carried at one end of the one revolution drive shaft 240, and at this end the shaft 240 is mounted for rotation in a bearing plate 241, Fig. 4, supported beneath the top of the housing 176. Shaft 240 extends laterally across the housing 176 parallel to shaft 210 and projects through the right hand side 180 of the housing 176 as can be seen in Fig. 4, and at least other end shaft 240 carries a transmitting gear 245 which serves to transmit power to those parts of the machine under the control of the one revolution clutch 220 as will now be described.

Spaced outwardly from the side plate 180 of the housing 176 and rigidly supported thereby is a relatively large vertical mounting bracket or arm 246, Fig. 5, which serves to rotatably support a stub shaft 247 at a medial portion thereof. This stub shaft 247 carries at its inner end next to the side plate 180 a gear 248, that is meshed with the gear 245 as can be seen best in Fig. 23. At the other end portion of the shaft 247 away from the side plate 180 is a relatively large gear 250 which plays an important role in the transmission of motion from the one revolution clutch 220 to various parts associated with the handling of the address cards in this part of the machine.

For feeding address cards one by one from the bottom of the supply stack in the magazine SM, means of a particular kind that will be described in more detail below are arranged to be reciprocated by the oscillation of a rock shaft 259, Fig. 4, which in turn is arranged to be oscillated each time the one revolution clutch 220 engages. To enable this to be accomplished, there is pinned to the outer end of the stub shaft 247 a collar 260, Fig. 5, on which is located eccentrically a drive pin 261, and it is this pin which imparts oscillation to the rock shaft 259. Thus, the rock shaft 259 as shown in Fig. 4 extends across the housing 176 in parallel relation to the two main drive shafts 210 and 240 and is supported rotatably in the side plates 179 and 180. An arm 262, Fig. 5, is mounted in vertical relation on the end of the rock shaft 259 corresponding to the stub shaft 247, and the upper end of this arm is pivotally connected to one end of a drive link 265 which in turn is pivotally connected to the pin 261 that rotates with the collar 260 on the driven stub shaft 247. It will be recognized that each complete rotation of the stub shaft 247 during engagement of the one revolution clutch 220 rotates the pin 261 through 360° to effect a complete oscillation of the rock shaft 259, and in this manner the means attached to the rock shaft for feeding address cards from the supply magazine are adapted to be reciprocated back and forth as will now be described.

Spaced feed dogs 275, Fig. 7, for engaging the trailing edge of the bottom-most card in the supply magazine and advancing this card toward the sensing station in a cycle of the machine are arranged in the present instance to reciprocate back and forth on horizontal guides in the form of a pair of spaced parallel guide rods 276 that are supported beneath the top wall 177 of the housing 176. In order that the feed dogs 275 may be operated in each cycle of the machine, a pair of vertical arms are mounted adjustably in spaced relation on the rock shaft 259 as by clamp bars 272 and screws 272S. The clamp 272 and the arm 270 embrace the rock shaft on opposite sides, and the vertical disposition of the arms 270 may be adjusted in this manner. At their upper ends, the arms 270 are each pivotally connected to the feed fingers 275 by means as angle brackets 274 which carry pins on which the upper ends of the arms 270 are pivoted, the brackets 274 being fastened to the underside of the feed dogs 275.

Spaced rectangular slots, in which the upper faces of the feed dogs 275 are exposed to slide along the underside of the bottom-most card in the supply magazine SM, are provided in the table 177 as shown in Fig. 3, and inclined risers 280, Fig. 7, at the rear of the dogs 275 project above the rear extensions of these slots so as to be slidable along and in engagement with the lower face of the bottom-most card in the supply magazine SM. Screw-mounted adjustably at the rear of each riser 280, is a feed blade 281 which in its adjusted position projects above the upper face of the riser 280 just sufficiently to assure engagement with a portion of the trailing edge of the bottom-most card only in the supply stack so that upon oscillation of the rock shaft 259 in a clockwise direction as viewed in Fig. 7 these blades 281 will be carried forward with the dogs 275 and engage the trailing edge of the bottom-most card in the supply magazine to force this card out through an exit gate 290 located at the front of the supply magazine. As the card is thus passed out through the gate 290, the leading marginal portion thereof is picked up by a pair of rotating feed rollers 310, Fig. 7, as will be described below.

The gate 290 at the front of the supply magazine is defined in part by an upwardly inclined or beveled ledge 291, Figs. 3 and 7, that projects through a corresponding slot at the front of the table 177 in the supply magazine. This ledge is inclined upwardly toward the exit gate 290, and above the ledge 291 is a cooperating guide blade 292 adjustably attached as by a screw 292A to the bottom of an upright mounting plate 295 which is supported at the front of the magazine SM on the side plates 179 and 180. This vertical mounting plate 295 also serves to provide ways for guiding the sensing head SH in its up and down movements, and the details of the manner in which such guiding relation is accomplished will be described below.

The opening in the blade 292 through which the screw 292A is passed is enlarged so as to permit the blade 292 to be adjusted vertically on the plate 295 relative to the opposed ledge 291, and in this manner the size of the feed throat or exit gate 290 may be adjusted to assure that a single address card only is permitted to feed from the supply magazine in a cycle of the machine. As a further assurance to an accurate and exact feeding of each such address card from the supply station, a pair of spaced guide arms 296, Fig. 3, are supported vertically on the rear face of the mounting plate 295 on either side of the blade 292. These arms are bent at their lower ends so as to provide shoes (not shown) which lie over and just above the forward portions of the slots in the table 177 in which the feed fingers 275 slide. The guide shoes thus afforded will be disposed over the top face of an address card advanced through the throat 290 by the feed fingers 275, and together with the beveled or inclined ledge 291 which imparts a slight upward movement to the leading portion of such an advancing card, will assure that this card is picked up by the feed rollers 310 in front of the gate 290 adapted to advance this card on to the sensing station in the same cycle of the machine in which the feed fingers 275 are operative to first feed the card thereto.

The sensing station whereat means are afforded to determine the order of each address card passing through the machine, is located along table 177 just in front of the supply station, and the feed means for transmitting each address card thereto from the bottom of the supply stack take the form of two pairs of knurled rollers 310, Figs. 7 and 17 to 19, that are disposed at either side and in front of the exit gate 290. Thus, there are four such rollers in the present instance, and the lateral spacing between the opposite pairs of rollers is somewhat less than the length of the address cards. Means are afforded, as will be described below, to dispose the bight between the vertical sets of rollers 310 accurately in alignment with the feed throat 290 so that a card advanced therethrough by the feed fingers 275 will be picked up by the rollers 310 in a positive manner, assuring that the same is fed forwardly to the sensing station in the proper time relation. Such is made possible by supporting the upper set of rollers 310 for rotation slightly above the table 177 as required by the location of the feed gate 290 and mounting the lower rollers yieldably in slots 310S, Fig. 19, in the table 177 through which the peripheries thereof may project to engage the upper rollers.

Thus, as shown in Figs. 18 and 19, the lower rollers 310 are each mounted for rotation on suitable axles supported at the respective ends of a pair of laterally spaced arms 311 that are pivotally supported on pins as 312 mounted at either side of the housing 176 forwardly of the magazine SM. These arms are each urged up toward the table 177 by springs as 313 attached to the ends of the arms 311 away from the respective lower rollers 310. Each spring as 313 is tensioned on a pin supported at the side of the housing 176 below the pins 312 as shown in Fig. 19, and in this manner the lower ones of the rollers 310 are normally disposed yieldably in the slots 310S provided therefor in the table 177 to engage the upper ones of the feed rollers 310.

To enable the upper feed rollers 310 to be driven rotatably, additional gearing related to and driven by the gearing above described is afforded in the form of a pair of gears 318 and 319, Fig. 4, that are carried on a stub shaft 320 which is supported for rotation at one end in the upper portion of the vertical mounting bracket 246 and at the other end by a mounting block 321, Fig. 5 which is formed as an integral side extension of the support plate 295 so as to extend along the side of the housing 176 corresponding to the side plate 180. Gear 318 is meshed with the gear 250 as shown in Fig. 5, and gear 319 at the other end of the stub shaft 320 is meshed with a relatively large gear 325 carried on a stub shaft 326, Figs. 17 and 23, which is rotatably supported in a block 322 fastened to the plate 295 just above the block 321. This gear 325 serves to impart movement to the sensing head SH in a manner that will be described presently.

Extending transversely of and above the table 177 just in front of the exit gate 290 is a shaft 330, Fig. 18, at the opposite ends of which the upper ones of feed rollers 310 are mounted for rotation. This shaft is mounted for rotation at one end in the block 321 just behind the stub shaft 320 as viewed in Fig. 5. The other end of shaft 330 is rotatably mounted in an eccentric bearing bushing 330B mounted in a block 331, Fig. 1A, that is integral with the plate 295 at the side thereof opposite the mounting block 321. The bearing 330B permits the shaft 330 and the rollers 310 carried thereby to be adjusted relative to the gate 290. Carried at the opposite end of shaft 330 and just to the rear of gear 325 is a gear 335 that is meshed therewith as shown in Fig. 5, and from this it will be seen that the shaft 330 and the feed rollers 310 carried thereon are rotated 360° by means of the gearing 318—319—325—335 in each cycle of operation for the one revolution clutch 220.

As was noted above, the paired upper and lower rollers 310 are so disposed as to grip the leading end of an address card advanced through the feed throat 290. Under these circumstances, this card is displaced somewhat above the table 177, and to relieve the address card in this condition as the card is advanced forwardly to the sensing station by the rollers 310, a pair of spring fingers similar to fingers 296 may be fastened in a vertical relation to the front face of the plate 295, so that the lower ends thereof will overlie and bear against the upper face at the leading end portion of a card to force this card emerging from the feed rollers 310 down against the table 177.

Also at the sensing station above the table 177, are another set of horizontally spaced feed rollers 340, Figs. 6, 17 and 19 that are displaced forwardly of the rollers 310 and which are adapted to be driven in timed relation therewith by means now to be described. Thus, below and paired with each such roller 340 is a smaller roller 340A adapted to engage the upper roller 340 through suitable slots as 340S provided therefor in the table 177. These rollers 340A are journably mounted for free rotation in brackets as 340B attached to the underside of the table 177.

The arrangement is such that the rollers 340 are spaced horizontally apart from one another as are the rollers 310, and the distance separating the forward set of feed rollers 340 from the rearward set 310 is less than the width of an address card, so that the latter is picked up at its leading end by the rollers 340 to be advanced against a raised stop means at the sensing station somewhat before passing out of the bight afforded by the rollers 310.

Thus, when properly in position at the sensing station, the address card is engaged by the feed rollers 340 at its leading end portion while being free of the rear rollers 310. The nature of this condition for the address card will be more exactly defined below in relation to the means that position the address card accurately for the sensing operation to be performed thereon. The feed rollers 340 will naturally slide on the address card under these conditions, but this is a momentary condition as will be appreciated from the description to follow, and moreover the rollers 340A at the underside of the card are free running.

The essential purpose of the forward set of feed rollers 340 is to advance each card out of the sensing station to a further station in the machine, and unlike the feed rollers 310 the rollers 340 hold the address card down on the table 177. This is so in order that the address card at sensing position will be flat on the table 177 to enable an accurate sensing operation to be effected in the first part of the machine cycle immediately subsequent to the cycle in which this card at the sensing station was advanced thereto directly from its position as the lowermost one in the supply stack. Thus, in this next subsequent machine cycle, the card located at the sensing station will be sensed to determine its order as print, skip or expire and in the same cycle will be passed on to a collecting station in the machine by the feed rollers 340 once the stop bar 359 has been depressed to enable this action to occur. It is therefore desirable that the rollers 310 and 340 be driven synchronously, since as the latter are effective to clear an address card from the sensing station the former are effective at the same time to advance a new card in to sensing position. Such synchronous operation is attained conveniently in the present instance by timing belts 341, Fig. 19, of a known kind which lap corresponding sprockets provided on the axes of the rollers 340 and the upper of the rollers 310, respectively. In this manner, rotation of the feed rollers 310 at the rear of the sensing station is imparted directly and synchronously to the rollers 340 at the forward end of the sensing station.

In order that the action of the rollers 340 will be positive, a flexible mounting, similar to that described above in connection with the lower set of rollers 310, is afforded for the rollers 340. In the present instance, this is achieved by supporting the rollers 340 for rotation at the forward end of a pair of laterally spaced, horizontally extended arms 343, Fig. 18, that are disposed along opposite sides of the sensing station, and at their opposite ends these arms are pivotally mounted on and adjacent either end of the shaft 330 which carries the rollers 310.

As shown in Figs. 17 to 19, upstanding ears 343E are formed at the forward end of the arms 343, and springs as 346 are tensioned between these ears and corresponding pins attached to the side plates 179 and 180, respectively, of the housing 176, tending to draw the arms 343 and the rollers 340 carried thereby down toward the table 177 into engagement with the idler rollers 340A.

In order that the rollers 340 may be adjusted relative to the table 177, and to the idler rollers 340A respectively paired therewith, stops in the form of lugs 348 at the end of the arms 343 adjacent the ears 343E carry adjusting screws as 348S adapted to engage the top side of blocks 349, Fig. 3, fixed in forward positions adjacent the opposite sides of the housing 176. These blocks 349 serve further to support other elements in the machine as will be pointed out below.

Each address card advanced to the sensing station by the feed rollers 310 must be accurately and precisely positioned, because it is here that the relatively small Hollerith openings punched in the address card to designate its order and status are to be sensed to set up controls at the sensing station corresponding to the order of the card (as print, skip or expire) at the sensing station. These controls include relays effective to pass each address card to a collector in accordance with its order and status in the mailing list, and the manner in which such are effective will be described separately hereinbelow.

To therefore assure that a card entering the sensing station is properly located to permit the openings therein to be sensed, a stop gate 359, Fig. 7, is arranged at the sensing station to engage the leading end of each address card and so locate the card that the openings therein will be aligned with precisely located sensing means adapted to register with such openings as are in the card. Co-operating with this stop gate at the sensing station is an additional positioning means serving to force and hold the card against the stop gate and to prevent any possible retrograde movement of the card during the sensing operation.

The stop gate 359 is in the form of a relatively narrow blade that extends across the table 177, and this blade is arranged to be raised and lowered relative to the table 177 at the sensing station during a cycle of the machine. Spaced rearwardly of the stop bar and projecting through appropriate slots 360S in the table 177, Fig. 6, at the sensing station are a pair of spring-mounted positioning dogs 360 which cooperate with the gate 359 to hold an address card in sensing position. The dogs 360 are arranged to shift back and forth in the slots 360S in the table 177 at the sensing station in the same cycle of the machine in which the stop bar 359 is raised and lowered, and these respective actions are cam controlled as will now be described.

As shown in Figs. 6 and 7, the dogs 360 are in the form of bell cranks mounted for pivotal movement on pins 365 attached at the upper ends of a pair of vertically disposed canted arms 366 which in turn are mounted at their lower ends on a rock shaft 367 located just beneath the drive shaft 240 in parallel relation thereto. In order that the dogs 360 may be depressed in the spaced slots 360S that are provided therefor at the sensing station, and at the same time be arranged for a positive forcing action in a forward direction against the trailing edge of an address card, the dogs 360 are normally spring-biased to a raised position as shown in Fig. 6. This bias is afforded by tensioning a spring 370, Fig. 4, between a pin 368 on each of the supporting arms 366 and another pin 369 carried at the lower end of the bell-cranks 360. The pins 369 project from either side of the dogs 360 as can be seen in Fig. 4 and thus are adapted to bear against the rear edge of the arms 366 to serve as limit stops for the action of the springs 370. It will be clear, however, that the dogs are free to rotate clockwise against the return action of the springs 370, and this is so in order that an address card entering the sensing station from the supply station may freely pass over the fingers 360 normally elevated in the slots 360S to be in line with a card passing between the rollers 310.

The rock shaft 367 on which the arms 365 for the dogs 360 are carried is adapted to be oscillated in each cycle of the machine, and this takes place in a timed relation such that the trailing edge of a card advanced through the feed throat 290 at the supply station, and over the dogs 360 by the feed rollers 310 to the sensing station, is followed by the dogs 360 shifting forwardly in the slots 360S to assure that this card arrives at the sensing station with the leading edge thereof engaged against the stop bar 359, which in the meantime has been raised above table level. The dogs 360 are further arranged to hold the card against the stop bar 359 at the sensing station at least until the sensing of this particular card by the sensing pins in the sensing head SH is completed, during the next cycle of the machine, whereupon, during the subsequent portion of this same cycle in which the card is sensed, conditions are established causing the dogs 360 to travel to the rear in the slots 360S so as to afford the same operation on the card next following. This rearward and forward action of the dogs in the slots 360S is attained by means of a pair of conjugate cams 373 and 374 that are arranged to oscillate the rock shaft 367 as aforesaid, and cooperating with these cams in this respect is a bell-crank lever 375 that is fast on the rock shaft 367. The bell-crank 375 carries, at the opposite ends of the respective arms thereof, a pair of cam followers 376 and 377, the follower 376 being allocated to the cam 373 of the conjugate system, and the other follower 377 to the cam 374.

The cams 373 and 374 are carried on the drive shaft 240 described above in connection with the clutch 220 so that the cams are rotated through 360° in each cycle of the machine where clutch 220 engages the relationship being such that the dogs 360 are held all the way forward by the lobe of the cam 373 engaging the follower 376 allocated thereto for about 260° of the cycle as shown in Fig. 27, whereupon the lobe of this cam during the remaining portion of the cycle rotates past the follower 376 and presents its dwell thereto. Just at the time the cam 373 is presenting its dwell to the follower 376, the lobe of the other cam 374 in the conjugate cam system engages the follower 377 allocated thereto, to force the bell crank 375 rapidly in a counterclockwise direction as viewed in Fig. 6, thus causing the rock shaft to oscillate in a direction which forces the arms 365 and the dogs 360 carried thereby to the rear in the slots 360S. This rearward movement of the dogs 360 under the action of the cam 374 on the follower 377 of the bell-crank 375 continues until shaft 240 attains a position of substantially 307° in the same cycle of operation when return action of the fingers 360 initially commenced as shown in Fig. 27, whereupon the dwell of cam 374 is presented to the follower 377 and the lobe of the other cam 373 reengages its follower 376.

Thus, the forward motion of the positioning fingers 360 is timed as shown in Fig. 27 to commence just after the trailing edge of an address card entering the sensing station of the feed rollers 310 passes beyond these rollers, at which time the fingers 360 are in their rearwardmost position as described above, so that the pusher fingers in their subsequent forward movement follow the trailing edge of the card passing beyond the rollers 310 to assist the stop gate 359, which in the meantime has been raised, in holding the card to be sensed accurately at rest in the sensing station. After 355° in the same cycle in which the fingers 360 are first shifted to the rear and then returned, the pusher fingers are again all the way forward in the slots 360S.

The timing of the stop gate 359 as shown in Fig. 27 is such that this stop is up during the time that the positioning fingers 360 are effective to travel in a forward direction. However, as will be pointed out in the description to follow, it is not until the next cycle of the machine that the address card thus framed by the stop bar 359 and the dogs 360 is sensed and thereafter advanced to subsequent stations in the machine in accordance with its order. The stop bar 359 in moving between raised and lowered positions relative to the top of the table 177 is controlled from the one revolution drive shaft 240. Thus, the gate 359 is mounted for vertical sliding movement in a block 380, Fig. 6, fastened as by a screw to the underside of the table 177. The stop 359 is carried by a plunger bar 382 slidably mounted in the block 380, and threaded studs as 384 are provided at either side of this plunger. At their lower ends, the studs carry nuts 384N. Mounted slidably on each of the studs 384 is a pair of headed collars as 385 in the relation shown, and acting between these collars on each stud is a spring as 386 serving to hold the plunger bar and the stop gate down below table level.

The bottom ends of the two plungers 384 bear against a pair of fingers 390 mounted on a rock shaft 391 that extends transversely beneath the platform 177 at the sensing station. This shaft 391 is supported by a pair of mounting plates 394 that are suspended from the underside of the table 177, and also connected to this same shaft is a vertical link 397 pivotally connected by a pin to the forward end of a horizontal transmitting link 400 which at its other end opposite the link 397 is pivotally attached by a pin to the lower end of an oscillatable link 403. The link 403 is adapted to actuate the link 400, and to this end is mounted for oscillating movement on a pin 404 that is supported by a bracket 405 at the underside of the table 177.

Carried at the lower end of the link 403 is a cam follower 410, Fig. 7, and associated with this follower is a conjugate cam 411 comprising a pair of individually adjustable cams having lobes 412A and 413A respectively. The two cams that thus comprise the conjugate cam 411 are carried on the shaft 240 in spaced relation to the cams 373 and 374 described hereinabove in connection with the feed dogs 360.

The adjustable cam 411 is adapted to engage the follower 410 in each cycle of the machine, and by adjusting this cam with respect to the lobes 412A and 413A the length of the effective lobe of the cam 411 presented to the follower 410 can be regulated. In this manner, the raising and lowering of the stop bar 359 may be timed accurately to the action of the feed dogs 360. Thus, referring to Figs. 6 and 7, it will be noted that the cam 411 for raising and lowering the stop bar 359 is shown approximately in the position it assumes simultaneously with the cams 373 and 374 illustrated in Fig. 6. Thus, at the time when the feed dogs 360 are in their rearwardmost position, the stop bar 359 is down, and as the shaft 240 is effective to carry the cam 411 counter-clockwise from the position illustrated in Fig. 7, the lobe of cam 411 engages the follower 410, causing the link 400 to shift forwardly and the fingers 390 to force the stop bar 359 up above the level of the table 177. Elevation of the stop bar 359 in this manner is completed after 315° of the cycle, and the lobes 412A and 413A of the cam 411 are effective to hold the stop bar up until after about 80° in the next subsequent cycle.

During the portion of the cycle in which the cam 411 is rotating counter-clockwise as described above, the cams 373 and 374 of course are also rotating in a similar direction, and shortly after the 315° position has been reached in the cycle, whereat the stop bar 359 has been completely elevated, the cam 373 is effective to cause the feed dogs 360 to shift forwardly to the forwardmost position illustrated in Fig. 6A. This forwardmost position of the dogs 360 is attained at 355° in the cycle, and the cam 373 is effective to hold the feed dogs 360 in this forwardmost position until after 260° in the next machine cycle.

The sensing head SH, Fig. 5, includes a generally rectangular frame 450, Fig. 17, that is open at the top and bottom, and carried in this frame is a relatively large horizontally disposed head 451 in the form of a rectangular block which carries a plurality of vertically mounted sensing pins 451P, Fig. 21, disposed in the head for yielding movement. The lower ends of these pins are tapered so as to be easily passed through the Hollerith openings punched into each address card. The head 451 is arranged for vertical up and down movement with the frame 450 above an address card positioned against the stop gate 359 at the sensing station, and in the present instance such vertical up and down movement of the head 451 is afforded by mounting the frame 450 pivotally at one end on a mounting shaft 455 that extends transversely across and above the table 177 somewhat forwardly of the sensing station. Thus, the opposite sides of the frame 450 are in the form of a pair of arms 456 and 457 each having a collar as 450C that engages about the shaft 455 to pivotally support the frame 450 as aforesaid.

Shaft 455 is supported at one end in a block 460 adjacent the left side of the housing 176 as viewed in Figs. 1A and 3, and at the other end is supported in a second block 463, Fig. 3, at the right side of the housing. These two blocks 460 and 463 serve further to support other parts of the machine as will be pointed out below.

It is essential, of course, that the head 451 in which the sensing pins are mounted be arranged accurately for its movement, since the relation between the sensing pins 451P and the Hollerith data carried by the address card is one of precision. Such accurate positioning of the head 451 is accounted for in the present instance by providing the block 451 with a vertically disposed saddle 470, Fig. 17. The head 451 and the saddle 470 are cast as an integral part, triangular reinforcing webs 451W being afforded between the head and the saddle. The saddle 470 has bevelled side edges 471 and 472 that are adapted to dove-tail into corresponding vertical ways afforded on the forward face of the vertical support plate 295 described above.

Thus, the mounting plate 295 has attached thereto at one side a vertically disposed guide bar 475 which is formed along its inner edge with a bevelled way 475W that is complementary to the aforementioned bevelled edge 471 on the saddle 470. Spaced from the guide bar 475 is another vertical way 476W which is afforded by the bevelled inner edge of a vertical extension 476 of the block 322 described above as serving to support the gear 325 and its shaft 326. Way 476W is bevelled complementary to the bevelled edge 472 on the saddle 470, and the two ways 475W and 476W are maintained in accurate spaced relation as by mounting bolts 475B which attach the guide bars affording these ways to the mounting plate 295. The left way 475W is arranged adjustably on the bolt 475B, and a lock screw 475S engaging the side edge of the bar 475 is provided for this purpose in a nut formed on the mounting plate 295.

In mounting the head 451 to the frame 450, a pin 481, Fig. 17 is carried between the webs 451W, and the portion of this pin between the webs 451W is embraced by a slot 481S, Fig. 21, formed in the end of the left arm 456 of the frame 450 as viewed in Fig. 17. In this manner, pivotal action of the frame 450 included in the sensing head SH will be translated into vertical up and down movement of the saddle for the block 451 traveling in the ways 475W and 476W, and the way in which these movements occur in the present instance will now be described.

As was noted in the description hereinabove, gear 325 plays a primary role in imparting movement to the sensing head. In the present instance, this is attained by a pair of cams on the shaft that carries the gear 325, these cams constituting a conjugate system adapted during one portion of the cycle to force the sensing head down to cause the sensing pins 451P to traverse such openings as are present in the address card at the sensing station, and in the other portion of this same cycle to effect return movement of the sensing head enabling the address card thus sensed to be advanced out of the sensing station. Thus, there are a pair of cams 490 and 491, Fig. 21, arranged on the stub shaft 326 with the gear 325, and associated with these cams are a pair of corresponding followers 493 and 494. These two followers are disposed in spaced relation to one another at the ends of respective fingers 457A and 457B afforded by bifurcating the side arm 457 included in the frame 450 as can best be seen in Fig. 21. The upper of these followers, 493, on the arm 457A, is allocated to cam 490, and the lower follower, 494, on the arm 457B, is allocated to cam 491. Cam 491 is adapted to force the sensing head SH down toward the address card located at sensing position, and cam 490, on the other hand, is arranged with respect to its follower to elevate the sensing head above the table 177 and hold the sensing head in this retracted position for a predetermined length of time until a new address card has been accurately located in sensing position. In this connection, it should be pointed out that in the present instance, the timing is such that the sensing head SH is first lowered to cause the sensing pins carried thereby to encounter the address card at the 5° position of the machine cycle, and the sensing head is raised to free the pins from the card at the 70° position in the same cycle. Therefore, the stop bar 359 is up during the time that the pins 451P are thus traversing the openings in the address card and the dogs 360 are in their forwardmost position behind the trailing edge of the address card being sensed. Such precision of movement is assured by the movements of the different cams that have thus far been described as rotating through 360° in each cycle of the machine.

The sensing pins 451P carried in the head 451 are arranged to actuate control means which are part of an electrical circuit that will be described separately hereinbelow and which constitutes a part of the control of the machine that will likewise be described in detail hereinbelow. To enable this relation between the sensing pins and the control means actuated thereby to occur, a rectangular block 505, Fig. 22, is supported in an opening provided therefor in the table 177 at the sensing station so as to underlie that area of the address card allocated to the identifying data punched therein. The block 505 includes openings as 506 arranged as shown in Fig. 21 to register with the sensing pins 451. Consequently, wherever there is a Hollerith opening in the address card located at sensing position on the plate 505, a sensing pin 451 corresponding thereto will be admitted to an opening as 506 in the block 505 as the sensing head is carried downwardly.

The sensing pins 451P are in the nature of those illustrated in Fig. 83 of the United States patent of Franklin E. Curtis No. 2,656,103, patented October 20, 1953. Thus, the pins 451 are mounted for yieldable movement between a pair of spaced plates 510 and 511, Fig. 21, carried at the underside of the sensing head 451. Mounting bolts 512 and corresponding tapped openings in the block 451 are resorted to for this purpose, and the heads of these bolts abut the underside of the lower plate 511. Collars 512C concentrically arranged on the shanks of the bolts 512 accurately space the two plates 510 and 511 from one another.

The upper plate 510 is provided with recesses corresponding in number and arrangement to that of the pins 451P, and the lower plate 511 is likewise formed with a plurality of openings registering with the sensing pins 451P. Each sensing pin includes an enlarged head 451H; heads 451H serve as stops normally engaging the upper face of plate 511 to locate the pins in limit positions. Springs 451S mounted on the shanks of the sensing pins enable the sensing pins to be pressed yieldably upwardly in the recesses in plate 510 in the event that there is failure of a sensing pin to encounter a Hollerith opening in the address card at the sensing station.

Disposed below the table 177 is a counterpart of the sensing pins in the form of additional pins 521 corresponding in number and arrangement to the sensing pins 451P. The pins 521 in this lower set are adapted to be engaged and actuated by those pins 451P for which there are Hollerith openings in the address card at sensing position, and when so actuated the pins 521 in turn establish contact with individual switches allocated thereto completing circuits to corresponding relays in a selector unit as will be described below.

The upper ends of the pins 521 include heads as 521H each disposed in corresponding ones of the openings 506 in the block 505. The lower ends of the pins 521 are mounted in similar openings afforded in a plate 522 suspended below the block 505 by bolts as 523 attached to the block 500. Threaded shanks of these bolts extend through openings in the plate 522 to another plate 530 therebelow, and nuts as 523N are afforded to clamp plate 530 to the bolts 523. Spacing collars 522C and 530C on the bolts 523 hold the plates 522 and 530 in spaced relation relative to the block 505.

The lower pins 521 located between the block 500 and the plate 522 each include springs 525 held under compression between the upper face of the plate 522 and collars 521C fixed on the pins 521 at intermediate portions between the opposite ends, and by this arrangement the heads 521H of the pins 521 are positioned to the be displaced downwardly by such sensing pins as are engaged therewith during the sensing operation.

Mounted in openings provided therefor in the plate 530 are individual switch contacts 535 associated with control circuits as will be described in detail hereinbelow, there being a contact 535 for each pin 521. The relation is such that the opposed ends of the pins 521 and the contacts 535 are normally open relative to one another so as to be closed only in the event of a sensing pin 451P depressing a pin 521.

To handle the three different orders into which the address cards may thus fall in the present instance, the machine includes a shuttle or collector 570 which receives each card passing forwardly in the machine from the sensing station, and this collector is adapted to classify or sort the cards into one or another of the three orders. Such sorting of the cards is achieved by providing the shuttle or collector with three different positions or levels, one level for each order that the machine is equipped to handle, and gates are arranged at the front of the collector such that depending upon which gate is open the address card passing from the sensing station will be arranged by order in the collector.

Thus, as shown in Fig. 7, the collector 570 includes an upper shelf 571 which corresponds to the "expire," or third order, an intermediate shelf 572 which corresponds to the "print" or first order, and a lower shelf 573 which corresponds to the "skip" or second order. For these different shelves, three different guideways are afforded between the sensing station and the collector 570: a guideway 582 that is aligned with the table 177 and with the print shelf 572; an upwardly inclined guideway 581 leading from the table 177 to the expire shelf 571 of the shuttle; and third, a downwardly inclined guideway 583 leading from the table 177 to the skip shelf 573 of the collector.

To advance each address card along one of the three paths afforded by the guideways 581, 582 and 583 into the proper level in the collector, it is necessary, of course, that a feed means be afforded therefor, and in this connection it will be recalled that each address card initially entering the sensing station from the supply magazine is engaged at its leading end portion by a pair of knurled feed rollers 340 which serve to hold the card against the stop gate 359. In effect, the feed rollers 340 rotate constantly so long as the clutch 220 remains engaged, so that when the stop gate 359 is lowered the rollers 340 are in condition to advance the card just sensed out of the sensing station and forwardly along the table 177 in the direction of the collector 570.

The forward motion thus imparted to the address card by the feed rollers 340 when the stop bar 259 is lowered, advances this card to a pair of horizontally spaced feed rollers 550, Fig. 3, which, like the feed rollers 310 and 340, are driven from the one revolution clutch 220. Thus, the rollers 550 are arranged in spaced relation on a shaft 551 therefor that is rotatably supported between the mounting blocks 349 adjacent the opposite sides of the housing 176. The end of the shaft corresponding to the right hand block 349 extends outwardly thereof as can be seen in Fig. 3 and has mounted thereon an idler sprocket 552. On the stub shaft 247 which carries the gear 248 and 250 as described above is a drive sprocket 553, and connecting the drive sprocket to the idler sprocket is a timing belt 555 whereby the shaft 551 is driven from the stub shaft 247.

Arranged beneath the feed rollers 550 are a pair of idler rollers 560, Fig. 6, adapted to engage the feed rollers through suitable slots provided therefor in the table 177 much in the manner as the rollers 340A are arranged below the feed rollers 340. Thus, the feed rollers 550 and the idler rollers 560 associated therewith are adapted to engage opposite sides of an address card advanced forwardly thereto from the sensing station by the feed rollers 340. To assure positive engagement of the rollers 550 and 560 with such an address card, the lower rollers 560 are journably carried at either side of a frame 562 arranged for pivotal movement beneath the table 177. In the present instance, such pivotal movement of the frame 562 is achieved by providing the frame with a projecting toe 562T on the top rear side thereof adapted to engage the underside of the table 177. Extended downwardly through enlarged guide openings formed in the frame 562 at the opposite sides thereof are a pair of studs 564 suspended from and mounted in the table 177. At the lower ends of these studs are adjusting nuts 564N, and springs 564S mounted concentrically on the studs 564 between the adjusting nuts and the underside of the frame 562 serve to yieldably force the frame upwardly to cause the rollers 560 to yieldably engage the upper feed rollers 550. Accordingly, the address card advanced forwardly from the sensing station by the feed rollers 340 will be gripped tightly between the rollers 550 and 560, and these will impart further advancing movement to the card in the direction of the collector 570.

In each of the three guideways 581, 582 and 583 leading to the different levels in the collector 570 are constantly driven feed rollers adapted to advance the address cards to the respective levels in the collector 570. The specific manner in which these three guideways are arranged at the front of the shuttle, and the manner in which the feed rollers therein are driven will now be described.

The two laterally spaced blocks 460 and 463, Fig. 3, described above as supported at the forward end of the housing 176 are relatively large in nature as can be seen in Figs. 7 and 8, and a heavy horizontal bracing bar 575, Fig. 7, is attached as by bolts to either end of these two blocks. The housing thus afforded by the spaced blocks 460 and 463 supports the separate guideways 581, 582 and 583 afforded at the front of the collector 570 and these guideways are conveniently afforded by corresponding plates secured to the inside walls of the supporting blocks 460 and 463.

Arranged along the print guideway 582 are a pair of spaced feed rollers 585 and 586, Figs. 7 and 10, adapted to be engaged by a pair of cooperating idler rollers as 585A, Fig. 7 projecting through slots provided therefor in the guideway 582, the idler rollers as 585A being supported in a frame that is removably mounted at the underside of the guideway 582 as shown in Fig. 7. The feed roller 585 is mounted on a shaft 587 supported for ratation between the blocks 460 and 463 at either side of the housing 176. Shaft 587 carries a gear 588, Fig. 8, arranged outwardly of the block 460 so as to be driven in a manner to be described below, and a suitable drive from shaft 587 to a shaft 589 for the feed rollers 586 is afforded as shown in Fig. 8. To enable the feed rollers 586 to be adjusted relative to guideway 582, shaft 589 includes a collar having an ear 589E, Fig. 9. A bracket 589B is suspended from a rod 589R extended between the blocks 460 and 463 and a slot in the bracket 589B embraces the ear 589E. The bracket is clamped in position by a screw 589S, so that by loosening this screw and shifting the bracket 589B vertically, shaft 589 for the feed rollers 586 may be selectively positioned relative to the guideway 582.

In a similar fashion, a pair of feed rollers 590 and 591 are arranged in spaced relation along guideway 581 leading to shelf 571 in the collector 570 allocated to the expire cards, and associated with these feed rollers are pairs of cooperating idler rollers 593 and 594 which are likewise supported for rotation in a frame removably mounted at the underside of the guideway 581 as shown in Fig. 7. Slots in the guideway 581 are afforded through which the idler rollers 593 and 594 may engage the associated feed rollers. The rollers 590 and 591 are mounted on respective shafts 596 and 597, Fig. 8, and at the ends of these shafts outwardly of the block 460 are respective gears 598 and 599. The gear 598 is driven in a manner to be described below, and a transmitting gear 600 on a stub shaft meshes with the gears 598 and 599.

Pairs of feed rollers 601 and 602 are arranged in spaced relation along guideway 583 leading downwardly from table 177 toward the lower or skip shelf 573 in the collector 570. These rollers likewise have associated therewith idler rollers 603 and 604, and the latter are supported for rotation in a removably mounted frame provided therefor at the underside of the guideway 583 as shown in Fig. 7. The idler rollers 603 and 604 are disposed in slots afforded therefor in the guideway 583. The pairs of feed rollers 601 and 602 are mounted in spaced relation on corresponding drive shafts 607 and 608, and these shafts carry respective gears 609 and 610 located outwardly of the block 460 as shown in Fig. 8. The gear 610 is driven in a manner to be described below, and a transmitting gear 611 is arranged on a stub shaft between the gears 609 and 610.

The respective pairs of feed rollers in the guideways 581, 582 and 583 thus described are adapted to be constantly driven from the drive shaft 210, Fig. 23. To enable such constant drive to be afforded to these feed rollers, the three gears 588, 589 and 610 are each arranged in an arc about and are engaged with a large transmitting gear 615, Figs. 3 and 9. This gear 615 is carried on a stub shaft 616 which is mounted between the block 460 and another block 617, Fig. 3, spaced therefrom in an outboard relation at the forward end of the housing 176. Carried on the stub shaft 616 between the blocks 460 and 617 is a sprocket 620 which is driven by a chain 621. The chain 621, as shown in Figs. 8 and 23, is connected to a drive sprocket 622 carried on a sleeve 625, and the sleeve 625 is concentric to and supported rotatably independently of the shaft 230 as shown in Fig. 4. At one end of the sleeve 625 is a driving gear 627, and this gear in turn is meshed with the gear 208 which serves to rotate constantly the shaft 210. In this manner, the chain 621 rotates the gear 615 constantly and in turn the various pairs of feed rollers in the three guideways 581, 582 and 583.

Associated with the three guideways 581, 582 and 583 leading to the different levels in the collector 570 are a pair of gates 642 and 643 which control the passage of address cards in to the various levels in the collector. As shown in Fig. 5, these two gates are connected to actuating arms 644 and 645 located at the right hand side of the machine as viewed in Fig. 23. The arms 644 and 645 are arranged to pivot on pins 646 and 647 respectively at the side of the machine so that a bell-crank effect is afforded for raising and lowering the associated gates 642 and 643. Springs 644S and 645S are attached to the ends of the arms 644 and 645 respectively away from the pivot pins 646 and 647, and these springs are tensioned on pins at the side of the housing 176 so as to hold the arms and the gates associated therewith in the normal positions shown in Figs. 5 and 7 wherein the disposition of the two gates 642 and 643 is such that a card advancing from the sensing station to the collector is normally passed directly in to the print shelf 572.

To control the passage of each address card into the collector 570, the gates 642 and 643 are, in turn, under the control of relays or solenoids 642SL and 643SL, Fig. 5. These solenoids are controlled by the selector in the machine, which it will be recalled is to be described separately hereinbelow, and for purposes of disclosure of the mechanical embodiment of the invention, it need merely be pointed out at this point that the armatures 642A and 643A of these solenoids are connected to the arms 644 and 645 intermediate the opposite ends thereof.

From the foregoing, it will be seen that if the gate

643, Fig. 7, is elevated into the notch afforded therefor in the underside of the brace bar 575 by solenoid 643SL energizing, this will close off both guideways 581 and 582, and the address card gripped by the rollers 550 and 560 will be directed down along the skip guideway 583 where it will be fed to the skip shelf 573 by the feed rollers 601 and 602. Hence, the solenoid 643SL is designated herein as the "skip solenoid."

In a similar manner, if the gate 642 is pivoted downwardly as viewed in Fig. 7 upon energization of solenoid 642SL to engage and block off the guideway 582, an address card directed toward the collector by the feed rollers 550 and 560 will be directed upwardly along the guideway 581 where it will be picked up by the feed rollers 590 and 591 and passed thereby to the expire shelf 571. Hence, the solenoid 642SL is designated herein as the "expire solenoid." It may be noted here that a cover 570A on the collector 570 overhanging the shelf 571 assures that cards of the expire order are collected therein as intended.

In addition to the skip and expire solenoids, the machine also includes a relay or solenoid 650SL at the side of the machine, Fig. 1A, designated herein as the print or conveyor solenoid, but since this solenoid is associated primarily in a connection other than the relations described above, description thereof will be delayed until the parts associated with this solenoid have been introduced. It may be pointed out, however, that when solenoid 650SL is energized, circuits to the skip and expire relays described above are broken to make doubly certain that the gates 642 and 643 remain in the normal positions illustrated in the drawings.

During the sensing operation on an address card, the controls in the machine, including the three relays or solenoids mentioned above, are set up in the selector such that when the address card is fed out of the sensing station by the feed rollers 340 and 550 at the completion of the sensing operation, the gates at the front of the collector in collecting position have already been positioned in accordance with the order of the card as "print," "skip" or "expire." Thus, if the card is a print card of the first order, the gates 642 and 643 remain in the normal position illustrated in Fig. 7. On the other hand, if the address card was sensed as being of the skip or second order, the skip gate 643 is raised to block off guideways 581 and 582 leading to the shuttle as described above, and if the address card was sensed as being of the expire or third order, the expire gate 642 is lowered to block off guideway 582. Therefore, in the same cycle of the machine in which it was sensed, the address card is located in one of the three shelves in the collector 570 allocated to the three different orders of cards that the present machine is equipped to handle.

The primary purposes of the collector 570 is to direct each card along a path for subsequent travel through the machine in accordance with its order, and in performing this essential operation the collector 570 is arranged to shift from a normal or collecting position at the end of the three guideways 581, 582 and 583 as viewed in Fig. 23, to the left to pass such print and skip cards as are in the collector to separate paths afforded therefor in a conveyor 750, Fig. 23. This occurs toward the end of the same cycle in which an address card of the print or first order was sensed, and it is important to also note in this connection that in this same cycle in which the collector shifts to the left to feed the print and skip cards to the card conveyor, the collector returns to normal collecting position. During this return movement of the collector, such expire cards of the third order as are on the shelf 571 are caused to be relieved from the collector and fed to a receiving hopper located at the right hand side of the machine as viewed from the rear in Fig. 23, so that these cards do not pass to the conveyor.

Thus, the net result of the sensing operation performed at the sensing station on each address card passed thereto from the supply magazine is to locate the cards at one of three levels in the collector 570, and means presently to be described, operating only as an incident to the passage of a print card in to the collector, are actuated to enable the cards in the collector to pass along separate paths in the machine consonant with the order of each card.

The means that are afforded for shifting the collector assure that such occurs only when a print card has been passed thereto from the sensing station. This feature of the machine is of primary importance since this results in the skip or second order cards, separated from the print cards in the collector 570, being subsequently re-arranged by the machine in a single stack together with the print cards in the original sequence. Such means includes a one revolution clutch 650, Fig. 2, supported at the left hand side of the machine as viewed from the rear between a pair of bracket plates 181C and 181D which are part of the bracket 181 supporting one end of the main drive shaft 210. Clutch 650 is driven from shaft 210 and is identical in operation to the clutch 220 except that it has a speed in the present instance of 100 R. P. M. to enable accurate printing to be performed.

It will be noted that a shaft, 655, Figs. 2, 8 and 23, is located to the left of the collector 570 at right angles to the shaft 210. Shaft 655 is supported for rotation in bearings mounted in the side plates of the card transport 750 and is arranged to drive the collector 570 in a manner to be described below. Clutch 650 is adapted to couple the drive of shaft 210 to shaft 655 so that the latter is driven at a speed of 100 R. P. M. each time the clutch 650 engages. Also driven from the shaft 655 are the means for advancing the copy material past the printing head, and these will be described below.

Clutch 650 is controlled by a control lever 656, Fig. 1A, connected to the armature of a relay or solenoid 650SL, Fig. 1A, which, like solenoid 220SL for the clutch 220, is adapted to be energized by controls associated with the sensing operation performed on each address card at the sensing station. Thus, the clutch 650 includes a holding arm 658, Figs. 1A and 8, which normally engages a pin 650P corresponding to the pin 220P of the clutch 220, and this holds the clutch 650 normally disengaged. The arm 658 at one end is carried on a sleeve 659 which is pivotally mounted on a pin 659A as shown in Fig. 2. The pin 659 is held in a pair of arms projecting from the side plate 179, and when the solenoid 650SL is energized, arm 658 is lifted by the lever 656 which enables clutch 650 to engage as described in the aforesaid Crink and Colyer application.

To drive the clutch 650, shaft 210, which is constantly driven, carries a bevel gear 660 at the end disposed adjacent the clutch 650. Gear 660 in turn is meshed into a bevel gear 661 which is supported for rotation in the bracket plate 181D. Gear 661 is constantly driven and is included as part of the driving element in the clutch 650 normally held disengaged from the driven element thereof by the control arm 656. The driven element of the clutch 650 includes a relatively large sleeve 666 and a driving dog 666A connected thereto. Forwardly of the clutch 650 is a gear 668, Fig. 1A, and this gear includes a dog 668A coupled to the dog 666A by an intermediate dog 669 as shown in Figs. 2 and 8. Gear 668 is pinned to the drive shaft 655 for the collector 570 and another gear 670, Fig. 11, behind gear 668 is also pinned to shaft 655. From this it will be apparent that when the clutch control arm 658 is lifted away from the stop pin 650P upon energization of the print solenoid 650SL, shaft 655 and the two gears 668 and 670 will be driven through one revolution.

The collector 570 in the present instance is driven by a cam rotated by the shaft 655. This cam is in the form of a slot 675S, Fig. 14, afforded in a relatively large drum 675, Fig. 12. The cam drum 675 is carried on a spindle 676 which is supported for rotation in a bushing 677B, Fig. 16, at the lower end of vertical bracket 677, and the bracket 677 in turn is suspended in an outboard relation on a post 678 supported in an upright relation by the bed 195 of the machine as can be seen in Figs. 12 and 16.

The end of the spindle 676 opposite the bushing 677B includes a dog 676D which is engaged with a drive dog 655D on the corresponding end of the drive shaft 655. Hence, the cam 675S is rotated through 360° of arc each time the clutch 650 engages.

Arranged at the side of the cam drum 675 next to the card collector 570 is an oscillatable arm 680, Figs. 12 and 14. This arm is pivoted at one end on a pin 680P carried in a block 681, Fig. 12, secured to the bed 195 of the machine. At its upper end, the arm 680 is pivotally connected to a link 682, and this link in turn is connected to an ear 688, Fig. 14, attached to the collector 570. Intermediate its two ends, the arm 680 carries a cam follower 690, Fig. 2, and this follower is disposed to ride on the cam 675S. The cam slot 675S is so configured that when the clutch 650 is disengaged, the follower 690 disposes the collector 570 all the way to the right as viewed in Fig. 14 in collecting position directly in front of the guideways 581, 582 and 583 to receive address cards from the sensing station. When the clutch 650 engages, the follower 690 in the cam slot 675S is carried to the left as seen in Fig. 14 which oscillates the arm 680 counterclockwise, and after 180° of clutch engagement the collector 570 is all the way to the left. As clutch 650 passes in to the second half of its cycle, the dwell portion of the cam 675S is presented to the follower 690, and arm 680 is oscillated in a return or clockwise direction to shift the collector 570 back to normal position.

The collector 570 is guided on a horizontal track supported in a fixed relation by the bed of the machine, and this track is afforded by a horizontal guide bar 695, Figs. 7 and 14, that is supported on a boss and post 695A secured to the bed 195 of the machine. The guide bar 695 is formed in the top and bottom sides with V-shaped upper and lower grooves as 695V, and ball bearings carried by the collector 570 are disposed to travel in the grooves 695V. Thus, a pair of spaced upper and lower horizontal guide bars 696 and 697, Fig. 7, are attached as by screws 598 in a horizontal relation to the lower end of a plate 699 at the back of the collector serving as a back stop for the card shelves. The guide bars 696 and 697 are each formed with V-shaped grooves complementary to the upper and lower grooves 695V in the guide bar 695 affording races for ball bearings as 700.

To prevent back-lash and assure a positive type of travel, the guide bar 695 carries a double faced rack 703, Fig. 14. The bars 696 and 697 on the shuttle also carry racks 704 and 705 respectively. A pair of upper and lower pinions 706 and 707 are arranged to travel on the complementary racks thus afforded, and these pinions are rotatably carried on a pair of elongated bars as 708A and 708B. The bars 708A and 708B are diamond-shaped in section as shown in Fig. 7 and the ball bearings 700 are loosely retained in corresponding slots milled in the sides of the bars 708A and 708B adjacent either end thereof. The arrangement thus described for imparting anti-friction movement of the shuttle 570 is of a known kind similar to the carriage of a typewriter, and, hence, further description is deemed unnecessary.

The conveyor 750, Fig. 1A to which cards of the first and second order are passed from the collector includes two guide channels aligned with the shelves 572 and 573 in the collector. The conveyor 750 includes a pair of relatively large spaced apart plates 751 and 752 which are supported by the bed 195 as shown in Fig. 11 so as to constitute a housing for supporting many of the parts associated with the conveyor.

The two channels or guideways in the transport along which the print and skip cards are adapted to pass are afforded by a pair of horizontal guide plates 755 and 756, Fig. 11, which are supported in spaced vertical relation in the conveyor as by brackets 758, Fig. 11. Extended along these guideways are feed means for advancing print and skip cards at the same speed through the conveyor, and in the present instance such includes respective pairs of feed belts 765 and 766 travelling along either side of the guide plates 755 and 756. The feed belts thus afforded are adapted to be driven cyclically at the same speed from the one revolution clutch 650 in a manner to be described below.

The guideway afforded by plate 755 is allocated to print cards of the first order so that these cards may be advanced through the conveyor to pass beneath a pair of apertures as 750A, Figs. 1A and 2, formed in a plate 755B arranged at the top of the transport just over the guide plate 755. Plate 755B is supported in this relation by a pair of brackets 755C, and the apertures 750A are aligned with a pair of scanning tubes as T, Fig. 1A, operatively arranged in a scanning head SC in which are mounted photoelectric cells to which the addresses delineated on the print cards are exposed to be printed from as described in my aforesaid application. The guideway afforded by plate 756 on the other hand is allocated to the skip cards which are not to be printed from, and hence these address cards pass through the conveyor 750 beneath the plate 755 without the aforesaid photoelectric cells being effective to scan the printed data thereon. However, since the arrangement in the present is such that the speed of both the print and skip cards along the respective guideways 755 and 756 is the same, it follows that as these cards reach the end of the guide plates 755A and 756A respectively the skip cards will drop into the collecting hopper first, and in this manner the original arrangement between these cards of different order in the mailing list will thereby be maintained.

The feed belts 765 and 766 each have horizontal runs as can be seen in Figs. 2 and 11, and there are a pair of such belts disposed in horizontal spaced relation at either side of the respective guideways so as to engage marginal portions at the opposite sides of the address cards passed in to the conveyor by the collector. For driving these feed belts, pulleys are afforded, and these pulleys in turn are driven from the one-revolution clutch 650. Thus, as shown in Fig. 2, a pair of drive pulleys as 770 are arranged between the side plates 751 and 752 of the conveyor. These pulleys are carried on a shaft 771, Fig. 13, and at the end of the shaft 771 disposed toward the clutch 650 is a bevel gear 771A, Fig. 11, which is adapted to drive the shaft 771 in a manner to be described below. Also arranged between the side plates 751 and 752 are two sets of idler pulleys as 773 and 774, Fig. 11, arranged forwardly of the drive pulleys 770. The belts 765 for advancing the address cards along the guideway 755 are passed about the pulleys 770 and 774, and intermediate these pulleys the idler pulleys 773 serve to urge the belts 765 downwardly toward positive engagement with another set of feed belts 765A so arranged that the print cards in the guideway 755 may be gripped on the top and bottom by feed belts.

The pulleys 770, 773 and 774 are carried in frames that are pivoted relative to the side plates 751 and 752, and since the arrangement is the same in each instance only the frame for the pulleys 770 will be described.

Shaft 771 is journaled at the end of a pair of arms as 775, Fig. 2, which are pivoted on a pin as 775A, Fig. 11, attached to the respective side plates 751 and 752. Springs as 775S are attached to the opposite end 775E of each arm 775, and the other ends of these springs are suitably anchored to the side plates 751 and 752. From the foregoing, it will be seen that in each instance, the pulleys associated with the feed belts 765 are effective to urge these belts down toward the belts 765A.

The two feed belts 765A are also driven by pulleys,

Thus, as will be clear from Fig. 13, a pair of driven pulleys 778 are mounted on a drive shaft 779 arranged between the side plates 751 and 752 directly beneath the corresponding shaft 771 for the pulleys 770. On the end of the shaft 779 disposed toward the clutch 650 is a bevel gear 779A adapted to drive the shaft 779 in a manner to be described below.

Associated with the drive pulleys 778 are two sets of idler pulleys 781 and 783, Fig. 11, about which the belts 765A are played. In this connection, it may be pointed out that the idler pulleys 781 are arranged so that more or less tension may be applied to the feed belts 765A, and to enable this to be accomplished the shaft which carries the pulleys 781 is disposed in a pair of slots as 785, Figs. 1A and 11, which allow this shaft to be shifted longitudinally relative to the transport. Brackets as 786 are disposed on either side of the transport, and these brackets support nuts in which adjusting screws as 787 are mounted. The adjusting screws as 787 are disposed to engage either end of the shaft on which the pulleys 781 are mounted, and by turning these screws the tension on the belts 765A may be lessened or increased.

The feed belts 766 in the guideway 756 for the skip cards are arranged exactly like the feed belts 765, and cooperating with the belts 766 are another pair of belts 766A disposed therebelow at either side the guideway 756 as shown in Fig. 13. It will be readily seen that the arrangement for driving the belts 766 is similar to the arrangement described above for driving the belts 765. Thus, there are a pair of drive pulleys 790, Fig. 13, for the belts 766 carried on a drive shaft 791 below the two shafts 771 and 779 on a center line therewith, and beneath the idler pulleys 774 and 781 on a center line therewith are a pair of idler pulleys 793 about which the feed belts 766 are passed. At one end, the drive shaft 791 carries a bevel gear 791A, and the way in which this gear is to be driven to drive shaft 791 will be described below.

Intermediate the two sets of pulleys 790 and 793 are a set of additional idler pulleys 795, and the pulleys 790, 793 and 795 are mounted in pivotal frames like the pulleys 770, 773 and 774 so as to be spring urged in a positive manner down toward the feed belts 766A.

The belts 766A cooperating with the belts 766 to advance skip cards through the conveyor are driven at one end by a set of drive pulleys 800 that are carried on a drive shaft 801. At one end of the drive shaft 801 is a bevel gear 801A adapted to drive shaft 801 in a way to be described below.

A pair of idler pulleys 805 are arranged at the ends of the belts 766A opposite the drive pulleys therefor, and intermediate these is a set of idler pulleys 809. An adjusting means 810 identical to that described above for the idler pulleys 781 is afforded to enable the tension on the belts 766A to be regulated.

To enable the print and skip cards to be accurately relayed from the collector to the conveyor, a feed belt 815, Fig. 11, aligned with the guideway 755 for the print cards is supported in an outboard relation at the end of the transport next to the collector 570, and a pair of cooperating feed belts 820 and 820A aligned with the guideway 756 for the skip cards are disposed in a similar relation. Cooperating with the feed belt 815 are two sets of spaced apart feed rollers as 821 and 822, Fig. 2. The feed rollers 822 are carried on shaft 771 described above as adapted to drive the pulleys 770, and the feed rollers 821 are supported for rotation on a shaft 823 carried between the arms 824 of a yoke-like frame 826. Shaft 771 is passed through the frame 826 as shown in Fig. 2, and the ends of the frame arms 824 away from the shuttle are pivoted on the pin 775A, Fig. 11.

To drive the feed belts 815, a pair of pulleys (not shown) is carried on shaft 779, Fig. 13. A pair of idler pulleys as 828, Fig. 11, is carried on a shaft 829 directly beneath the feed rollers 821, and this shaft is supported between a pair of arms as 830 attached to the end of the transport next to the collector. A guide throat in the form of a pair of spaced apart converging fins as 831 attached respectively to the outer end of the frame 826 and the arms 830 is afforded to direct the print cards passed from shelf 572 on the collector accurately in to the bight between the feed belt 815 and the feed rollers 821.

The arrangement for the feed belts 820 and 820A is similar. Thus, a frame 835, Fig. 11, is provided with side arms serving to support either end of a shaft 836 on which is mounted a pair of idler pulleys 837 for the belts 820. Arranged on shaft 791 intermediate the pulleys 790 are a pair of drive pulleys (not shown) for the belts 820. Frame 835 is, like frame 826 described above, mounted at the end of the transport so as to be urged yieldably downward toward the lower feed belt 820A. To enable the tension on belt 820 to be adjusted, frame 835 is slotted as shown in Fig. 11, and an adjusting screw means 838, Fig. 2, is associated therewith so that shaft 836 may be set in the desired position.

A pair of arms as 839 is attached to the conveyor beneath the frame 836, and between these arms is a shaft 840 carrying a pair of idler pulleys 841 for the belts 820A. Carried on shaft 801 intermediate the pulleys 800 are a pair of drive pulleys (not shown) for the belts 820A.

The drive pulleys and the belts in the conveyor thus far described are driven from the one revolution clutch 650. To this end, a vertical drive shaft 840, Fig. 11, is supported at the corner of the conveyor disposed adjacent the clutch 650. The upper end of shaft 840 is journaled in a bushing 841 supported by a housing 842, Fig. 1A, that in turn is attached to the mounting block 617. The lower end of the shaft 840 is journaled in a bushing 843 supported by a block 844 attached to the side of the conveyor as shown in Fig. 13. Arranged on shaft 840 are four bevel gears 846, 847, 848 and 849 meshed, respectively, with bevel gears 771A, 779A, 791A and 801A described above.

Carried on shaft 801 just behind the bevel gear 801A, as shown in Fig. 13, is a pinion gear 850, and this gear is meshed with a transmitting gear 851, Fig. 11, which in turn is meshed with gear 670 described above as carried on shaft 655 adapted to be driven through the one revolution clutch 650. In this way, 360° of rotation is imparted to shafts 771, 791 and 801 in each cycle wherein clutch 650 engages.

As will be pointed out in more detail below, there may be instances wherein a substantial number of address cards falling into the skip order may stack up in the collector, and these skip cards are to be passed as a group to the conveyor in the next cycle wherein a print card is sensed. As a consequence, shaft 791 which carries the drive pulleys 790 is arranged to shift vertically to the extent that it is necessary to accommodate such a stack of skip cards, and in the present instance this is attained by providing a flexible coupling between bevel gear 791A and bevel gear 848. Thus, a boss 855 is provided on bevel gear 848, and this boss is milled with a groove as shown in Fig. 13 for receiving a drive dog 856 attached to bevel gear 847. A bracket 858 is attached to boss 855 and this boss includes an angled arm 858A which at the other end is attached to a collar on bevel gear 791A. Shaft 791 is mounted between the side plates 751 and 752 for vertical movement, and hence is adapted to shift to accommodate a stack of skip cards passed into the conveyor from the collector, the dog and groove connection between the bevel gears 847 and 848 enabling this to be done.

The address cards leaving guideways 755 and 756 are passed on to the guide plates 755A and 756A, and at the opposite ends of these guideways are feed rollers which are adapted to eject the cards from the conveyor to the collecting hopper 757. Thus, as best shown in Fig. 1A, a pair of upper feed rollers as 860 are arranged along the guideway 755A to engage a corresponding set of lower feed rollers 861. The lower feed rollers are carried for rotation on a shaft 862 that is extended between the side plates 751 and 752. A yieldably mounted yoke-shaped frame 865 rotatably supports a shaft 866 for the upper rollers 860, and the opposite arms of this frame are pivoted on a pin 866A, which is extended between the side plates 751 and 752. Each arm in the frame 865 is provided with an ear as 868, Fig. 11, to which a spring as 868S is connected, and the other ends of these springs are anchored on the side plates of the conveyor, the arrangement being such that the frames for the upper rollers 860 are urged yieldably downward so that the feed rollers 860 and 861 afford a tight bight for gripping the address cards of the print order on guide plates 755A to eject these cards from the conveyor.

A similar arrangement is afforded for discharging the address cards of the skip order from the conveyor, including a pair of upper feed rollers 870 on a shaft 871 and a pair of lower feed rollers 872 on a shaft 873, these being cooperatively arranged as described above in connection with the feed rollers 860 and 861 for ejecting the print cards.

The feed rollers thus described for ejecting the print and skip cards from the transport are driven from a vertical drive shaft 874, Fig. 13, which as shown in Fig. 11 is arranged at the end of the transport diametrically opposite the vertical drive shaft 840. Shaft 874 is supported for rotation at its upper end in a bushing 875 and at its lower end in a bushing 876, these bushings being mounted in corresponding blocks 877 and 878 attached to the side plate 751 of the transport.

A bevel gear 880 on shaft 874 is adapted to drive a corresponding bevel gear 881 carried at the end of shaft 866 for the upper feed rollers 860, and the remaining feed rollers are driven in a like fashion as will be readily apparent from Fig. 13.

To drive shaft 874 from the one revolution clutch 650, a drive shaft 885, Fig. 11, is extended transversely of the transport 750 just behind the vertical drive shaft 874. At one end, shaft 885 carries a sprocket 886, Fig. 1A, aligned with another sprocket 887 carried on a stub shaft 888 supported for rotation at the side of the transport as shown in Fig. 14. At its outer end, the stub shaft 888 also carries a pinion gear 889 meshed with gear 668 described above as carried on shaft 655 driven by the one revolution clutch 650. A chain 890 is passed about the two sprockets thus afforded and is played over an idler sprocket 891 mounted on the side plate 752.

On shaft 873 which carries the feed rollers 872 described above is a pinion gear 892, Fig. 2, and this pinion is meshed with a transmitting gear 893 carried by the drive shaft 885. A bevel gear 895, Figs. 2 and 13, is carried at the end of shaft 873 opposite the pinion gear 892, and this bevel gear is meshed with a bevel gear 896 at the lower end of shaft 874. From the foregoing it will be seen that for each engagement of the clutch 650 the feed rollers 860, 861, 870 and 872 are rotated through 360°.

It may also be pointed out at this time that drive shaft 885 carries a relatively large cam 885C, Fig. 1A, which controls a normally open switch E18, Fig. 1A, the operation of which will be described in detail hereinbelow, the arrangement being such that switch E18 is closed toward the end of a cycle of rotation of shaft 885.

To cull or relieve address cards of the expire order from the mailing list, advantage is taken in the present instance of the return action of the collector 570 from the in-put end of the conveyor 750 back to normal position. As was noted hereinabove, address cards sensed as being of the expire order are collected on shelf 571 of the collector. Positioned at the side of the collector 570 away from the transport 750 is a vertically disposed yoke-like frame 895, Fig. 5, and for supporting this frame a relatively large bracket 896 is anchored to the forward end portion of the housing 176. This bracket includes a forwardly extending arm 896A on which the frame 895 is rested. An angle bar 897 is attached to the underside of the frame 895 as by bolts 897B, Fig. 5, and in turn is anchored to a portion of the arm 896A as by bolts 898.

A pair of horizontally extending shafts 900 and 901 are journaled for rotation in the sides of the frame 895 and these shafts carry a pair of upper and lower feed rollers 903 and 904, respectively, which have the bight thereof aligned with shelf 571 on the collector as shown in Fig. 14 so as to pass instrumentalities of the third order in the collector to a discard station 905, Fig. 23.

Inasmuch as the cards of the third or expire order, like the cards which are of the skip or second order, under some circumstances will stack up in the collector, it is necessary that the feed rollers 903 and 904 be flexible to accommodate such a stack. To enable this to be done, the opposite ends of shaft 900 are journaled in blocks as 906, Fig. 1, which are arranged for vertical sliding movement in ways 906W milled at either side of the frame 895, springs as 907S being afforded to yieldably hold the upper feed rollers down on the lower feed rollers.

It may here be pointed out that to enable the address cards arranged by order in the collector to be picked up by the conveyor when the collector shifts to the left as viewed in Fig. 14, the collecting position of the collector is such that the marginal portions of the print and skip cards overhang the left hand edge of shelves 572 and 573 as viewed in Fig. 14. Advantage is taken of this same relation to so position the address cards which are of the expire order that these cards will be fed into the bight between the rollers 903 and 904 when the collector returns from the conveyor 750 to normal collecting position. Thus, a kicker plate 910, Fig. 14, is attached to the end of the conveyor opposite shelf 571 on the collector in position to knock the expire cards overhanging shelf 571 from left to right as viewed in Fig. 14 so that when the collector commences its return action portions of the expire cards will overhang the right hand edge of shelf 571 in position to be fed to the feed rollers 903 and 904. In this connection, it will be noted that the right hand side of shelves 572 and 573 are provided with lips as 572A and 573A serving to push the print and skip cards into the conveyor.

Therefore, it will be seen that as the collector 570 shifts from the conveyor back to normal position at the end of each cycle corresponding to the sensing of a print card, address cards which are of the expire order will be passed to the feed rollers 903 and 904 and from thence in to the collecting hopper 905 so that these cards are relieved altogether from the mailing list.

The feed rollers 903 and 904 are driven constantly while the machine is in operation, and in the present instance this is attained by driving these rollers from the constantly driven main drive shaft 210. Thus, carried on a shaft 911 extended outwardly of the side of the housing 176 as shown in Figs. 3 and 23 is a bevel gear 912. At the other end of shaft 911 is a pinion gear 913 meshed with a transmitting gear 914, Figs. 4 and 23, carried on the main driven shaft 210. Outwardly of the housing 176 is another drive shaft 915 having at one end a bevel gear 916 meshed with bevel gear 912. Shaft 915 is supported for rotation in a pair of spaced apart blocks 918 and 919, Fig. 1, and at the end thereof opposite bevel gear 916 is a transmitting pulley 920. Shaft 901 which carries the lower feed rollers 904 is provided at one end with a drive pulley 921 driven from the transmitting pulley by means of a timing belt 922 as shown in Fig. 1.

The town marker and the passage of a card through the machine

Assuming that the first six cards in the supply magazine SM are all of the print order, the significance of which will be apparent from the description to follow, six cycles are required to pass the first such card from the supply magazine to the receiving hopper 757, Fig. 23, at the end of the conveyor 750. Thus, in the first cycle of engagement for the card feed clutch 220, which is a priming action as will be described below, the first instrumentality of the print order is advanced by the feed blades 275 and the feed rollers 310 against the elevated stop gate 359 at the sensing station, the positioning of the first card in this manner occurring toward end of the cycle as shown in the timing chart in Fig. 27. In the second cycle of engagement for clutch 220, in which the machine is conditioned for continuous automatic operation in a way which will be described below, the identifying data on the first card at the sensing station identifying this instrumentality as being of the print order is sensed, and this information is acted upon by the controls in the machine to condition the collector clutch 650 for engagement toward the end of this second cycle. The sensing operation, as shown in Fig. 27, is completed after about 73° in the second cycle, the stop gate 359 is lowered and the print card is passed from the sensing station by rollers 340 and 550 to shelf 572 in the collector, whereupon the control means enabling clutch 650 to engage are operative to pass the print card in the collector to the feed roller 821 and belt 815. The collector then returns to collecting position marking the end of the second cycle.

In the third and fourth cycles of the machine, the print card in the conveyor is passed by belts 765 and 765A to exposure position beneeath the scanning tubes T where the data thereon to be reproduced is printed from.

In the fifth cycle of the machine, the print card in the conveyor is advanced from guideway 755 to the discharge rollers 860 and 861, and in the sixth cycle of the machine the first print card is ejected by rollers 860 and 861 to the collecting hopper 757.

As was noted, the foregoing assumes that the first six address cards are of the print order, since under this circumstance clutch 650 is operative in each cycle. However, if a card of the second or third order be present among the first six cards advanced from the supply magazine to the sensing station, the clutch 650 will be rendered inoperative as will be described below for as many cycles as there are successive cards of the second and third order passed from the sensing station to the collector without an intervening card of the first order. Thus, clutch 650 is conditioned to engage only in those cycles where there is a print card at the sensing station, and until this condition is established cards of the second and third order pass successively to the collector where they are stacked or stored by order on shelfs 573 and 571 respectively. Therefore, such cards of the second and third order as are stored in the collector in this manner will not be passed to the conveyor or the expire card discharge means until there is a card of the first or print order passed to the collector.

Inasmuch as the data on the print cards to be reproduced are printed from only in these cycles wherein cards of this order pass beneath the scanning tubes T, it is necessary that movement of the copy strip MS, Fig. 1, at the front of the machine be correlated to advancing movement of cards of the first order through the station in the conveyor where the means enabling these cards to be printed from is located. In the present instance, such control for the copy strip MS occurs as an incident to engagement of clutch 650. Thus, to drive the copy strip past the printing head PH at the front of the machine, the copy strip is played around a drive sprocket 950, Figs. 1 and 23, and a drive for this sprocket is taken from shaft 655 driven as an incident to the engagement of clutch 650.

To this end, a drive gear 951, Figs. 12 and 16, is provided on the spindle 676 behind the cam drum 675. The drive sprocket 950 for the copy strip includes a spindle 953 supported for rotation in a bushing 954B, this bushing being provided in a mounting plate 954. At the end opposite the sprocket 950, the spindle 953 carries a pinion gear 955, and operatively meshed between this gear and gear 951 are three intermediate gears 957, 958 and 959 which transmit rotary movement from spindle 676 to spindle 950. In this manner, advancing movement is imparted to the copy strip MS only in those cycles where a print card at the sensing station conditions clutch 650 to engage.

The machine in the present instance includes a town marker in the form of a dye impregnated pad PD, Fig. 1, for marking the printed copy strip MS whenever there has been a change in address from one geographical status to another, and this pad is arranged to stamp the printed copy strip on that portion bearing the address representing such a change, from which it will be apparent that the means controlling the town marker needs to be correlated to movement of the printed copy strip advancing from the printing head PH, Fig. 1, at the front of the machine past the pad PD.

As will be described in more detail hereinbelow, each address card as C, Fig. 20, passing through the machine contains data identifying the geographical location of the addressee including town and state and further, if desired, zones in the larger cities. This data is sensed at the sensing station and the corresponding information is relayed to a comparing unit, Fig. 28. Since it will be recognized that this information to be acted upon by the town marker is obtained by the comparing unit well in advance of the corresponding address card passing through the print station, defined by the scanning head, some means must be afforded for storing this information until the same is to be acted upon by the town marker, and such in the present instance is in the form a mechanical storage device of a known kind controlled by the comparing unit in Fig. 28. Thus, at the front of the machine a rotatable storage drum 1000, Fig. 16, is arranged on a shaft 1001 to be driven as an incident to engagement of clutch 650 so that the storage device is operative only in connection with address cards of the print order which alone are of significance with respect to town marking.

Shaft 1001 carrying the storage drum 1000 is rotatably held at one end in a bushing 1003 supported by a bracket 1006, the bracket 1006 in turn being attached to the outer end of an arm 1007, Fig. 1, anchored to the bed 195 at the front of the machine. At the other end, shaft 1001 carrying the storage drum 1000 includes a relatively large pinion gear 1010. On the spindle 953 which drives the sprocket 950 for the copy strip is a drive gear 1011, and between this gear and the gear 1010 is a transmitting gear 1012 for imparting a drive from spindle 953 to shaft 1001 associated with the storage drum 1000.

A plurality of individually shiftable storage pins 1015, Fig. 16, are arranged about the periphery of the storage drum. These pins are normally disposed in retracted position in the storage drum by a spring urged holding detent as 1018 in the form of a ball engaging a circular groove 1019 adjacent the outer end of each storage pin.

The storage pins 1015 each include an enlarged head 1020 disposed when the pins are in retracted position to advance past a striker 1023 in the form of a bell crank. This bell crank is pivoted on a pin 1024 fixed beneath the storage drum and is normally held in retracted position just behind the path of the heads on the storage pins by a spring 1026, the arrangement being such that in each cycle of the machine wherein the storage drum is rotated the head of a storage pin is disposed opposite a striker head 1023H on the bell crank in position to be struck thereby and knocked from retracted position forwardlly to stored position wherein the holding detent 1013 engages a second or rearward groove 1027 in the shank of the storage pin.

The lower arm of the bell crank striker is connected to the end of the armature 1030 of a solenoid 1033, and it is this solenoid which when energized causes a storage pin carried by the drum 1000 to be shifted from retracted position to stored position as described above by pulling the bell crank in a counterclockwise direction as viewed in Fig. 16.

A disc 1035 corresponding generally in diameter to the storage drum 1000 is arranged on shaft 1001, and this disc includes a pin 1036 on which one end of a segmental arm 1039 is pivoted, the opposite end of this segmental arm including a pin 1041 to which is attached a spring 1042. The other end of the spring 1042 is attached to a pin 1043 on disc 1035 to yieldably hold the segmental arm against a stop at the back of the disc 1035.

Connected to the end of the segmental arm 1039 corresponding to the pin 1041 is a link 1045 which when the segmental arm 1039 is pressed outwardly by a storage pin in stored position as will be described below, is adapted to press the town marker stamping pad PD up against the under side of the copy strip passing over guide spools as SP, Fig. 1. To this end, the link 1045 is connected to one arm 1047 of a bell crank assembly 1048 as shown in Figs. 1 and 15, and the other arm 1049 on this bell crank is attached to the lower end of a vertical link 1050 extending upwardly at the front of the machine to the town marker stamping pad PD which is pivoted for tilting action against the under side of the copy strip as noted.

The inner edge of the segmental arm 1039 is formed with a cam surface 1039C the extent of which corresponds to one cycle of rotation for the storage drum, the arrangement being such that this cam surface is brushed by a storage pin in stored position. Therefore, when a storage pin 1015 in stored position is carried by the drum 1000 past the cam surface 1039C, link 1039 is pressed radially outwardly and the pad PD is tilted against the copy strip. Since the drum 1000 rotates but one step in a cycle where the clutch 650 engages, it will be appreciated that stepping of the drum 1000 in this manner will be so gauged that the stored pin as 1015 brushes the cam surface 1039C when the address causing the pin to be stored by relay 1033 appears on the copy strip MS at the spools SP.

To re-set the pins 1015 from stored to retracted position, a re-set plate 1029 having an inclined edge 1029W, Figs. 15 and 16, is arranged at the back of the disc 1035 so that the edge 1029W will wipe a stored pin 1015 and position the same in retracted position in advance of the striker head 1023H.

ELECTRICAL CONTROL CIRCUIT

*Starting and stopping the machine*

In the present instance, the printing machine is powered from two sources: wires E1 and E2, Fig. 24A, which are connected to the usual source of alternating current, and a rectifier E5 for delivering direct current. To energize the rectifier, a transformer E7 is afforded as shown, and this transformer is shunted across wires E1 and E2 by wires E9 and E10. To indicate the power on condition, a lamp E11 in a wire E12 is also shunted across wires E1 and E2.

The solenoid relays 220SL and 650SL which are associated with the card feed clutch and the collector clutch, respectively, as described above are indicated in the wiring diagram of Fig. 24A as solenoid relays E13 and E14, respectively. Solenoid E13 for the card feed clutch 220 is connected to wire E2 by a wire E16 as shown, and this wire leads through a normally open cam controlled switch E18 to another normally open switch E19 that is controlled by a power relay E20 as will be described below. From switch E19, a wire E21 leads to an input terminal at level "five" of a stepping switch E22, Fig. 24B, and certain of the contacts in this level of the stepping switch are connected to wire E1 by a lead out wire E23. As will be described in more detail below, level "five" of the stepping switch is arranged so that current normally flows therethrough provided that not more than ten skip cards arrive successively at the sensing station during the course of a run on a set of address cards. A normally open relay-controlled switch E-25 is shunted across the contacts in level "five" of the stepping switch E22 between wires E21 and E23 for a purpose that will also be pointed out below.

Shunting switch E18 is a wire E26, and connected to this wire is another wire E27 having in series therewith a normally open push button start switch E28 adapted to energize the solenoid or relay E13 through a normally closed switch E29 that is connected to wire E21 as shown. Switch E29 is also controlled by a power relay E20. Accordingly, by manually closing switch E28 momentarily, relay E13 is energized, and inasmuch as this relay controls operation of the clutch 220 an address card will thereby be advanced from the supply magazine to the sensing station, and this operation may be repeated.

The solenoid relay E14 for the collector clutch 650 is connected to wire E2 by a wire E30, and this wire leads through a normally open push button switch E31 and a normally closed switch E32 to wire E21. Switch E32 is also under control of the power relay E20. Accordingly, by manually closing switch E31 momentarily, relay E14 may be energized, and the collector 570 will be driven through one cycle in this manner.

As pointed out above, switches E19, E29 and E32 are controlled by a power relay E20, and in order for the machine to operate automatically this relay must be energized and held energized. To enable this to be accomplished, relay E20 is associated with a set of push buttons for starting and stopping the machine. Thus, relay E20 is connected to ground by a wire E36, and arranged in series with this wire is a pair of normally closed push button stop switches E37 and E38 and a normally open holding switch E40 which is under control of the power relay. Shunting switch E40 is a wire E42 having in series therewith a normally open push button start switch E43, and shunting the start switch E43 is a wire E45 having a normally open push button start switch E46 in series therewith.

The ground wire E36 for the power relay terminates at the input terminal of level "six" of the stepping switch E22 and certain of the contacts in this level of the stepping switch are connected to a lead out wire E48 which in turn is connected to a wire E49 that leads to the positive terminal of the rectifier. Level "six" is like level "five" described above, and it should also be pointed out that this level "six" of the stepping switch is shunted by a normally open relay controlled switch E50 arranged between wires E36 and E48. The reason for this will be pointed out below.

A wire E51 leads from the negative terminal of the rectifier, and the ground wire E36 is connected thereto as shown. From the foregoing, it will be seen that if either of the start switches E43 or E46 is momentarily closed manually, power is delivered to relay E20 from the rectifier, causing switches E29 and E32 to open so that the corresponding solenoids E13 and E14 can no longer be controlled manually through switches E28 and E31. At the same time, switch E40 controlled by relay E20 is closed which establishes a holding circuit for this relay from ground through level "six" of the stepping switch E22 and back to the positive terminal on the rectifier. Switch E19 controlled by the power relay is also closed conditioning solenoid relay E13 for automatic operation.

Switches E43 and E46 are multiple in nature in that each includes a second normally open set of switch contacts E43A and E46A. Switch E43A is in series with wire E26 which shunts the cam-controlled switch E18 in wire E16, and switch E46A is shunted across switch E43A in wire E26 so when either switch E43 or E46 is closed to energize the power relay as described above, relay E13 is energized inasmuch as switch E19 closes when the power relay is energized. However, in order for the machine to be set for automatic operation by closing either switch E43 and E46 momentarily, it is first necessary that there be an address card at the sensing station. Thus, a normally closed safety switch E53, Figs. 24A and 7, is arranged in series in wire E36 between ground and the holding switch E40 for relay E20. This switch is located at the sensing station just under a depressable spring biased trip button 540 carried at the underside of the sensing head SH as shown in Fig. 7. An opening 541 is afforded in table 177 at the sensing station in alignment with the trip 540, and the arrangement is such that an address card in proper position at the sensing station covers this opening. Therefore, if there is no address card at the sensing station over the opening 541, trip 540 carried by the sensing head will pass therethrough and open switch E53 immediately after commencement of a machine cycle. Thus, referring to the timing chart in Fig. 27, it will be noted that at the commencement of any machine cycle the arrangement of cams 490 and 491 for operating the sensing head is such that just prior to the end of a preceding cycle cam 490 has already commenced to lower the sensing head and that after 5° in the next cycle switch E53 will be closed by trip 540 as the sensing head is lowered, provided that there is no address card at the sensing station. As the sensing head continues to be lowered from the 5° position switch E53 continues to be held open, and it is not until cam 491 which is adapted to commence raising the sensing head after about 62° in a machine cycle that trip 540 is relieved from switch E53 after the 73° position for travel of the sensing head has been passed.

Therefore, unless there is an address card at the sensing station covering opening 541, the holding circuit for relay E20 will be broken ahead of switch E40 practically instantaneously upon manually closing either switch E43 or E46. Consequently, at the beginning of an operation on a set of address cards, it is first necessary to "prime" the machine by advancing an address card to the sensing station through momentary operation of switch E28 to energize the card feed solenoid E13 enabling shaft 240 to rotate through one cycle. If positioned normally at the sensing station, one end portion of the address card thus used to "prime" the machine will cover the opening over switch E53, and hence when the trip button encounters this card at the commencement of the next cycle the trip will merely be depressed and rendered inoperative as the sensing head continues to be lowered. It should also be mentioned here that in the absence of an addrss card at the sensing station, no power is delivered to the selector and the various selector circuits are rendered inoperative as will be apparent from the description to follow.

*The selector*

As was described above, selection and classification for purposes of disclosure in the present instance may be based on three orders for the address cards, and the way in which the selector is programmed to determine the order of each card at the sensing station will be described below. However, there will be described at this time the circuits for controlling solenoid relays 642SL and 643SL which are adapted to arrange the address cards in proper order in the shuttle.

The sensing pins 451P passing through such openings as are afforded in the address cards are adapted to energize a print relay E60 in the event that the address card at the sensing station is of the print order, or to energize an expire relay E61 in the event that the card at the sensing station is of the expire order. In the event that the address card at sensing station is determined to be neither of the print order nor the expire order, neither relay E60 nor E61 is energized, and such card automatically falls into the skip order. Further, if the address card is sensed as of the print order, conditions are established for energizing solenoid relay E14 which controls operation of the collector 570; if the address card at the sensing station is determined to be of the expire order, conditions are established for energizing a solenoid relay E65 corresponding to the expire solenoid 642SL described above, and if the address card at the sensing station is neither print nor expire, conditions are established for energizing a solenoid relay E66 corresponding to the skip solenoid 643SL described above.

The selector includes twenty individual sensing relays E70–1 to E70–20, Figs. 24A, 25 and 26, each in series with an individual wire as E71–1 to E71–20. At one end, the wires E71 are connected to a common bus wire E73 which leads through a normally open cam-controlled switch E75 to the positive terminal on the rectifier. At the opposite side of the selector relays, there is afforded a ground wire E74. It will be recalled that those sensing pins for which there are corresponding openings in an address card at the sensing station depress pins 521 causing the latter to close on contacts 535 during the time that the sensing head is all the way down. The plate 522 in which the pins 521 are carried is connected to ground by wire E74 as shown in Figs. 21 and 24A. Accordingly for each relay E70–1, through E70–20 there is afforded a normally open switch E76, Fig. 24A, corresponding to a contact 535 that is adapted to be connected to ground by wire E74 when a pin 521 is closed thereon.

Individual wires as E77 lead from each contact 535 at one side. These wires are adapted to be selectively connected to the selector relay wires E71 by patch cards as E78 in a manner to be described below, and in this way those of the selector relays connected by patch cards to the switches E76 will be energized in those instances where there is an opening in an address card corresponding to a switch E76 in the circuit of each selected relay E70.

A holding circuit is afforded for each of the selector relays. To this end, a bus wire E82 is connected to wire E51 as shown. Individual wires as E83 are extended from the bus wire E82 to the individual wires E71 of the selector relays, and arranged in series with each such wire as E83 are normally open holding switches as E85 each adapted to be closed when the selector relay corresponding thereto is energized. In this way, such of the selector relays as are energized during a sensing operation may be held in independently of the original energizing circuit until switch E75 opens.

As shown in detail in Fig. 26, there are associated with the selector relays two banks of twenty selector relay switch contacts each under control of one selector relay. One such bank includes a set of twenty normally open switch contacts E86–1 to E86–20 of which selected ones may be connected in series with the print relay E60. The other bank of selector relay switch contacts similarly includes a set of twenty normally open switch contacts E87–1 and E87–20 of which selected ones may be connected in series with the expire relay E61. Thus, for each selector relay there is a normally open switch contact as E86–1 to E86–20 corresponding to the print relay and a second normally open switch as E87–1 to E87–20 corresponding to the expire relay.

For purposes of more simplified description, single switches as E86–1 and E87–20 only have been illustrated in Fig. 24A as arranged in series with the print and expire relay circuits, respectively. Thus, a wire E90 is connected at one end to wire E73 and leads through the print relay E60. An output patch cord as E91 is afforded to connect a conductor E86B–1 at one side of the print relay switch contact E86–1 to the print relay as shown, and a similar input patch cord E95 connects a conductor E86A–1 at the other side of the print relay switch contact E86–1 to a wire E100 that leads through a normally open cam controlled switch E101 back to wire E51 leading to the negative terminal on the rectifier E5.

The expire relay E61 is shunted across the print relay. To this end, a wire E108 is connected at one side to wire E73 and leads through the expire relay to an output patch cord as E111 which is afforded to connect the expire relay to a conductor E87B–20 at one side of the expire relay switch contact E87–20. A conductor E87A–20 is connected by an input patch cord as E115 to a wire E116 which in turn is connected to wire E100.

From the simplified circuits for the print and expire relays thus described it will be seen that if the selector relay E70–1 or E70–20 corresponding either to switch E86–1 or E87–20 is energized, the corresponding print or expire relay is conditioned to be energized inasmuch as either switch E86–1 or E87–20 will close under this circumstance when the cam-controlled switches E75 and E101 are closed during a machine cycle. It should be pointed out in this connection, however, that inasmuch as no address card will ever correctly be both of the print and expire order, relays E60 and E61 will not energize together.

The print and expire relays are adapted to control circuits in the relay solenoids E13, E14, E65 and E66. Thus, as shown in Fig. 24A, a circuit for the collector clutch trip solenoid E14 is afforded between wires E1 and E2, and this is attained in the present instance by connecting wire E1 to wire E30 in between solenoid E14 and the push button switch E31. Arranged in series along wire E1 is a normally open cam controlled switch E121 and a normally open switch E122 controlled by the print relay E60. Hence, if the print relay is energized to close switch E122, solenoid E14 will be energized when switch E121 is closed, and this will cause the collector to be driven to and from the conveyor.

Shunting switch E18 in the circuit for solenoid E13 is a wire E125. Arranged in series along wire E125 is a normally open cam-controlled switch E126 and a normally closed switch E127 under control of the print relay E60. Hence, if the card at sensing position is not of the print order, switch E127 remains closed and solenoid E13 will be energized when switch E126 is closed in a machine cycle. This particular circuit will be discussed in more detail below.

The expire solenoid E65 is connected by a wire E130 to wire E2, and the skip solenoid E66 is similarly connected by a wire E131 to wire E2 so that the expire and skip solenoids are arranged in parallel. Wire E130 has in series therewith a normally open switch E135 that is controlled by the expire relay E61, and wire E131 has in a series therewith a normally closed switch E136 also controlled by the expire relay. The two switches E135 and E136 are connected by a wire E137. Connected between wire E137 and wire E23 is a wire E140 having in series therewith a normally open cam controlled switch E141 and a normally closed switch E142 controlled by the print relay E60.

Assuming that during a sensing operation the print relay E60 is energized, it will be seen from the foregoing that switch E122 controlled thereby in the circuit for the card feed solenoid relay E14 will be closed, and the arrangement is such that this switch is held closed until the cam controlled switch E121 is closed in the course of a normal operating cycle as will be described below. Consequently, in each cycle wherein there is a print card at the sensing station, solenoid E14 is energized and the collector 570 is shifted to and from the conveyor 750. Moreover, when the print relay is energized, switch E142 controlled thereby opens so that neither the expire nor skip solenoid E65 and E66, respectively, can be energized, and this assures that the gates 642 and 643 are maintained in normal position to pass the print card to shelf 572 in the collector 570.

On the other hand, assuming that the expire relay is energized during a sensing operation, switch E122 remains open inasmuch as the print relay is not energized, and consequently the collector 570 will not operate in this cycle but rather will remain stationary in collecting position. Moreover, when the expire relay energizes, switch E135 controlled thereby closes and switch E136 controlled thereby opens. Since it is assumed that the print relay is unenergized, switch E142 remains closed, and accordingly when the cam controlled switch E141 is closed during the normal course of the cycle in which the expire card was sensed, as will be described below, the expire solenoid E65 is energized but the skip solenoid E66 remains deenergized. Accordingly, gate 642 will be pulled down and the expire card will be directed upwardly to the expire shelf on the shuttle. Similarly, if neither the print nor expire relay is energized, the circuit for solenoid E66 assumes the normal condition shown in Fig. 24A, and this solenoid will energize when switch E141 closes to lift gate 643.

If it is desired to count the number of addresses printed from a set of address cards passed through the machine, a counter may be arranged for this purpose in the circuit for solenoid E14. Such is of a known kind and is operated from an electromagnet E145 connected by a wire E146 to wire E2. At the other end, wire E146 is connected to wire E1 between switches E121 and E122. To energize the coil E145 each time solenoid E14 is energized, a cam-controlled switch E147 is afforded in wire E146 and is adapted to be closed in each cycle of the machine in a way to be described below. A single pole switch E148 is arranged in wire E146 to enable the counter to be rendered inoperative when not needed.

*Selector and solenoid timing*

The cam controlled switches E75, E101, E121, E126 and E141 are all arranged to be closed by cams carried on a cam shaft which rotates through a complete cycle each time the one revolution clutch 220 is engaged. Thus, as shown in Fig. 4, a cam shaft 1200 is arranged for rotation in the housing 176 between the side plates 179 and 180 parallel to and below the main drive shaft 210. At one end the cam shaft 1200 is supported for rotation in a bearing 1201 mounted on the side plate 179, and at the opposite end the cam shaft is supported for rotation in a bushing bearing carried by a bracket 1205 that extends in an out-board relation away from the side plate 180. A mounting plate 1203 is supported by the housing 176 at the bottom thereof, and bracket 1205 is attached to one end of this plate in an upright relation.

Arranged in tandem relation as by brackets 1206 along the mounting plate 1205 are the various cam controlled switches having followers as 1207, Fig. 5, disposed opposite the corresponding cams on shaft 1200 that control operation of these switches. To enable the cam switch and the cams to be rotated through 360° each time clutch 220 is engaged, a gear 1208 is carried on the cam shaft 1200 and is meshed with a gear 1209 carried on a stub shaft 1210 at the side of the machine as shown in Fig. 5, gear 1209 in turn being meshed with gear 250 driven by the one revolution clutch 220.

Referring to the timing chart in Fig. 27, it will be noted that the selector timing switch E75 is closed by the corresponding cam on the cam shaft 1200 after 23° in the cycle and is held closed until the 350° position has been passed whereupon this switch opens. It will be also noted from the timing chart that the sensing pins are closed after 20° and opened after 55°, so that as the sensing pins pass through the openings in an address card to close the selector relay switch contacts E76, such of the selector relays as are energized in this manner will be held in by the holding switches E85 until the selector timing switch E75 is opened toward the end of the cycle.

The timing switch E101 for the print and expire relays is closed by the corresponding cam on shaft 1200 after 51° and is held closed until the cam shaft 1200 passes through the 345° position. Hence, the print or expire relay as the case may be is conditioned to be energized during the time that the sensing pins are closed, and if either of these relays is energized at this time the same will be held energized until switches E75 and E101 open toward the end of the cycle.

The cam controlled switch E121 in the circuit for relay E14 is arranged to be held closed between the 290° position and 340° position, and the same relation is true for the cam controlled switch E126 afforded in the circuit for relay E13. Inasmuch as the print or expire relay as the case may be is conditioned to be energized during this portion of the cycle as described above, it will be seen that if there is a print card at the sensing station switch E122 controlled by the print relay E60 will close and the clutch solenoid E14 for controlling the collector 570 will be energized between the 290° and 340° portion of the cycle during which switch E121 is held closed. At the same time, switch E127 controlled by the print relay opens. As a consequence of this, solenoid E13 for clutch 220 can be energized only if switch E18 is closed in wire E16, and the way in which solenoid E13 is energized by this circuit in those cycles in which there is a print card at the sensing station will be described below.

On the other hand, if the expire relay E61 is energized as the result of sensing, switch E122, which closes only when the print relay is energized, remains open and the collector 570 remains stationary. Furthermore, under the circumstance wherein the print relay E60 is not energized, the normally closed switch E127 controlled thereby enables solenoid E13 for the card feed clutch 220 to energize when the cam controlled switch E126 is held closed during the 290° to 340° portion of the sensing cycle.

The cam controlled switch E141 in the circuit for the expire and skip relays E65 and E66, respectively, is arranged to be held closed between the 80° position and 335° position of the cam shaft 1200 in a machine cycle, and hence switch E141 is closed during that portion of the cycle in which the print or expire relay E60 or E61 is conditioned to be energized as the result of the sensing operation. Consequently, if the expire relay E61 is energized to close switch E135, the expire solenoid relay E65 will be energized when switch E41 closes, inasmuch as switch E142 controlled by the print relay remains closed so long as the print relay is unenergized.

If neither the print nor expire relay is energized as a result of the sensing operation, solenoid E66 will be the one energized when the cam controlled switch E141 closes since both switch E142 controlled by the print relay and switch E136 controlled by the expire relay remain in the normally closed position.

As described above, the cam controlled switch E126 for the card feed solenoid relay E13 is arranged to be closed between the 290° position and 340° position, and consequently unless the print relay is energized to open switch E127 solenoid E13 is energized when switch E126 closes. Inasmuch as the closing of switch E126 occurs toward the end of a cycle, relay E13 is thereby conditioned at this time to elevate the control arm 219 for the clutch 220 away from pin 220P and, therefore, the operation of clutch 220 under those circumstances where the print relay is not energized is continuous from one cycle to the next. Thus, it will be seen that so long as there are no print cards passed to the sensing station, clutch 220 is effective in a continuous operation to advance skip and expire cards to the collector 570 without undergoing clutch disengagement. This is desirable since the collector 570 only shifts when a print card is advanced thereto, and, therefore, in the absence of this, the arrangement assures that skip and expire cards are passed at a high rate to the corresponding collecting shelves in the collector.

The cam controlled switch E121 in the circuit for solenoid E14 is arranged like switch E126 to be held closed between the 290° position and the 340° position. In view of the fact that the print or expire relay is conditioned to be energized during this portion of the cycle, it will be seen that under the third circumstance where there is a print card at the sensing station, switch E122 controlled by the print relay will close and the collector clutch solenoid E14 will be energized toward the end of the cycle when the cam controlled switch E121 closes. At the same time, switch E127 in the circuit for solenoid E13 is opened so that this relay E13 cannot be energized through the circuit afforded by wire E125. Therefore, to enable solenoid E13 for the clutch 220 to be energized in the cycle next following a cycle wherein a print card is advanced to the sensing station, switch E18, Fig. 1A, is arranged to be controlled by the cam 895 carried on shaft 873 which, as described above, is driven by the chain 890 only as a consequence of clutch 650 engaging, and the time relation is such that cam 895 is not effective to close switch E18 until toward the end of the operating cycle of clutch 650 when the collector 570 is returning from the conveyor back to normal collecting position. Hence, the circuit for solenoid E13 afforded by wire E16 and the normally open switch E18 is operative to energize the clutch solenoid E13 only in those cycles wherein a print card is sensed and passed into the shuttle 570, and it will be seen from this that the arrangement in the present instance is such that operation of clutch 220 is delayed or interrupted between a cycle wherein a print card is sensed and the next succeeding cycle so as to afford sufficient time for the collector to shift to and from the conveyor.

*Stepping switch E22*

In order to assure that an excessive number of skip cards will not stack up in the collector 570, a means is afforded to disable the machine in the event that more than ten successive skip cards arrive at the sensing station. This means in the present instance is in the form of a stepping switch E22 which is of a known kind and hence is illustrated in Fig. 24B by schematic representation only. However, for purposes of disclosure it may be pointed out that this switch includes six independent levels E201 through E206 having twenty individual contact points each, the contacts in each level being arranged in semicircular form. A wiper as E210 in the form of a conductor is allocated to each switch level, and these wipers each include a pair of conductor or contact arms disposed 180° apart and which are adapted to pass over the contacts in each level so as to bridge the next contact before passing off the last. All six wipers are mounted on a common spring-driven drive shaft E22A provided with a ratchet (not shown). A pawl (not shown) is afforded for holding the ratchet, and an electromagnet E215 is afforded for controlling this pawl. The arrangement is such that when the electromagnet E215 is energized, the holding pawl is retracted away from the ratchet tooth it had engaged and positioned to engage the next ratchet tooth. The driving spring (not shown) for the drive shaft E22A is deflected when the electromagnet E215 is energized so as to store mechanical energy, and upon de-energization of the electromagnet this spring is released forcing the pawl against the aforesaid next ratchet tooth to thereby advance the wiper shaft E22A and the wipers E210 forward one step on to the next set of contacts. At the end of the driving stroke thus accounted for, the holding pawl prevents overthrow and the wiper assembly is accurately locked in a known manner on the new contacts.

The driving impulses in the electromagnet E215 are produced by the switch itself such that rotation of the wipers is entirely automatic. As shown in Fig. 24A a relay E220 is connected between wire E2 and wire E131 for the skip solenoid E66 so as to be energized with the skip solenoid, and it is the energization of relay E220 which accounts in turn for energization of the stepping switch electromagnet E215. Thus, power is adapted to be delivered to the stepping switch E22 by arranging the electro-magnet E215 thereof in series with the rectifier E5. To this end, the electromagnet E215 is connected by a wire E221 to the juncture between wires E48 and E49. Wire E221 is connected at the other end to an input terminal E222 afforded for level E201 of the stepping switch, and an input conductor E222A is extended from this input terminal to the wiper of level E201. Each level of the stepping switch includes a like input terminal and input conductor for conducting current to the wiper and through the wiper to whichever of the twenty contacts is engaged by the wiper.

Arranged in series along wire E221 is a normally open contact E223 controlled by relay E220 and a normally open switch E225 controlled by a corresponding cam on shaft 1200. Of the twenty contacts in level E201, the first eleven only are connected to a common output bus wire E227, the remaining contacts twelve to twenty being dead. Wire E227 is connected to a wire E230 which in turn is connected to a wire E231 leading to the negative terminal of the rectifier E5. When in "home" or zero position shown, the wiper in level E201 is on the first of the eleven contacts so that when the cam controlled switch E225 first closes an impulse will be delivered from rectifier E5 to the coil E215 of the stepping switch E22 provided that in this cycle the relay E220 is energized to close switch E223, and when such occurs the wipers in the six levels of the stepping switch will likewise advance as aforesaid from the first to the second contact when switch E223 or E225 opens to de-energize coil E215.

In this manner, skip cards passing to the sensing station and effecting energization of the relay E220 will cause the six levels in the stepping switch E22 to step forward from one contact to the next when switch E225 closes and then opens in each cycle, the timing being such, as shown in Fig. 27, that switch E225 is held closed by its cam between the 140° and 200° position of the cam shaft 1200 during which time the skip solenoid E66 is adapted to energize.

A normally closed interrupter switch E235 is associated with a circuit for the electromagnet E215 and is so arranged as to enable the stepping switch E22 to be reset either manually under a circumstance to be described below, or automatically as an incident to a card of the print order following a skip card in to the sensing station. Otherwise, until such resetting relations are established, level E201 in the stepping switch E22 continues to automatically record and count successive skip cards not followed immediately by a print card, and in this connection it may here be pointed out that an expire card following a skip card through the sensing station does not account for any resetting of the switch E22.

Thus, to enable the stepping switch E22 to reset automatically, the third level E203 has the contacts two to twenty thereof connected to a common bus wire E240 which is connected to wire E230. The first of the twenty contacts in level E203 is not connected to wire E240, so that when the wiper for level E203 is at the home position shown no current can flow through level E203.

A relay E242 is connected to the juncture between wire E48 and wire E49 leading from the positive terminal of rectifier E5, and from relay E242 a wire E243 is connected to the input terminal afforded for switch level E203. Arranged in series with wire E243 is a normally open switch E245 controlled by a relay E248, Fig. 24A. This relay is connected by a wire E249 extended, as shown, between the circuit for relay E220 and the circuit for solenoid E14. Hence, the circuit for relay E248 includes switches E121 and E122 described above and accordingly can only be energized when the cam controlled switch E121 closes in those cycles in which the print relay is energized to close switch E122.

From the foregoing, it will be seen that when the wiper for level E203 of the stepping switch is on any one of the contacts two to twenty, but not on the first contact, the detection of a print card at the sensing station will result in swich E245 controlled by relay E248 being closed, whereupon current will flow through level E203 and energize relay E242.

When relay E242 is energized in this way, the interrupter switch E235 is opened, and to enable this to be accomplished switch E235 is arranged in series along a wire E255 connected between wire E243 and wire E221 for the coil E215. Also in series with wire E255 are two normally open switches E256 and E257 controlled by relay E242. When relay E242 is energized as described above, these latter two switches close, and switch E256 affords a holding circuit for relay E242 as will be pointed out below. Inasmuch as switch E235 is normally closed, a circuit is completed to coil E215 through level E203 of the stepping switch when relay E242 is energized each time a print card is sensed at the sensing station. Accordingly, coil E215 for driving the stepping switch E22 will energize to open the normally closed interrupter switch E235 causing coil E215 to de-energize which in turn causes the stepping switch to move one step forward as described above. Upon de-energiaztion of coil E215, the interrupter E235 again assumes its normally closed position, but since the relay E242 is held energized by the holding circuit established by switch E256 current will again be delivered to coil E215 through level E203 and the closed interrupter switch E235. Coil E215 energizes once more, switch E235 is again opened, coil E215 thereupon de-energizes and the wipers in all levels advance forwardly an additional one step. This alternate energization and de-energization of the stepping switch electromagnet E215 continues until the wiper in level E203 passes off the twentieth contact around to home position on the first contact which is dead, whereupon circuit to relay E242 through level E203 is broken and the stepping switch E22 has been reset. It will be appreciated, of course, that the wipers in the other five levels of the stepping switch advance simultaneously with the wiper in the third level in the manner described above.

Since, under most circumstances, chances are that the major proportion of address cards will not be of the skip order, it is advantageous to have the first contact in level E203 of the stepping switch dead which assures that the stepping switch will not go through a resetting cycle until after the stepping switch has advanced forwardly at least one step.

It will be recognized that if it were not for the normally open switch E257 in wire E255, relay E242 might be energized through level E201 when switches E223 and E225 closes inasmuch as the interrupter switch E235 is normally closed. Hence, by arranging switch E257 between relay E242 and switch E235 such assures that relay E242 will energize only through the circuit afforded by wire E243 in the manner described above.

Assuming that no print card intervenes between eleven successive skip cards passed from the supply station to the sensing station, the wiper in level E201 will pass from contact eleven on to contact twelve when the electromagnet E215 de-energizes for the eleventh successive time. Under this circumstance, the wipers in the other five levels of the stepping switch E22 in each instance are also stepped on to contact twelve. In this connection, it will be recalled from the description set forth hereinabove that the circuits for the card feed clutch solenoid E13 and for the collector clutch solenoid E14 are arranged in series with the fifth level E205 of the stepping switch. This fifth level is like the first level E201 in that only the first eleven contacts are connected to wire E23, so that after the eleventh skip card is sensed at the sensing station without any print card intervening (which means that there are ten skip cards stacked in the collector) circuit for solenoids E13 and E14 is broken at level E205. This occurs when the cam controlled switch E225, afforded for timing the coil E215, opens after 200° in the cycle during which the eleventh successive skip card was sensed to cause the wiper in level E201 to pass from the eleventh contact to contact twelve which is dead. Thus, by the time the cam controlled switch E126 which times the operation of solenoid E13 closes at the 290° position in this same cycle, circuit to solenoid E13 has already been broken, and the eleventh skip card is held at the sensing station rather than being passed to the collector 570. Clutch 220 cannot engage, and in like manner clutch 650 is disabled.

Level E206 of the stepping switch is similar to levels E201 and E205 in that only the first eleven contacts thereof are connected to wire E48. It follows from this that when the presence of the eleventh skip card is detected at the sensing station, the wiper in level E206 will be positioned on contact twelve which is a dead contact, and in this manner the power relay E20 is also disabled when eleven skip cards are passed to the sensing station without a print card intervening.

Level E202 of the stepping switch is arranged to enable the stepping switch to be manually reset under the circumstances where the machine has been disabled as described above when ten skip cards are stacked in the collector. Thus, the first eleven contacts in level E202 are all dead, whereas contacts twelve to nineteen inclusive are each connected to a lead out bus wire E260 which in turn is connected to wire E230. The twentieth contact in level E202 is connected to wire E231 by a wire E261, and arranged in series with wire E261 is a reset push button switch E265. The input terminal for level E202 is connected by a wire E266 to a point on wire E255 between switches E235 and E257, and from this it will be seen that when the wipers in the various stepping switches have all been advanced to the twelfth contact as described above, level E202 is effective to establish a circuit through the normally closed interrupter switch E235 to coil E215. Consequently, the stepping switch will commence to reset as described above since current is now delivered to the interrupter switch S235 through contacts twelve to nineteen in level E202. However, when the wiper in level E202 passes from the nineteenth contact onto the twentieth contact which is dead, circuit to coil E215 is broken and the stepping switch is stopped short of a complete reset.

It will be appreciated that this partial reset of the stepping switch to the twentieth contact in each of the levels is a rapid occurrence, and in order to indicate to the operator of the machine that a maximum number of skip cards have been passed into the collector, a lamp E269 is arranged in series with level E204 in the stepping switch. Thus, a wire E270 is connected at one end to wire E49 and at the other end to the input terminal afforded for level E204 of the stepping switch. Wire E230 terminates at contact twenty in level E204, and all of the contacts but the twentieth in level E204 are dead. The arrangement in each level of the stepping switch is such that when the arm of the wiper is on the twentieth contact, the other arm is on the input terminal, and it follows that when the wiper in level E204 is on the twentieth contact as aforesaid, wires E230 and E270 are bridged and current passes through this level of the stepping switch to light lamp E269.

To step the wipers around from the twentieth contact to home position whereat the stepping switch is completely reset, switch E265 is manually closed momentarily, and inasmuch as the wiper arms in level E202 bridge wires E261 and E266 at this time, coil E215 is energized once more, switch E235 thereupon opens to de-energize coil E215, and the stepping switch resets with all wipers at home position.

A normally closed switch E271 controlled by relay E242 is arranged in series with lamp E269 in wire E270, and this assures that lamp E269 does not light when the stepping switch resets automatically through relay E242. In like manner, switches E25 and E50 which shunt levels E205 and E206 assure that circuit through wires E21—E23 and E36—E48 is not broken when the stepping switch E22 resets automatically.

After the stepping switch E22 has been re-set through switch E265, the collector 570 containing ten skip cards is shuttled from collecting position to the conveyor by the operator actuating switch E31, the power relay E20 having dropped out when the wiper in level E206 passed from the tenth to the eleventh contact as described above. The collector having now been cleared of the maximum number of skip cards, the automatic start switch E43 or E46 is closed, and since it is assumed that there is a skip card (the eleventh successive one) at the sensing station, the machine is again conditioned for continuous automatic operation.

*Programming the selector—Figure 25*

In Fig. 25, there is illustrated diagrammatically the control panel used with the present machine together with a simplified program for introducing the more detailed program, illustrative of an actual problem which is shown in Fig. 26, and, therefore, the description following below is concerned primarily with the circuit shown in Fig. 25.

To enable only predetermined ones of the twenty selector relays E70 to be energized and these in turn to control the print and expire relays, a patch panel E150, Fig. 25, which is a counterpart of the area on each of the address cards that is allocated to control data in the form of punched openings therein is afforded at the back of the machine. Referring for a moment to a typical address card C that is illustrated in Fig. 20, it will be noted that this card is marked with a row of numbers "one" to "eighty" inclusive and the location of each such number corresponds to a vertical column extending across the card wherein openings such as those shown may be afforded at positions corresponding to the arrangement of the sensing pins 451P. For purposes of disclosure, columns "fifty-seven" to "seventy" will be considered alone since it is within this area of the card that identifying data is to be punched for controlling the address cards passed out of the sensing station. Thus, with relation to magazine subscriptions, for instance, these columns may be identified and allocated as follows:

|  | Column |
|---|---|
| Type | 57 |
| Magazine | 58 and 59 |
| Term | 60 and 61 |
| Expiration date: |  |
|     Month | 62 |
|     Year | 63 and 64 |
| Class | 65 |
| State | 66 and 67 |
| City | 68 through 70 |

With the exception of column 62 allocated to "month," the remainder of the columns on the card C each have ten individual positions whereat an opening may be formed, and the column excepted has twelve positions corresponding to the twelve months of the year.

In affording control data in cards of the foregoing kind, the "Type" column may be utilized in magazine subscriptions for identifying the type of subscription possessed by the addressee whether he be a donee, a regular subscriber, a solicited subscriber, or the like and the ten positions in this column enable these different types to be coded. The titles of different magazines may likewise be coded in the next two columns. Thus, magazine "A" may have the code "14" and magazine "B" may have the code "29." In like manner, the longevity of a magazine subscription on an annual basis may be coded in the two columns allocated to "Term."

For indicating expiration dates three columns are afforded, one column containing twelve positions for identifying the month of the year and two columns for designating the year. In the present instance, each month occupies a position in the column correspondingly as it is the sixth, tenth and so on month of the year. Thus, January has position one, February position two, and so on. In the year column, the years may be coded on the basis of the last two numerals. Thus, for indicating an expiration in 1950, "50" is punched, and similarly in 1960 "60" is punched.

Magazine notices or the like are often based on certain classes of subscribers such as professional, institutional and the like, and such group classification may be coded in the ten positions afforded in the "Class" column.

As will be described in more detail hereinbelow, the present machine includes a town marker whereby the address strip after being printed may be marked when there is a change in a set of printed addresses from one town or community to another, and five columns on each address card are allocated to data of this kind: two columns to enable the State to be identified, and three columns for communities within any particular State.

The sensing patch panel E150 shown in Fig. 25 is generally representative of a portion of the aforesaid area on each address card in that this panel includes nine vertical columns corresponding to the columns "Type" through "Class" (columns 57 through 65) as described above, and in these nine columns are vertically spaced apart sockets or switch jacks as E151 corresponding in number to the various different data positions that may be occupied by an opening punched in an address card. It may here be pointed out that inasmuch as the town marker associated with columns 66 through 70 on the address card is one requiring no programming, the sensing patch panel 150 has no switch jacks corresponding to this sub-division of control data which will be considered separately hereinbelow.

In a similar fashion, the sensing pins 451P in the sensing head are arranged column-wise within an area identical to the area of each address card that is to contain control data, such that for each possible position in the aforementioned columns on an address card there is a sensing pin adapted to be aligned therewith. Thus, for each column on the address card with the exception of the month column there are ten individual sensing pins, and for the month column there are correspondingly twelve sensing pins as can be appreciated from Figs. 21 and 22.

As shown in Fig. 25, the wires E77 leading from the contacts 535 terminate at the switch jacks E151 arranged columnwise on the sensing patch panel E150. Below the sensing panel E150 is a second patch panel E157 which is a counterpart of the arrangement for the twenty selector relays. Twenty bus bars E158 corresponding to the twenty selector relays are arranged in spaced vertical relation at the back of the selector panel E157, and afforded in each bus bar for purposes of flexibility are five switch jacks as E159 into which one end of a patch cord may be inserted, as will be described below, to connect a wire E77 terminating at the sensing panel E150 to a selected one of the twenty bus bars on the selector relay patch panel E157, the other end of such patch card being connected to a switch jack on the sensing panel E150.

Leading from the respective bus bars E158 are the wires E71–1 through E71–20 described above for the corresponding selector relays E70–1 through E70–20, and for purposes of clarity only the circuits for relays E70–1, E–70–5 and E70–20 are shown in Fig. 25.

Arranged below the selector relay patch panel E157 are a pair of divided patch panels E160A and E160B that are associated with the print relay E60, and on these panels are arranged twenty pairs of bus bars as E161A and E161B corresponding to the twenty bus bars on the selector relay patch panel. Arranged in each such bar for the purpose of flexibility are three switch jacks as E163. At one side of the two print relay patch panels is an output bus bar E165 connected to the print relay E60 by wire E90 described above, and at the other side of the print relay patch panels is an input bus bar E166 arranged in series with wire E100 described above. Each bus bar E165 and E166 includes five switch jacks as E167.

The pairs of bus bars 161A and 161B afforded in the print relay patch panels are individually connected in series through a corresponding one of the normally open print relay switches E86–1 to E86–20 described above, wires E86A–1 through E86A–20, Fig. 26, each being connected to corresponding ones of the bus bars E161A in the upper set, and wires E86B–1 through E86B–20 each being connected to corresponding ones of the bus bars E161B arranged on the lower print relay patch panel E160B. Accordingly, it will be seen that when a selector relay is energized to close a switch E86, a corresponding pair of bus bars in the upper and lower print relay patch panels is electrically coupled, and it is this relation which enables the selector to be programmed for those of the address cards that are to be printed. Thus, if a patch cord is extended from a switch jack E167 on the input bus bar E166 to a switch jack as E163 in a bus bar as E161A in the upper print relay patch panel E160A, and if a second patch cord is likewise extended from a switch jack on the correspondingly paired bus bar E161B in the lower print relay patch panel to a switch jack on the output bus bar E165, the print relay will be energized upon closure of the cam controlled switches E75 and E101, provided that a selector relay is energized to effect closure of the switch E86 that corresponds to the paired bus bars in the print relay panels thus connected by patch cords to the input and output bus bars E166 and E165.

In a similar way, a pair of divided patch panels E170A and 170B are afforded for the expire relay E61, and on these panels are arranged twenty paired bus bars as E171A and E171B each provided with three switch jacks as E173. The upper of these bus bars are individually connected by the above-described wires E87A–1 through E87A–20, Fig. 26, to one side of the normally open expire relay switches E87–1 to E87–20 controlled by the selector relays, and the lower ones of the bus bars in the expire relay patch panel are connected to the opposite sides of the switches E87–1 to E87–20, Fig. 26, by the above-described wires E87B–1 through E87B–20. Arranged in series with wire E100 and connected by wire E116 to the input bus bar E166 for the print relay patch panel is an input bus bar E176 for the expire relay patch panels. In like manner, an output bus bar E177 is afforded for the expire relay patch panels, this bus bar being connected to the expire relay by wire E103 described above. The input and output bus bars E176 and E177 each includes five switch jacks as E178, and from this it will be recognized that a circuit similar to that described above in connection with the print relay is afforded for the expire relay whereby the machine may be programmed for those address cards that are of the expire order.

For purposes of simplicity an arbitrary program is illustrated in Fig. 25 since such is illustrative of any other condition which might be programmed and hence is typical of the more detailed conditions to be described below in connection with Fig. 26. In this regard, it will be assumed that those address cards pertaining to a magazine coded as "59" are all to fall into the print category, whereas those address cards pertaining to a magazine coded as "9" are to fall into the expire order. These codes occur of course as punched openings at corresponding positions in columns 58 and 59 of the address cards as described above. Further, selector relays E70–5 and E70–20 are in this instance arbitrarily chosen to be energized upon each occurrence at the sensing station of an address card bearing the code "59" as aforesaid, and selector relay E70–1 is likewise arbitrarily chosen to be energized by an address card bearing code "9" as aforesaid. An address card satisfying neither code will automatically fall into the skip category. The plugging for these conditions is as follows:

It will be recalled from the description set forth with regard to Fig. 24A that for each selector relay conditioned to be energized a patch cord as E78 is afforded, and in carrying out the program illustrated in Fig. 25 three such patch cords E78–1, E78–5 and E78–20 are used to condition relays E70–1, E70–5 and E70–20 respectively. Thus, to enable relays E70–5 and E70–20 to energize simultaneously when an address card bearing the aforesaid code "59" is sensed at the sensing station, a patch cord E78–20 is extended from switch jack "five" on the sensing patch panel in column 58 to any one of the five switch jacks afforded in bus bar "twenty" on the selector patch panel corresponding to relay E70–20. Similarly, a second patch cord E78–5 is extended from switch jack "nine" to column 59 on the sensing patch panel to any one of the five switch jacks in bus bar "five" on the selector patch panel corresponding to relay E70–5.

It will also be recalled from the description set forth above in connection with Fig. 24A that input and output patch cords E95 and E91 respectively are afforded for the print relay E60. To complete the program for the print relay E60, the input patch cord E95 is connected between a switch jack on the input bus bar E166 and a switch jack on the fifth bus bar (selector relay E70–5) in the print relay patch panel E160A that corresponds to conductor E86A–5. A second patch cord E180 is extended from a switch jack in the fifth bus bar (selector relay E70–5) on the print relay patch panel E160B corresponding to conductor E86B–5 to a switch jack in the twentieth bus bar (selector relay E70–20) on panel E160B, and the output patch cord E91 described above in connection with Fig. 24A is extended from a switch jack in the twentieth bus bar (selector relay E70–20) on panel E160A to a switch jack on the output bus bar E165 connected by wire E90 to the print relay E60.

From the foregoing, it will be seen that if an address card arrives at the sensing station bearing the code "59" in the "Magazine" columns, relays E70–5 and E70–20 will be energized during the period that the cam controlled switches E75 and E101 are closed, and in this manner the code "59" is held in by these two of the twenty selector relays. When selector relays E70–5 and E70–20 energize in this manner, the normally open switches E86–5 and E86–20 respectively associated therewith close and this completes a circuit from ground through the input patch cord E95 to bus bar five in panel E160A; through wire E86A–5 and closed switch E86–5 to wire E86B–5; from wire E86B–5 to bus bar five in panel E160B; out patch cord E180 to bus bar twenty in panel E160B and wire E86B–20; through wire E86B–20 and closed switch E86–20 to wire E86A–20 and bus bar twenty in panel E160A; from bus bar twenty in panel E160A to the output patch cord E91 and the output bus bar E165; and from the output bus bar E165 through wire E90 to the print relay E60 and back to ground. Accordingly, an address card coded as "59" in the manner described above causes the print relay E60 to energize, whereupon this address card leaving the sensing station will be directed to the print shelf 572 in the collector 570.

With regard to the program for the expire relay, patch cord E78–1 is first extended from switch jack nine in column 58 on the sensing panel E150 to a switch jack corresponding to the first bus bar on the selector patch panel E157; hence, the selector relay E70–1 is conditioned to be energized each time an address card arrives at the sensing station bearing the expire code "9" described above. It will be recalled in connection with the description of Fig. 24A that input and output patch cords E115 and E111 respectively are afforded for the expire relay E61. In Fig. 25, this input patch cord is extended between a switch jack on the input bus bar E176 to a switch jack of the first bus bar (selector relay E70–1) on panel E170A, and the output patch cord E111 is extended from a switch jack of the first bus bar (selector relay E70–1) on the lower expire relay patch panel E170B to the output bus bar E177. Therefore, when an address card arrives at the sensing station bearing the expire code "9," relay E70–1 will be energized when the cam controlled switches E75 and E101 close, and the normally open switch E87–1 controlled by the selector relay E70–1 will close to couple the first of the paired bus bars in the expire patch panels E170A and E170B. This completes a circuit from ground through the input patch cord E115 to bus bar one on patch panel E170A; through wire E87A–1 and closed switch E87–1 to wire E87B–1; from wire E87B–1 to bus bar one on panel E170B and the output patch cord E111; through patch cord E111 to the output bus bar E177; and from the output bus bar E177 through wire E103 to the expire relay E61 which is thereupon energized.

*Programming the selector—Figure 26*

In Fig. 26, there is illustrated a program of the kind which may be encountered in actual practice. In this instance, it is assumed that the undertaking is to mail descriptive or promotional literature to the subscribers of a magazine entitled "Fifo" which previously has been coded as "60" by identifying data punched at corresponding positions in columns 58 and 59 in each "Fifo" address card in the list. It is further desired that "Fifo" address cards bearing expiration dates of March, 1952 through December, 1952, together with "Fifo" address cards bearing expiration dates in the five year period 1953 through 1957, have the addresses appearing thereon reproduced on the mailing strip MS so that all of corresponding addresses will be in receipt of the foregoing literature. Thus it is assumed that mailing of the foregoing literature is currently undertaken in March 1952 such that all subscribers in the mailing list having subscriptions expiring on or after this date will be in receipt thereof.

A common system employed in mailings of this kind is to extract from the mailing list those address cards corresponding to subscriptions which have expired in the seventh month preceding the current date while "skipping" through the machine, without being printed from, those address cards corresponding to subscriptions which have expired within the six month period preceding the current date. Thus, in this instance, inasmuch as the current mailing date is assumed to be March 1952, address cards bearing the expiration date of August 1951 are to be culled from the mailing list and collected in the expire shelf of the collector 570, while those cards corresponding to expirations in September through December, 1951 together with like cards for January and February, 1952 are to be passed to the skip shelf of the collector so as to be passed through the conveyor 750 without being printed from and rearranged with the print cards in hopper 757 in the original sequence.

Therefore, the foregoing program will be based on the following three conditions:

(1) Print "Fifo" for March through December 1952 together with all subscriptions for the five year period 1953 through 1954;

(2) Expire "Fifo" bearing the expiration date of August, 1951;

(3) Skip all others.

Inasmuch as "Fifo" is common to both the print and expire condition, the code "60" must be programmed both in the print patch panel (E160A—E160B) and the expiration patch panel (E170A—E170B) and in the present instance selector relays E70–18 and E70–19 are chosen to represent the two digit code "60." Accordingly, a patch cord E300, Fig. 26, is extended from switch jack "6" in column 58 on patch panel E150 to a switch jack on patch panel E157 corresponding to selector relay E70–18, and a second patch cord E301 is extended from switch jack "0" in column 59 on patch panel E150 to a switch jack on panel E157 corresponding to selector relay E70–19.

As was noted in the description above, column 62 on the sensing patch panel E150 allocated to the month includes twelve switch jacks numbered as shown in Fig. 25 for each month of the year. Inasmuch as subscriptions to "Fifo" which expired in August, 1951 are those to be withdrawn or culled from the mailing list, a patch cord E305 is extended from switch jack "8" in column 62 on panel E150 to a switch jack on the selector panel E157 corresponding to selector relay E70–10, so that selector relay E70–10 is thereby allocated to the month of August. At the same time, it is necessary to associate selector relay E70–10 with a pair of selector relays for the year 1951. This is attained by extending a patch cord E306 from switch jack "5" in column 63 of patch panel E150 to a switch jack on the selector patch panel E157 corresponding to selector relay E70–1, and a second patch cord E307 is extended from switch jack "1" in column 64 on patch panel E150 to a switch jack on the selector panel E157 corresponding to selector relay E70–17. Accordingly, selector relays E70–1 and E70–17 represent the last two digits 5 and 1 in the year 1951.

To program March, 1952 through December, 1952, which is a print condition, a patch cord E310 having multiple plugs at one end is plugged into switch jacks "3" to "7" and "9" to "12" in column 62 on panel E150, and the other end of this patch cord is plugged into a switch jack on panel E157 corresponding to selector relay E70–3. In this way, selector relay E70–3 represents all months except January, February and August. Similarly, as it was necessary to associate relay E70–10 for the month of August wah a pair of relays E70–1 and E70–17 corresponding to the year 1951, it is likewise necessary to associate relay E70–3 with a pair of relays corresponding to the last two digits "5" and "2" for the year 1952. However, inasmuch as the digit "5" has already been associated with relay E70–3, it is only necessary to extend a patch cord E311 from switch jack "2" in column 64 on panel E150 to a switch jack corresponding to relay E70–2 in panel E157.

To program subscriptions occurring in the five year period 1953 to 1957 as a second print condition, a patch cord E312 having multiple outlets at one end is plugged into switch jacks "3" through "7" in column 64 on panel E150, and the other end of this patch cord is plugged into a switch jack on panel E157 corresponding to selector relay E70–20. Again it is to be noted that the digit "5" for these years has already been represented by relay E70–3.

The third print condition August, 1952, is automatically programmed as an incident to the foregoing. Thus, August, 1952 will be represented by relay E70–10 (August) and relays E70–1 and E70–2 (for 1952).

It will be appreciated that the choice of the selector relays as set forth above is purely arbitrary in practice, and for purposes of clarity, the conditions set forth above may be tabulated as follows:

| Condition | Selector Relays |
| --- | --- |
| Print "Fifo" March through July and September through December 1952. | E70–18, E70–19, E70–3, E70–1 and E70–2. |
| Print "Fifo" August 1952 | E70–18, E70–19, E70–10, E70–1 and E70–2. |
| Print "Fifo" 1953 through 1957 | E70–18, E70–19, and E70–20. |
| Expire "Fifo" for August 1951 | E70–18, E70–19, E70–10, E70–1 and E70–17. |
| Skip all others | None. |

From the foregoing it will be seen that of the selector relays thus chosen, the following are common both to print and expire conditions:

E70–1, E70–10, E70–18, and E70–19

To first program the expire patch panels E170A and E170B, the input patch cord E115 described above is extended from a switch jack on the input bus bar E176 to a switch jack on the first bus bar corresponding to selector relay E70–1 on panel E170A. A second patch cord E321 is extended from a switch jack on the first bus bar on patch panel E170B to a switch jack on the tenth bus bar corresponding to selector relay E70–10 on panel E170B. A third patch cord E322 is extended from the tenth bus bar on panel E170A to the seventeenth bus bar on panel E170A corresponding to selector relay E70–17. A fourth patch cord E323 is extended from the seventeenth bus bar on panel E170B to the eighteenth bus bar on panel E170B corresponding to selector relay E70–18. A fifth patch cord E324 is extended from the eighteenth bus bar on panel E170A to the nineteenth bus bar on panel E170A corresponding to selector relay E70–19.

All of the expire conditions have thus been established in the expire patch panel by connecting in series the following normally open switches controlled by the corresponding selector relays: E87–1, E87–10, E87–17, E87–18, and E87–19. Having thus connected in series these five switches which must be closed together before the expire relay E61 can be energized, the output patch cord E111 described above is extended from the nineteenth bus bar on panel E170B to a switch jack on the output bus bar E177 described above, completing a circuit for the expire relay E61 from ground through the expire patch panel and rectifier E5 back to ground as shown in Fig. 26.

In programming the print patch panels E160A and E160B, it must be borne in mind that there are three separate conditions any one of which when satisfied will energize the print relay E60, these being: "Fifo" for March through December, 1952; "Fifo" for August, 1952; and "Fifo" for the five year period 1953 through 1957. It is therefore necessary that the circuits for these three conditions be arranged in parallel in the print patch panels so that the satisfaction of any one will energize the print relay E60. The plugging for these three conditions in order is as follows:

One input patch cord E331 is first extended from a switch jack on the input bus bar E166 to the first bus bar on panel E160A corresponding to selector relay E70–1. A second patch cord E332 is extended from the first bus bar on panel E160B to the second bus bar on panel E160B corresponding to selector relay E70–2. A third patch cord E333 is extended from the second bus bar in panel E160A to the third bus bar in panel E160A corresponding to selector relay E70–3. A fourth patch cord E334 is extended from the third bus bar on panel E160B to the eighteenth bus bar on panel E160B corresponding to selector relay E70–18. A fifth patch cord E335 is extended from the eighteenth bus bar on panel 160A to the nineteenth bus bar on panel E160A corresponding to selector relay E70–19. Thus, the first print condition (print "Fifo" March through July and September through December, 1952) is satisfied in this manner by connecting in series the following normally open switches under control of the corresponding selector relays: E86–1, E86–2, E86–3, E86–18 and E86–19.

Having thus programmed the first of the print conditions, a sixth or output patch cord E336 is extended from the nineteenth bus bar on panel E160B to a switch jack on the output bus bar E165.

Inasmuch as the second print condition (print "Fifo" for August, 1952) has all relays but one in common with the first print condition as tabulated above, it is only necessary in this instance to extend a patch cord as E341 from the second bus bar on panel E160A to the tenth bus bar on panel E160A corresponding to selector relay E70–

10, and a second patch cord as E342 from the tenth bus bar on panel E160B to the eighteenth bus bar on panel E160B corresponding to selector relay E70–18. In this manner, the following normally open switches are connected in series to satisfy the second print condition: E86–1, E86–2, E86–10, E86–18 and E86–19. Thus, the only distinction between the two print conditions thus far described is that the one circuit includes switch E86–3 while the other includes switch E86–10.

To program the third of the print conditions (print "Fifo" 1953 through 1957) an input patch cord E351 is extended from a switch jack on the input bus bar E166 to the twentieth bus bar on panel E160A corresponding to selector relay E70–20, and a second patch cord E352 is extended from the twentieth bus bar on panel E160B to the eighteenth bus bar on panel E160B corresponding to selector relay E70–18. Inasmuch as the eighteenth and nineteenth bus bars have already been connected by patch cord E335, and the nineteenth bus bar connected to the output bus bar E165 by patch cord E336, the print relay will be energized upon satisfaction of the third print condition provided the selector relays corresponding to the following normally open switches are energized: E86–18, E86–19, E86–20.

It is, of course, unnecessary to perform any programming for the skip condition since upon failure of either the print relay or the expire relay to energize during the sensing of an address card, the skip solenoid E66, Fig. 24A, is automatically energized when the cam switch E141 is closed, inasmuch as switches E142 and E136 controlled by the print and expire relays respectively remain in normally closed position.

*The town marker comparing unit and controls*

As was noted hereinabove, the relay 1033, Fig. 16, enables information regarding a change in town or community among the addresses appearing on the cards C, Fig. 20, to be stored in the drum 1000 until the corresponding address printed on the copy strip MS passes the dye pad PD, Fig. 1.

The comparing unit for the town marker shown in Fig. 28 includes two registers A and B each consisting of a bank of fifty relays in which data pertaining to the geographical status of the address cards may be stored and compared, and the significance of this number of relays will be pointed out hereinbelow.

When the address cards as C, Fig. 20, for each subscriber are initially prepared, for instance upon entering a subscription, the geographical status of the address is punched into an area of the card, and five columns in the card are allocated to this purpose. Thus, as pointed out in connection with programming the machine, columns sixty-six and sixty-seven on the cards C are allocated to each State and columns sixty-eight through seventy inclusive, are allocated to towns or communities. For instance, Chicago, Illinois may be coded "17200"; the digit "1" being punched in column sixty-six, "7" being punched in column sixty-seven, "2" being punched in column sixty-eight, "0" being punched in column sixty-nine, and "0" likewise being punched in column seventy. In a similar fashion Cleveland, Ohio might be coded as "15200" and Toledo, Ohio might be coded "15201." Thus, in the present instance, five columns on the address card are necessary to code or include in the card information pertaining to geographical data, but additional columns for such data may also be utilized as for instance in the case of larger cities where there is further geographical subdivision by way of zones.

To the area on the cards C whereat the geographical data are punched, are allocated five corresponding columns of sensing pins 451P carried by the sensing head, and in Fig. 28 ten of these sensing pins corresponding to column sixty-six on the address cards are shown, the corresponding contacts 535 each being adapted to be connected to ground, as described above in connection with Fig. 24A, by sensing pins for which there are geographical data.

The geographical data thus sensed are transmitted by way of electrical impulses to the comparing unit which includes the two aforesaid relay registers A and B, and it is here that the geographical data carried by successive address cards are compared one to the other to determine if a change has occurred. Thus, the geographical data of the first print card passing through the machine will be transmitted to register A and this will occur under circumstances such that geographical data on the succeeding address cards will be transmitted temporarily to register B and thereupon compared to that previously stored in register A. So long as geographical data of successive cards are found in this manner to be identical, the original data transmitted to register A will continue to be held therein and register B will be cleared of each successive set of data found to be identical with that stored in register A.

However, as soon as the comparing sequence discloses that data transmitted to register B is different than that stored in register A, such different data will be retained and stored in register B and register A will thereupon be cleared of the data previously stored therein. Now, each card successive to the card resulting in the clearance of register A will have the geographical data thereon transmitted to register A temporarily where it will be compared to the data stored in register B, and as these successive data are found to be identical register B will continue to hold the data transferred thereto while register A will be the one cleared between succeeding cards. Such will be continued until a change in data is again detected, whereupon the data representing the second change in geographical status will be held or stored in register A and register B will revert to a temporary basis as described above.

Both register A and register B comprise fifty relays each. Thus, the first ten relays in each register will correspond to the ten possible positions that are capable of being punched in column sixty-six of the address card, the second set of ten relays in each register will correspond to the ten possible positions in column sixty-seven on the address card, and so on through the fifth set of ten relays allocated to column seventy on the address cards. However, inasmuch as the circuits for each of the five sets of ten relays are the same, only the relays associated with column sixty-six are shown in Fig. 28, these being E400 through E409 for register A and E410 through E419 for register B. The relays in register A are each connected as by a wire E425, to a normally closed pole E426A of a double pole switch as E426 controlled by a switching relay to be described below.

The reversing poles E426B of the switches E426 are each connected to the normally open switches E430 at the sensing station represented by a pin 521 in the common ground plate 522 adapted to be closed on a contact 535. It will be seen, then, that when a sensing pin as 451P encounters an opening in columns sixty-six through seventy of an address card to close a switch as E430, a corresponding one of the relays in register A of the comparing unit will be connected at one side to ground, and the arrangement in the present instance is such that at this instant the register A relays are connected at the other side to a terminal whereby such a relay is energized.

Thus, the relays in register A are connected at one side in parallel to a bus wire E431. A wire E432 is connected to wire E431 and includes a normally closed cam-controlled switch E433. The cam for this switch is carried on the cam shaft 1200 as indicated in Fig. 28, and the arrangement is such that this switch is open only between the 300° and 340° cyclic position for the cam shaft. A wire E434 is connected at one end to wire E432 as shown and at the other end is connected to a wire E435 leading to the positive terminal on a rectifier E436 afforded for the town marker comparing unit.

A wire E437 is connected to the negative terminal on the rectifier E436, and the contact of a normally open cam-controlled switch E438 is connected to ground by a wire E439, this wire including a normally closed safety switch E53A located at the sensing station as switch E53 described above to disable the comparing unit in the absence of an address card arriving at the sensing station.

The cam for controlling switch E438 and timing town marker sensing is arranged on shaft 1200 to hold switch E438 closed in the 23°–73° portion of the cycle.

To enable the relays in register A to be held energized by switch E433 independently of the timing action of switch E438, normally open holding switches as E437A are each connected between wire E437 serving as a bus and the individual wires as E425 through which the relays in register A are adapted to be energized. Consequently, when the relays in register A for which there are geographical data are pulled in, the corresponding holding switches E437A close at the same time to hold these relays energized until switch E433 opens toward the end of the cycle to clear register A in a way to be described below.

Hence, it will be seen from the foregoing that when the first address card is sensed at the sensing station, the geographical data thereon will be transmitted to the corresponding relays in register A through the wires as E425 connected to ground, and such relays will thereupon be energized inasmuch as at this time switch E433 is held closed. However, if the first such address card is not of the print order, the relays in register A thus energized will be cleared when switch E433 opens; whereas if the first such address card bearing geographical data is of the print order, conditions are established as will now be described to hold energized these relays in register A until a card of the print order bearing different geographical data next arrives at the sensing station.

Thus, the comparing unit includes a stepping switch having three levels E441, E442, and E443, Fig. 28, each with a double armed wiper as E445 adapted to wipe twenty contacts in each level. The comparing unit stepping switch is identical in operation to switch E22 described above, except in this instance only alternate ones of the contact points in each of the switch levels are effective to transmit current, the intervening ones being dead.

As shown in the wiring diagram, the bus wire E431 for the relays in register A is connected to the in-put terminal E449 afforded for level E442 in the stepping switch. The wiper E445 for level E442 is a conductor, and is connected to the input terminal E449 by another conductor E450, the arrangement being the same in each of the other switch levels E441 and E443.

Each alternate contact in level E442, commencing with contact two and terminating at contact twenty, is connected to an out-put bus wire E451 which in turn is connected as shown to wire E435 leading to the positive terminal on rectifier E436, the odd numbered contacts in switch level E442 commencing with contact one being dead.

All wipers in the comparing unit stepping switch are under control of a coil E465 which, as in the instance of the stepping switch E22, drives the common shaft (not shown) and the wipers forwardly from one contact to the next when deenergized. As shown, coil E465 is connected at one side by a wire E466 to a normally open switch E467 controlled by the print relay E60, Fig. 24A. A wire E468 leads from switch E467 to a normally open cam controlled switch E470, and a bus wire E471 leads from switch E470 to a bank of parallel connected normally closed comparing relay contacts E472–1 through E472–5, the operation of which will be described in more detail hereinbelow. These five comparing contacts at the other side are connected in parallel to a bus wire E473 connected in turn to a wire E475 leading to the negative terminal on rectifier E453.

The cam for controlling switch E470 is carried on the cam shaft 1200 as indicated in Fig. 28, and the arrangement is such that this cam holds switch E470 closed between the 110° and 202° position. The first print card sensed at the sensing station will energize the print relay E60, Fig. 24A, and switch E467, Fig. 28, controlled thereby will thereupon close; and since this switch will be closed when switch E470 is closed in each cycle, a circuit will be completed through any one of the five normally closed contacts E472–1 to E472–5 to the driving coil E465 afforded for the stepping switch in the comparing unit. Consequently, when switch E470 opens at about the 202° position, coil E465 will deenergize and all wipers on the drive shaft of the comparing unit stepping switch will be driven forwardly one step. This advances the wiper in level E442 from dead contact one to lead out contact two so that now the holding action of switch E433 for the energized relays in register A is replaced by switch level E442 which shunts switch E433 as shown in Fig. 28. This condition for register A will not change until the stepping switch is advanced another step. At the same time, register B is conditioned to receive geographical data as will now be described.

Inasmuch as data pertaining to the geographical status of the first print card passing through the machine has been stored and held in register A by level E442 of the comparing unit stepping switch, like data contained in columns sixty-six to seventy of the next succeeding card passing through the machine, irrespective of its order, is to be transmitted to register B which contains fifty relays and individual holding circuits therefor identical in all respects to those of register A, noting again that only the relays in register B corresponding to column sixty-six are shown in detail in Fig. 28.

Level E441 of the comparing unit stepping switch is adapted to reverse the switches E426 which normally are positioned to transmit information to register A. Thus, each switch E426 is double pole in nature such that when reversed the reversing poles E426B switch from the poles E426A for register A to poles E426C afforded for the relays in register B. Leading from the poles E426C are individual wires as E490, and these in turn are respectively connected at one side to relays E410 to E419 in register B. At the other side, the relays in register B are connected in parallel to a bus wire E493, and connected to this wire is a normally closed cam controlled switch E495. Wire E435 connected to the positive terminal on rectifier E436 is connected to the other side of switch E495. The cam for controlling switch E495 is carried on the cam shaft 1200 and, like the cam for switch E433, is arranged to open switch E495 only in the interval between 300° and 340° in the machine cycle.

Switches E426 are adapted to be reversed from register A to register B by a switching relay E498 controlled by level E441 of the stepping switch. Thus, relay E498 is connected at one side by a wire E499 in turn connected to wire E435 leading to the positive terminal on the rectifier E436. At the other side, relay E498 is connected by a wire E500 leading to the in-put terminal afforded for switch level E441. It may here be pointed out that while there is but one switching relay E498 shown in Fig. 28, additional switching relays (not shown) of this nature are provided for the remaining sets of data storing relays associated with registers A and B. To accommodate such additional switching relays, another stepping switch level may be arranged in parallel with level E441 if the current demands are such.

As was described above, the comparing unit stepping switch in storing data pertaining to the first print card in the relays of register A advanced the wipers in all levels forwardly one step so that the wiper in level E441 has been passed from dead contact one to lead out contact two connected to a lead out bus wire E501 which in turn is connected to wire E437 terminating at the negative terminal on the comparing unit rectifier. Consequently, in the cycle in which the relays in register A were conditioned to store and hold data, relay E498 was energized through level E441 of the stepping switch causing the relay switches E426 to reverse from the wires E425 for the relays in register A to wires E490 for the relays in register B. Therefore, when the next address card is sensed, the relays in register B for which there are geographical data are energized through the reversed switches E426, this occuring independently of the order of this subsequent address card.

For each relay in register B, there is a holding circuit afforded by a normally open switch as E505 connected between wire E475, serving as a bus for these holding switches, and the individual wires E490, so that once energized the relays in register B will be held energized until switch E495 opens. As a consequence, when switch E495 opens subsequent to the sensing operation when data is first transmitted to register B, the relays in register B will be cleared unless the condition now to be described occurs.

To compare the data stored in register A with the data transmitted to register B, a comparing register C is afforded. This register likewise includes five banks corresponding to the five banks of ten relays each in registers A and B. However, inasmuch as there is but one bank shown for registers A and B, there likewise is but one bank shown for register C, and this bank includes one set of normally open contacts E501A through E519A controlled by the corresponding column sixty-six relays in register A, and a second set of normally open contacts E520B through E529B controlled by the corresponding column sixty-six relays in register B.

The contacts in register C controlled by the relays in register A are connected in parallel to a bus wire E540 in turn connected to wire E437 from the negative terminal of rectifier E436, and the contacts in register C controlled by the relays in register B are connected in parallel to a bus wire E541 connected to a wire E542 which includes a comparing relay E546–1. Wire E542 in turn is connected to a wire E547 leading to a normally open cam controlled switch E550, and at the other side switch E550 is connected to wire E434 that leads to the positive terminal on the rectifier E436.

The contacts E510A through E519A and E520B through E529B in register C are respectively connected by pairs in series through individual wires E441, so that when any of the nine respective pairs of contacts in register C are closed relay E546–1 will be energized as the cam controlled switch E550 is closed in each cycle of the machine. As shown in Figs. 27 and 28, the cam for controlling switch E550 is arranged on the main cam shaft 1200 to hold switch E550 closed in the 80°–215° interval of the cycle.

Inasmuch as there will be but one opening for geographical data punched in each column sixty-six to seventy of an address card as C, Fig. 20, it will be appreciated that there will normally be but one relay E400 to E409 in stored condition in register A and likewise but one comparing contact E510A to E519A held closed in the left set in register C. Likewise, when data is transmitted to register B there will be but one relay E410 to E419 energized and but one comparing contact E520B to E529B closed in the right set in register C. The same will hold true for the other four sets of relays and comparing contacts (not shown) afforded for columns sixty-seven to seventy, these being but further extensions of registers A, B, and C and omitted for purposes of clarity. It may be pointed out, however, that for each of the four remaining sets of comparing contacts in register C there is a corresponding comparing relay as E546–1 adapted to be energized when a pair of comparing contacts in register C are closed in series.

As was noted hereinbefore, the circuit by which coil E465 for driving the comparing unit stepping switch is energized, includes a set of five normally closed comparing relay contacts E472–1 to E472–5 arranged in parallel. Of those five contacts, contact E472–1 corresponds to and is controlled by the comparing relay E546–1, and since there are four additional comparing relays as E546–1 (not shown) arranged like relay E546–1 along wire E547, the operative arrangement of the remaining four comparing contacts E472–2 to E472–5 corresponding thereto has been shown in Fig. 28.

Where there is comparison between the data stored in register A, and that transmitted to register B, a pair of contacts in register C, as for instance E510A (digit "0"—column sixty-six) and E520B (digit "0"—column sixty-six), will be closed completing a circuit to the comparing relay as E546–1 and opening the corresponding comparing contact as E472–1. From this, it will be seen that when all the geographical data (up to five digits) stored in register A corresponds to all the geographical data (up to five digits) transmitted to register B, all five of the comparing contacts E472–1 to E472–5 (each corresponding to one of columns sixty-six to seventy inclusive) will open when the timing switch E550 closes, as a consequence of which coil E465 cannot energize even if switch E467 controlled by the print relay closes, and the stepping switch E440 is thereby held stationary. The relays energized in register B will thereupon be cleared when switch E495 opens toward the end of the cycle.

However, if there is lack of comparison between the data in register A and register B, as for instance if contacts E510A (digit "0"—sixty-six) and E521B (digit "1"—column sixty-six) are the two closed among the column sixty-six contacts in register C, indicating that the stored column sixty-six digit in register A is different from the column sixty-six digit transmitted to register B, then the comparing relay E546–1 for column sixty-six of geographical data will not energize when switch E550 closes. The comparing contact E472–1 for column sixty-six will therefore remain closed in this cycle, and the drive coil E465 for the stepping switch E440 will energize when switch E470 closes in the cycle; provided, of course, that the address card thus lacking comparison with the data for the previous print card stored in registers A and C is also of the print order, in which case switch E467 closes to complete a circuit to coil E465. In the absence of such proviso, coil E465 cannot energize since switch E467 remains open, and register B and the comparing contacts in register C will be cleared when switch E495 opens.

Assuming lack of comparison to be detected as aforesaid in the column sixty-six data of successive print cards, deenergization of coil E465 drives the comparing unit stepping switch forward one step when switch E470 opens at the 202° position. The levels of the stepping switch are thereupon reversed once more so that the wipers in levels E441 and E442 are once again on dead contacts, while at the same time the wiper in level E443 advances to a lead out contact (contact three in each instance) to establish conditions for clearing register A of the data stored therein and to store in register B the data transmitted thereto found not to compare to that stored in register A.

Thus, the lead out contacts in level E443 of the stepping switch are connected to a wire E553 in turn connected to wire E478 leading to the positive terminal on the rectifier, and wire E493 serving as a bus for the relays in register B is connected to the in-put terminal afforded for switch level E443. Therefore, since the relays in register B are now connected at one side through switch level E443 to the positive terminal on the rectifier, and at the other side through the holding switches E505 to the negative terminal of the rectifier, the relays in register B energized during sensing will not clear when switch E495 opens, but rather will hold in. Likewise, the right hand set of comparing contacts in register C corresponding to the held-in relays of register B will be held closed.

At the same time, register A is cleared and with it the corresponding left hand set of comparing contacts in register C. Thus, when the wiper in switch level E442 advances to the third contact thereof which is dead, circuit to the relays in register A through switch level E442 is broken, and the relays in register A previously energized will drop out when the cam controlled switch E443 opens toward the end of the cycle.

Further, the wiper in switch level E441 now being on a dead contact, relay E498 deenergizes and the poles in the switch E426 revert to normal position to enable geographical data for the next subsequent card at the sensing station to be transmitted to register A and compared in register C to that now stored in register B.

The net effect of finding, in register C, a lack of comparison between the data in register A and B is to energize the solenoid relay 1033, Fig. 16, associated with the storage drum. Thus, in Fig. 24A the solenoid relay 1033 is indicated as a relay E560 connected at one side to wire E2. Leading from the other side of the relay E560 and connected to wire E23 is a wire E561 having in series therewith a normally open switch E565. Switch E565 is under control of the coil E465 for the comparing unit stepping switch, such that when coil E465 energizes switch E565 closes to complete a circuit to the solenoid relay E560 causing a storage pin as 1015 in the storage drum 1000 to be shifted to stored position as described above. In this connection, it may be pointed out that depending upon whether it is desired to mark the printed copy strip MS on the first or last address of a group in the same town or community, the town marker solenoid, Fig. 16, may be positioned accordingly at the bottom of the storage drum 1000 in relation to the storage pins 1015.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a printing machine of the kind described wherein instrumentalities bearing data that may be printed and data identifying the instrumentalities as being of at least two different orders are to be passed in sequence through the machine, a sensing station whereat the order of each instrumentality is determined from the identifying data, a collector, means for transferring said instrumentalities from said sensing station to said collector in predetermined arrangement according to their order, conveyor means for instrumentalities of the first and second order, means to pass instrumentalities of the first and second order from the collector to the conveyor means upon the passage of an instrumentality of the first order to the collector, means enabling only those instrumentalities of the first order in the conveyor means to be printed from, and means to receive instrumentalities of the first and second order from the conveyor means in the original sequence.

2. In a printing machine of the kind described wherein instrumentalities bearing data that may be printed and data identifying the instrumentalities as being of at least two different orders are to be passed in sequence through the machine, a sensing station whereat the order of each instrumentality is determined from the identifying data, a collector, means for transferring said instrumentalities from said sensing station to said collector in predetermined arrangement according to their order, conveyor means affording separate paths for instrumentalities of the first and second order, means under control of the instrumentalities at the sensing station to pass instrumentalities of the first and second order from the collector to the conveyor means upon the sensing and passage of an instrumentality of the first order in to the collector, means associated with the conveyor means enabling only those instrumentalities of the first order to be printed from while ineffective on instrumentalities of the second order, and means to receive instrumentalities of the first and second order in the original sequence from the conveyor means after instrumentalities of the first order have been printed from.

3. In a printing machine of the kind described wherein instrumentalities bearing data that may be printed and data identifying the instrumentalities as being of at least two different orders are to be passed in sequence through the machine, a sensing station whereat the order of each instrumentality is determined from the identifying data, a collector, means for transferring said instrumentalities from said sensing station to said collector in predetermined arrangement according to their order, conveyor means for instrumentalities of the first and second order, means to pass instrumentalities of the first and second order from the collector to the conveyor means, means to hold the collector in collecting position to receive and store successive instrumentalities of the second order until an instrumentality of the first order is passed thereto, means associated with the conveyor means enabling only those instrumentalities of the first order in the conveyor means to be printed from and ineffective on instrumentalities of the second order, and means to receive instrumentalities of the first and second order from the conveyor means in the original sequence.

4. In a printing machine of the kind described wherein instrumentalities bearing data that may be printed and data identifying the instrumentalities as being of at least three different orders are to be passed in sequence through the machine, a sensing station whereat the order of each instrumentality is determined from the identifying data, a collector, means for transferring said instrumentalities from said sensing station to said collector in predetermined arrangement according to their order, conveyor means for receiving instrumentalities of the first and second order from the collector, means to pass instrumentalities of the first and second order from the collector to the conveyor means only upon the passage of an instrumentality of the first order to the collector whereby successive instrumentalities of the second and third order are collected in the conveyor means until such condition is established, means enabling only those instrumentalities of the first order in the conveyor means to be printed from, means to receive instrumentalities of the first and second order from the conveyor means in the original sequence, and means to relieve instrumentalities of the third order from the collector.

5. In a printing machine of the kind described wherein instrumentalities bearing data that may be printed and data identifying the instrumentalities as being of at least three different orders are to be passed in sequence through the machine, a sensing station whereat in one cycle of the machine the order of an instrumentality is determined from the identifying data, a collector, means for transferring said instrumentalities from said sensing station to said collector in predetermined arrangement according to their order, conveyor means having separate paths for instrumentalities of the first and second order, means operative as an incident to the sensing of an instrumentality of the first order to shift the collector from collecting position to the conveyor means, the last-named means being inoperative so long as only instrumentalities of the second and third order are passed from the sensing station to the collector, means enabling only those instrumentalities of the first order in the conveyor means to be printed from, means to receive instrumentalities of the first and second order from the conveyor means in the original sequence, and means to relieve instrumentalities of the third order from the collector so that these are not relayed to the conveyor means.

6. In a cyclically driven printing machine of the kind described wherein instrumentalities bearing data that may be printed and data identifying the instrumentalities as being of at least two different orders are to be passed in sequence from a supply station through the machine a sensing station, a feed means operative in one cycle of the machine to pass such an instrumentality to said sensing station whereat the order of said instrumentality is determined in the next cycle of the machine from the identifying data, a collector to which said instrumentality is passed by said feed means from the sensing station and arranged according to order during a portion of the said next cycle, conveyor means having separate paths therein for instrumentalities of the first and second order, means operative in a further portion of the said next cycle of the machine to pass said instrumentality of the first order from the collector to the conveyor means, the last-named means being inoperative whenever instrumentalities of said second order are passed to said collector so as to collect and store instrumentalities of the second order passed thereto from the sensing station, means disposed along the path for instrumentalities of the first order in the conveyor means enabling only those instrumentalities of the first order in the conveyor means to be printed from, and means to receive instrumentalities of the first and second order from the conveyor means in the original sequence.

7. In a cyclically operable printing machine of the kind described wherein instrumentalities bearing data that may be printed and data identifying the instrumentalities as being of at least two different orders are to be passed in sequence from a supply station through the machine, a sensing station whereat the order of each instrumentality is sensed, a collector, means for transferring said instrumentalities one by one from said sensing station to said collector in predetermined arrangement according to their order a conveyor means affording separate paths for instrumentalities of the first and second order collected in the collector, means under control of the sensing operation at the sensing station to pass instrumentalities of the first and second order from the collector to the conveyor means in that cycle of the machine wherein an instrumentality of the first order is sensed and passed to the collector, means associated with the conveyor means enabling only those instrumentalities of the first order in the path allocated thereto to be printed from while being ineffective on instrumentalities of the second order in the path allocated thereto, and means to receive instrumentalities of the first and second order in the original sequence from the path in the conveyor means after instrumentalities of the first order have been printed from.

8. In a cyclically operable printing machine of the kind described wherein instrumentalities bearing data that may be printed and data identifying the instrumentalities as being of at least two different orders are to be passed in sequence through the machine, a sensing station whereat the order of each instrumentality is determined one by one in successive cycles of operation from the identifying data, a collector, means for transferring said instrumentalities during the sensing cycle from said sensing station to said collector in predetermined arrangement according to their order, conveyor means affording separate paths for cards of the first and second order, means to pass instrumentalities of the first and second order from the collector to the conveyor means and to hold the collector in collecting position to receive and store successive instrumentalities of the second order until an instrumentality of the first order is passed thereto in the same cycle in which it was sensed, means associated with the conveyor means enabling only those instrumentalities of the first order in the conveyor means to be printed from while being ineffective on instrumentalities of the second order, and means to receive instrumentalities of the first and second order from the conveyor means in the original sequence.

9. In a cyclically operable printing machine of the kind described wherein instrumentalities bearing data that may be printed and data identifying the instrumentalities as being of at least three different orders are to be passed in sequence from a supply station through the machine, a sensing station whereat the order of each instrumentality is determined in a sensing operation from the identifying data, a collector having a plurality of levels individually corresponding to said different orders, means for transferring said instrumentalities from said sensing station to said collector at levels determined by their order, conveyor means having different levels for receiving instrumentalities of the first and second order from the collector, means under control of the sensing operation to pass instrumentalities of the first and second order from the collector to respective levels in the conveyor means only upon the passage of an instrumentality of the first order to the collector whereby successive instrumentalities of the second and third order are collected in the collector until such condition is established, means enabling only those instrumentalities of the first order at one level in the conveyor means to be printed from while being ineffective on instrumentalities of the second order in the other level in the conveyor means, means to receive instrumentalities of the first and second order from the different levels in the conveyor means in the original sequence, and means to relieve instrumentalities of the third order from the collector.

10. In a cyclically operable printing machine of the kind described wherein instrumentalities bearing data that may be printed and data identifying the instrumentalities as being of at least three different orders are to be passed in sequence through the machine, a sensing station whereat in one cycle of the machine the order of an instrumentality is determined from the identifying data, a collector having different levels individually corresponding to said orders, means operative in the same cycle of the machine for transferring said instrumentality from said sensing station to the level in said collector corresponding to the order of said instrumentality, conveyor means affording different levels for receiving instrumentalities of the first and second order from the collector, means operative as an incident to the sensing of an instrumentality of the first order to shift the collector containing said instrumentality of the first order from collecting position to the conveyor means, the last-named means being inoperative so long as instrumentalities of the second and third order are sensed at the sensing station and in the same cycle passed to the collector, means enabling only those instrumentalities of the first order in the conveyor means to be printed from, means to receive instrumentalities of the first and second order from the conveyor means in the original sequence, and means operative as an incident to shifting movement of the collector to relieve instrumentalities of the third order from the collector so that these are not relayed to the conveyor means.

11. In a printing machine of the kind described wherein instrumentalities bearing data that may be printed and data identifying the instrumentalities as being of at least three different orders are to be passed in sequence through the machine, a sensing station whereat the order of each instrumentality is determined from the identifying data, a collector having different levels individually corresponding to said orders, means for transferring said instrumentalities from said sensing station to the levels in said collector corresponding to their orders, conveyor means affording different paths for instrumentalities of the first and second order, a relay and means controlled thereby responsive to the sensing of an instrumentality of the first order to pass instrumentalities of the first and second order from the collector to the conveyor means upon the passage of an instrumentality of the first order from the sensing station to the collector, means enabling only those instrumentalities of the first order in the conveyor means to be printed from, means to advance instrumentalities of the first and second order through the conveyor means at the same speed so that these emit from the conveyor means in the original sequence, and means to relieve instrumentalities of the third order from the collector so that these are not passed to the conveyor means.

12. In a printing machine of the kind described wherein instrumentalities bearing data that may be printed and data identifying the instrumentalities as being of at least three different orders are to be passed in sequence through the machine, a sensing station whereat the order of each instrumentality is determined from the identifying data, a collector, means for transferring said instrumentalities from said sensing station to said collector in predetermined arrangement according to their order, conveyor means affording separate paths for instrumentalities of the first and second order only, a relay and means controlled thereby responsive to the sensing of an instrumentality of the first order to enable instrumentalities of the first and second order arranged in the collector to be passed to the conveyor means when the instrumentality of the first order thus sensed is passed to the collector, means associated with the conveyor means enabling only those instrumentalities of the first order to be printed from while ineffective on instrumentalities of the second order, means under control of said relay to advance the instrumentalities of the first and second order through the conveyor means at the same speed and to eject these from the conveyor means in the original sequence after instrumentalities of the first order have been printed from, and means to relieve instrumentalities of the third order from the collector so that these are not passed to the conveyor means.

13. In a printing machine of the kind described wherein instrumentalities bearing data that may be printed and data identifying the instrumentalities as being of at least three different orders are to be passed in sequence through the machine, a sensing station including means for sensing the order of each instrumentality from the identifying data, relays associated with the sensing means and respectively responsive to each order, a collector, means for transferring said instrumentalities to said collector from the sensing station, means controlled by said relays to arrange the instrumentalities in the collector by order, conveyor means for instrumentalities of the first and second order, means controlled by one of said relays to pass instrumentalities of the first and second order from the collector to the conveyor means and to hold the collector in collecting position to receive and store successive instrumentalities of the second and third order until an instrumentality of the first order is passed thereto, means associated with the conveyor means enabling only those instrumentalities of the first order in the conveyor means to be printed from and ineffective on instrumentalities of the second order, means to receive instrumentalities of the first and second order from the conveyor means in the original sequence, and means to relieve instrumentalities of the third order from the collector so that these are not passed to the conveyor means.

14. In a printing machine of the kind described wherein instrumentalities each bearing addresses that may be printed, other data identifying the geographical status of each instrumentality and still other data identifying each instrumentality as being of the first or second order are to be passed in prearranged sequence through the machine, a sensing station whereat the order and geographical status of each instrumentality is determined from the respective identifying data, a collector, means for transferring said instrumentalities from said sensing station to said collector in predetermined arrangement according to their order, conveyor means for receiving instrumentalities of the first and second order from the collector, means to pass instrumentalities of the first and second order from the collector to the conveyor means only upon the passage of an instrumentality of the first order to the collector whereby successive instrumentalities of the second order are collected in the collector until such condition is established, means enabling only the addresses on those instrumentalities of the first order in the conveyor means to be printed from, means to receive instrumentalities of the first and second order from the conveyor means in the original sequence, and means to determine when there is a change in geographical status between successive instrumentalities of the first order only so that this information may be acted upon by the machine.

15. In a printing machine of the kind described wherein instrumentalities each bearing addresses that may be printed, other data identifying the geographical status of each instrumentality and still other data identifying each instrumentality as being of the first, second or third order are to be passed in prearranged sequence through the machine, a sensing station whereat in one cycle of the machine the order of an instrumentality is determined from the corresponding identifying data, a collector, means for transferring said instrumentality in the same cycle of said machine to a predetermined position in said collector according to the order of said instrumentality, conveyor means having separate paths for instrumentalities of the first and second order, means operative as an incident to the sensing of an instrumentality of the first order to pass instrumentalities of the first and second order from the collector to the conveyor means, the last-named means being inoperative so long as only instrumentalities of the second and third order are passed from the sensing station to the collector, means enabling only the addresses on those instrumentalities of the first order in the conveyor means to be printed from, means to receive instrumentalities of the first and second order from the conveyor means in the original sequence, means to relieve instrumentalities of the third order from the collector so that these are not passed to the conveyor means, and means to determine when there is a change in geographical status between successive instrumentalities of the first order only so that this information may be acted upon by the machine.

16. In a cyclically driven printing machine of the kind described wherein instrumentalities bearing addresses that may be printed, other data identifying the geographical status of each instrumentality and still other data identifying the instrumentalities as being of the first, second or third order are to be passed in prearranged sequence from a supply station through a sensing station, a feed means operative in one cycle of the machine to pass an instrumentality to said sensing station whereat the order of said instrumentality is determined in the next cycle of the machine from the corresponding identifying data, a collector, means for transferring said instrumentality from said sensing station to a predetermined position in said collector according to order during a portion of the said next cycle, conveyor means having separate paths therein for instrumentalities of the first and second order, means operative in a further portion of the said next cycle of the machine to pass each said instrumentality of the first order from the collector to the conveyor means, the last-named means being inoperative whenever instrumentalities of said second and third orders are passed to said collector so as to collect and store instrumentalities of the second and third order passed thereto from the sensing station, means disposed along the path for instrumentalities of the first order in the conveyor means enabling only the addresses on those instrumentalities of the first order in the conveyor to be printed from, means to advance instrumentalities of the first and second order through the conveyor means at the same speed and to discharge these instrumentalities from the conveyor means in the original sequence, means to relieve instrumentalities of the third order from the collector so that these are not passed to the conveyor means, and means to determine when there is a change in geographical status between successive instrumentalities of the first order so that this information may be acted upon by the machine.

17. In a cyclically operable printing machine of the kind described wherein instrumentalities bearing data that may be printed, other data identifying the geographical status of each instrumentality and still other data identifying the instrumentalities as being of at the first, second or third order are to be passed in prearranged sequence through the machine, a sensing station whereat the order of each instrumentality is determined one by one in successive cycles of operation from the identifying data, a collector, means for transferring said instrumentalities during the sensing cycle from said sensing station to said collector in a predetermined arrangement by order, conveyor means affording separate paths for instrumentalities of the first and second order, means including a relay operative to pass instrumentalities of the first and second order from the collector to the conveyor means and to hold the collector in collecting position to receive and store successive instrumentalities of the second and third order until an instrumentality of the first order is passed thereto in the same cycle in which it was sensed, a station along the conveyor means where the data to be printed from on those instrumentalities of the first order only is exposed and transmitted to another station in the machine for reproduction, means controlled by said relay to advance instrumentalities of the first and second order through the conveyor means at the same speed and to discharge these instrumentalities from the conveyor means in the original sequence, means to relieve instrumentalities of the third order from the collector so that these are not passed to the conveyor means, and means to determine when there is a change in geographical status between successive instrumentalities of the first order so that this information may be acted upon by the machine.

18. In a cyclically operable printing machine of the kind described wherein instrumentalities bearing data that may be printed and data identifying the instrumentalities as being of at least three different orders are to be passed in sequence from a supply station through the machine, a sensing station whereat the order of each instrumentality is determined in a sensing operation from the identifying data, a collector, means for transferring said instrumentalities from said sensing station to predetermined positions in said collector according to their order, conveyor means having different paths for respectively receiving instrumentalities of the first and second order from the collector, a relay associated with the sensing station and means under control thereof responsive to the sensing of an instrumentality of the first order to pass instrumentalities of the first and second order only from the collector to the respective paths therefor in the conveyor means whereby successive instrumentalities of the second and third order are collected in the conveyor collector until said relay responds as aforesaid, means enabling only those instrumentalities of the first order at one level in the conveyor means to be printed from while being ineffective on instrumentalities of the second order in the other level of the conveyor means, means under control of said relay to advance instrumentalities of the first and second order at the same speed through the conveyor means and to discharge these instrumentalities from the different levels in the conveyor means in the original prearranged sequence, and means to relieve instrumentalities of the third order from the collector so that these are not passed to the conveyor means.

19. In a cyclically operable printing machine of the kind described wherein instrumentalities bearing data that may be printed and data identifying the instrumentalities as being of at least three different orders are to be passed in sequence through the machine, a sensing station whereat in one cycle of the machine the order of an instrumentality is determined from the identifying data, a collector having different levels individually corresponding to said different orders, means operative in the same cycle of said machine to transfer said instrumentality from said sensing station to the level of said collector corresponding to its order, conveyor means affording different levels for respectively receiving first and second order instrumentalities, a relay and means operative as an incident to the sensing of an instrumentality of the first order to shift the collector containing said instrumentality of the first order from collecting position to the conveyor means, said means under control of the relay being inoperative so long as only instrumentalities of the second and third order are sensed at the sensing station and in the same cycle passed to the collector, means associated with the conveyor means to which instrumentalities of the first order only are exposed so that the data thereon to be printed from may be transmitted to another station in the machine for reproduction, means to advance instrumentalities of the first and second order through the conveyor means at the same speed so that these may emit from the conveyor means in the original prearranged sequence, and means operative as an incident to shifting movement of the collector to relieve instrumentalities of the third order from the collector so that these are not relayed to the conveyor means.

20. In a printing machine for printing a sheet with addresses carried by individual instrumentalities passed one by one through the machine, means to mark said sheet when there is a change in locality among the addresses printed thereon, a first register for receiving and storing data pertaining to an address on one such instrumentality and a second register for receiving and storing data pertaining to an address on another such instrumentality, means to compare the data received in the two registers, means to actuate said marking means when the data thus compared are found to be different, and means actuated by said comparing means for selectively clearing said registers in accordance with the comparison status of the data stored therein.

21. In a printing machine for printing a sheet with addresses carried by individual instrumentalities passed one by one through the machine, means to mark said sheet when there is a change in locality among the addresses printed thereon, a first register including settable elements for receiving data pertaining to an address on one instrumentality and a second register including like settable elements for receiving data pertaining to an address on another instrumentality, means to compare data contained in the settable elements in the two registers, means to hold data in the first register while clearing data from the second register when data in the two registers are found to compare, means to reverse operation of the registers when the data therein are found not to compare, and means to enable said marking means to be actuated once the registers are reversed as aforesaid.

22. In a printing machine for printing a sheet with addresses carried by certain ones of different ordered individual instrumentalities passed one by one through the machine, means to first sense said instrumentalities to determine which are of the order to be printed from, means to mark said sheet when there is a change in locality among the addresses printed thereon, a first register for receiving and holding data pertaining to the address on an instrumentality of the order to be printed from and a second register for temporarily receiving data pertaining to the addresses on subsequent instrumentalities regardless of order, means to compare each new set of data as these are received in the second register with that held in the first register as aforesaid, means to hold data in the first register while clearing the data pertaining to said subsequent instrumentalities from the second register each time the data in the two registers are found to compare, means to reverse operation of the registers when data received in the second register pertaining to a subsequent instrumentality which is of the order to be printed from is found to compare with the data held in the first register as aforesaid, and means to enable said marking means to be actuated once the registers reverse as aforesaid.

23. In a printing machine of the kind described wherein instrumentalities bearing data that may be printed and data identifying the instrumentalities as being of at least two different orders are to be passed in sequence through the machine, a sensing station whereat the data identifying the order of each instrumentality is sensed, a relay adapted to be energized when an instrumentality of the first order is sensed, a collector having at least two instrumentality-receiving portions, means for transferring said instrumentalities from said sensing station to different portions of said collector in accordance with the different orders, conveyor means having respectively different levels for instrumentalities of the first and second order, means under control of the first order relay when energized to pass instrumentalities of both orders from the collector to the respective levels in the conveyor means, means in said conveyor means enabling only those instrumentalities of the first order to be printed from, means under control of said first order relay when energized to pass instrumentalities of the first and second order through the conveyor means at the same speed so that these may emit from the conveyor means in the original prearranged sequence, means to count the number of second order instrumentalities passed to the collector, and means to disable the machine after a predetermined number of second order instrumentalities have been counted by said last-mentioned means.

24. In a printing machine of the kind described wherein instrumentalities bearing data that may be printed and data identifying the instrumentalities as being of at least two different orders are to be passed in sequence through the machine, a sensing station whereat the data identifying the order of each instrumentality is sensed, a first order relay adapted to be energized when an instrumentality of the first order is sensed, a collector having at least two instrumentality-receiving portions, means for transferring said instrumentalities from said sensing station to different portions of said collector in the collector in accordance with the different orders, conveyor means having different levels for instrumentalities of the first and second order, means under control of said first order relay when energized to pass instrumentalities of both orders from the collector to the respective levels in the conveyor means, means in said conveyor means enabling only those instrumentalities of the first order to be printed from, and means under control of said first order relay when energized to pass instrumentalities of the first and second order through the conveyor means at the same speed so that these may emit from the conveyor means in the original prearranged sequence.

25. In a machine of the kind described wherein instrumentalities of at least a first and a second order are passed one by one to a sensing means where the order thereof is individually determined, an order-differentiated transfer system comprising: a collector movable between a normal collecting position and a discharge position, said collector having different levels individually corresponding to the different orders of said instrumentalities; means for transferring said instrumentalities from said sensing means to different levels of said collector in accordance with their order; conveyor means adapted to receive said instrumentalities from said collector when said collector is moved to said discharge position; and means for moving said collector from said normal position to said discharge position whenever a first order instrumentality is transferred to said collector.

26. In a machine of the kind described wherein instrumentalities of at least a first and a second order are passed one by one to a sensing means where the order thereof is individually determined, an order-differentiated transfer system comprising: a collector movable between a normal collecting position and a discharge position, said collector having different levels individually corresponding to the different orders of said instrumentalities; means for transferring said instrumentalities from said sensing means to different levels of said collector in accordance with their order; conveyor means adapted to receive said instrumentalities from said collector when said collector is moved to said discharge position; drive means for moving said collector from said normal position to said discharge position; and a control relay, actuated by said sensing means, for actuating said drive means only when a first order instrumentality is sensed and transferred to said collector.

27. In a machine of the kind described wherein instrumentalities of at least three different orders are passed one by one to a sensing means where the order thereof is individually determined, an order differentiated transfer system comprising: a collector movable between a normal collecting position and a discharge position, said collector having a plurality of different levels individually corresponding to the different orders of said instrumentalities; means for transferring said instrumentalities from said sensing means to different levels of said collector in accordance with their order; conveyor means adapted to receive instrumentalities of two predetermined orders from said collector when said collector is moved to said discharge position; means for moving said collector from said normal position to said discharge position whenever a first order instrumentality is transferred to said collector; and means to relieve instrumentalities of a third order from said collector when said collector returns to its normal position.

28. In a machine of the kind described wherein instrumentalities of at least three different orders are passed one by one to a sensing means where the order thereof is individually determined, an order differentiated transfer system comprising: a collector movable between a normal collecting position and a discharge position, said collector having a plurality of different instrumentality-receiving portions representative of said different orders; means for transferring said instrumentalities from said sensing means to said collector in accordance with their order; conveyor means adapted to receive said instrumentalities of at least two different orders from said collector when said collector is moved to said discharge position, said conveyor means including means for handling instrumentalities of different orders separately from each other; and means for moving said collector from said normal position to said discharge position whenever an instrumentality of one predetermined order is transferred to said collector.

29. In an addressing machine of the kind described through which address-bearing instrumentalities separately coded for at least a portion of their addresses are passed in sequence in order to reproduce the addresses from selected ones of said instrumentalities on a mailing strip, said machine including a sensing station for interpreting the separate coding on said instrumentalities, a comparing unit comprising: a first data-storage register comprising a plurality of data-storing devices, coupled to said sensing station, for receiving and storing data representative of the separate coding on the first instrumentality bearing an address to be reproduced; a second data-storage register comprising a plurality of data-storing devices, coupled to said sensing station, for receiving and storing data representative of the separate coding on the first instrumentality bearing an address to be reproduced; a second data-storage register comprising a plurality of data-storing devices, coupled to said sensing station, for receiving and storing data representative of the corresponding coding on the next instrumentality bearing an address to be reproduced; means to compare the data stored in said first and second registers; means actuated by said comparing means to clear data from said second register when comparison is found; means actuated by said comparing means to clear data from said first register when there is lack of comparison; and means actuated by said comparing means for marking said mailing strip when there is lack of comparison.

30. In a machine of the kind described through which information-bearing instrumentalities are passed in sequence in order to reproduce a portion of the information from selected ones of said instrumentalities, said machine including a sensing station for interpreting a predetermined portion of said information on each of said instrumentalities, a comparing unit comprising: a first data-storage register, coupled to said sensing station, for receiving and storing data representative of a predetermined part of the information carried by the first instrumentality bearing information to be reproduced; a second data-storage register, coupled to said sensing station, for receiving and storing data representative of the corresponding part of the information carried by the next instrumentality bearing information to be reproduced; means for comparing the data stored in said registers; means actuated by said comparing means to clear only said second register when the two sets of data are in comparison and to reverse said registers by clearing only said first register when the two sets of data are not in comparison; and means to return said registers to their original relationship with respect to each other upon a subsequent occurrence of lack of comparison.

31. In a machine of the kind described wherein instrumentalities of at least a first and a second order are passed one by one to a sensing means where the order thereof is individually determined, an order-differentiated transfer system comprising: a collector movable between a normal collecting position and a discharge position, said collector having different portions individually corresponding to the different orders of said instrumentalities; means for transferring said instrumentalities from said sensing means to different portions of said collector in accordance with their order; conveyor means adapted to receive said instrumentalities from said collector when said collector is moved to said discharge position; means for moving said collector from said normal position to said discharge position only when a first order instrumentality is transferred to said collector, whereby immediately successive instrumentalities of the second order accumulate in said collector; and means to disable said transfer system whenever a predetermined number of said second order instrumentalities have accumulated in said collector.

32. In a machine of the kind described wherein instrumentalities of at least a first and a second order are passed one by one to a sensing means where the order thereof is individually determined, an order-differentiated transfer system comprising: a collector movable between a normal collecting position and a discharge position, said collector having different portions individually corresponding to the different orders of said instrumentalities; means for transferring said instrumentalities from said sensing means to different portions of said collector in accordance with their order; conveyor means adapted to receive said instrumentalities from said collector when said collector is moved to said discharge position; means for driving said collector from said normal position to said discharge position only when a first order instrumentality is transferred to said collector, whereby immediately successive instrumentalities of the second order accumulate in said collector; means to register the arrival of second order instrumentalities at said sensing station; and means actuated by said register means to disable said transfer system whenever a predetermined number of said second order instrumentalities have been registered in immediate succession.

References Cited in the file of this patent

UNITED STATES PATENTS

| | | |
|---|---|---|
| 1,506,382 | Peirce | Aug. 26, 1924 |
| 1,675,710 | Johnson | July 3, 1928 |
| 1,862,032 | Peirce | June 7, 1932 |
| 2,059,805 | Page | Nov. 3, 1936 |
| 2,281,745 | Buckingham | May 5, 1942 |
| 2,354,534 | Mason | July 25, 1944 |
| 2,496,124 | Ferry | Jan. 31, 1950 |
| 2,688,656 | Wright et al. | Sept. 7, 1954 |
| 2,737,342 | Nelson | Mar. 6, 1956 |